(12) United States Patent
Shao et al.

(10) Patent No.: US 11,533,153 B2
(45) Date of Patent: Dec. 20, 2022

(54) METHODS FOR TRANSMITTING INFORMATION USING AT LEAST TWO TRANSPORT BLOCKS

(71) Applicant: Huawei Technologies Co., Ltd., Shenzhen (CN)

(72) Inventors: Jiafeng Shao, Beijing (CN); Yongxia Lyu, Ottawa (CA); Lei Guan, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 89 days.

(21) Appl. No.: 16/925,534

(22) Filed: Jul. 10, 2020

(65) Prior Publication Data

US 2020/0344031 A1 Oct. 29, 2020

Related U.S. Application Data

(63) Continuation of application No. PCT/CN2019/071470, filed on Jan. 11, 2019.

(30) Foreign Application Priority Data

Jan. 12, 2018 (CN) .......................... 201810032510.5

(51) Int. Cl.
*H04L 5/00* (2006.01)
*H04L 1/00* (2006.01)
(Continued)

(52) U.S. Cl.
CPC .......... *H04L 5/0092* (2013.01); *H04L 1/0003* (2013.01); *H04L 1/1819* (2013.01);
(Continued)

(58) Field of Classification Search
CPC ... H04L 5/0092; H04L 1/0003; H04L 1/1819; H04L 5/0055; H04W 52/242; H04W 72/042; H04W 72/0446; H04W 72/0453
See application file for complete search history.

(56) References Cited

U.S. PATENT DOCUMENTS

2011/0300854 A1* 12/2011 Shan ...................... H04L 1/1607
455/422.1
2013/0003678 A1* 1/2013 Quan ................ H04W 72/1289
370/329
(Continued)

FOREIGN PATENT DOCUMENTS

CN 102006623 A 4/2011
CN 102598570 A 7/2012
(Continued)

OTHER PUBLICATIONS

3rd Generation Partnership Project; Technical Specification Group Services and System Aspects; Service requirements for the 5G system; Stage 1 (Release 16), 3GPP TS 22.261 V16.2.0 (Dec. 2017), 53 pages.

Primary Examiner — Jael M Ulysse
(74) Attorney, Agent, or Firm — Slater Matsil, LLP

(57) ABSTRACT

This application relates to the field of communications technologies, and provides an information sending method, an information receiving method, and an apparatus. The method includes: determining, by a terminal device, at least two transport blocks; and sending, by the terminal device, first information to a network device by using the at least two transport blocks, where the first information includes at least one of data and control information, and the at least two transport blocks carry the first information.

13 Claims, 7 Drawing Sheets

(51) Int. Cl.
*H04L 1/18* (2006.01)
*H04W 52/24* (2009.01)
*H04W 72/04* (2009.01)

(52) U.S. Cl.
CPC ......... *H04L 5/0055* (2013.01); *H04W 52/242* (2013.01); *H04W 72/042* (2013.01); *H04W 72/0446* (2013.01); *H04W 72/0453* (2013.01)

(56) References Cited

U.S. PATENT DOCUMENTS

| | | | | |
|---|---|---|---|---|
| 2013/0094449 | A1* | 4/2013 | Takeda | H04W 72/04 370/329 |
| 2013/0195041 | A1* | 8/2013 | Papasakellariou | H04W 72/042 370/329 |
| 2014/0362832 | A1* | 12/2014 | Rudolf | H04L 1/1678 370/336 |
| 2015/0230239 | A1* | 8/2015 | Yang | H04L 1/1893 370/329 |
| 2016/0337157 | A1* | 11/2016 | Papasakellariou | H04L 5/0053 |
| 2017/0078051 | A1* | 3/2017 | Han | H04L 1/08 |
| 2017/0079048 | A1* | 3/2017 | Yamada | H04J 11/005 |
| 2018/0098223 | A1* | 4/2018 | Hugl | H04W 16/14 |
| 2018/0152924 | A1* | 5/2018 | Ouchi | H04W 72/042 |
| 2018/0199314 | A1* | 7/2018 | Takeda | H04W 72/04 |
| 2018/0368107 | A1* | 12/2018 | Babaei | H04L 1/1838 |
| 2019/0082456 | A1* | 3/2019 | Kim | H04L 5/0091 |
| 2019/0132824 | A1* | 5/2019 | Jeon | H04L 5/0092 |
| 2019/0132862 | A1* | 5/2019 | Jeon | H04L 5/0064 |
| 2019/0229847 | A1* | 7/2019 | Yoshimura | H03M 13/09 |

FOREIGN PATENT DOCUMENTS

| | | |
|---|---|---|
| CN | 104640211 A | 5/2015 |
| CN | 104935401 A | 9/2015 |
| CN | 105703891 A | 6/2016 |
| EP | 2234308 A1 | 9/2010 |
| EP | 3726759 A1 | 10/2020 |
| WO | 2008084281 A1 | 7/2008 |
| WO | 2011026425 A1 | 3/2011 |
| WO | 2013163895 A1 | 11/2013 |
| WO | 2014180372 A1 | 11/2014 |
| WO | 2016106489 A1 | 7/2016 |

* cited by examiner

METHODS FOR TRANSMITTING INFORMATION USING AT LEAST TWO TRANSPORT BLOCKS

CROSS-REFERENCE TO RELATED APPLICATIONS

This application is a continuation of International Application No. PCT/CN2019/071470, filed on Jan. 11, 2019, which claims priority to Chinese Patent Application No. 201810032510.5, filed on Jan. 12, 2018. The disclosures of the aforementioned applications are hereby incorporated by reference in their entireties.

TECHNICAL FIELD

This application relates to the field of communications technologies, and in particular, to an information sending method, and an information receiving method, and an apparatus.

BACKGROUND

To cope with explosive growth of mobile data traffic in the future, massive device connections in mobile communication, and various types of emerging new services and application scenarios, a fifth generation (5G) mobile communications system emerges. The International Telecommunication Union (ITU) defines ultra-reliable and low latency communications (URLLC) service scenarios for 5G and future mobile communications systems. URLLC services impose an extremely high requirement on a latency. A latency of unidirectional transmission from a transmit end to a receive end needs to be within 0.5 milliseconds (ms), and reliability of the transmission needs to reach 99.999% within 1 ms.

In a 5G new radio (NR) and a long term evolution (LTE) system, usually, to improve reliability of receiving a service by a receive end, when a transmit end sends a data packet to the receive end for the first time (referred to as initial transmission for short), but the receive end cannot normally receive the data packet or cannot correctly parse the data packet, a retransmission mechanism (for example, hybrid automatic repeat request (HARQ) may be used to request the transmit end to retransmit a data packet (referred to as retransmission for short); or when the receive end still cannot receive the retransmitted data packet or cannot correctly parse the retransmitted data packet, the transmit end may retransmit a data packet again. Finally the transmit end performs combined reception of the initially transmitted data packet and the retransmitted data packet or data packets retransmitted for a plurality of times, to improve performance of the receive end. For example, if an error rate of one transmission is 0.1, and combined reception is not performed during the second retransmission, an error rate of the two times of transmission is based on two independent events that are uncorrelated to each other. In this case, the error rate of the two times of transmission is 0.01 (0.1×0.1). When combined reception can be performed, an error rate of the first transmission is still 0.1, but an error rate of the second transmission can be less than 0.1 (a specific value depends on an algorithm used by the receive end) because previous information can be used to improve the current transmission. In this way, the error rate of the two times of transmission is less than 0.1×0.1.

Therefore, how to reduce a transmission latency while improving transmission reliability is a technical issue that urgently needs to be resolved in a future communications system.

SUMMARY

This application provides an information sending method, and an information receiving method, and an apparatus, to improve reliability of uplink transmission.

To achieve the foregoing objective, this application provides the following technical solutions.

According to a first aspect, this application provides an information sending method, including: generating, by a terminal device, first information; and sending, by the terminal device, the first information to a network device by using at least two transport blocks, where the first information includes at least one of data and control information, where each of the at least two transport blocks carries the first information. It should be noted herein that the at least two transport blocks are used to transmit the first information in a duplicate transmission manner. In an optional manner, each transport block carries the whole first information. In another optional manner, the first information may be divided into a plurality of pieces of sub information based on a size of information that can be carried in each transport block and/or a size of the first information, and each transport block carries one or more pieces of sub information, so that each transport block carries the first information. In this way, the first information is sent by using the at least two transport blocks. For details, refer to a related description of duplicate transmission in embodiments.

According to the information sending method provided in this embodiment of this application, the first information from the terminal device is transmitted to the network device by using the at least two transport blocks. Because transport blocks in the at least two transport blocks may be used for joint decoding to obtain the first information, the network device can jointly decode the at least two transport blocks to obtain the first information, thereby improving reliability of uplink transmission. In the prior art, duplicate transmission is usually performed on a transport block used for initial transmission and a transport block used for retransmission, or performed on two transport blocks used for retransmission. Transmission of the transport block used for initial transmission and the transport block used for retransmission and transmission of the two transport blocks used for retransmission are both performed in a sequence, and the transport blocks are sent only after a receive end feeds back a negative acknowledgment. This increases a transmission latency. In contrast, in this application, it is not required that after one of at least two transport blocks is sent, another transport block be sent only after a next sending occasion and after the receive end feeds back a negative acknowledgment. Therefore, a transmission latency can be reduced.

With reference to the first aspect, in a first possible implementation of the first aspect, the determining, by a terminal device, at least two transport blocks includes: determining, by the terminal, first indication information, where the first indication information is used to indicate a parameter value of at least one parameter corresponding to the at least two transport blocks, and the at least one parameter includes one or more of the following parameters: a first time period, a bandwidth part (BWP), a precoding matrix parameter, a network identifier, a reference signal, a cell index, and a joint identifier, where the joint identifier is used to indicate transport blocks used for joint decoding; and determining, by the terminal device, the at least two transport blocks based on the first indication information. The first indication information is used to indicate, to the terminal device, a parameter for transmitting the at least two transport blocks. In this way, when receiving the transport blocks, the network device can determine whether the received transport blocks are used for joint decoding, to decode the first information transmitted by using the at least two transport blocks.

With reference to the first aspect or the first possible implementation of the first aspect, in a second possible implementation of the first aspect, the at least two transport blocks include a first transport block and a second transport block; and the first indication information indicates that a first parameter in the at least one parameter is corresponding to a plurality of parameter values, and parameter values of first parameters corresponding to the first transport block and the second transport block are different; and/or the first indication information indicates that a second parameter in the at least one parameter is corresponding to one parameter value, and parameter values of second parameters corresponding to the first transport block and the second transport block are the same. Parameters of all transport blocks are used in combination, so that the terminal device can send the transport blocks to the network device by using a plurality of types of parameters.

In a possible implementation, the first indication information is used to indicate a joint identifier corresponding to the at least two transport blocks, and the determining, by the terminal device, the at least two transport blocks based on the first indication information includes: determining, by the terminal device, transport blocks that are in a plurality of transport blocks and whose identifiers are associated with the joint identifier indicated by the first indication information, as the at least two transport blocks; or determining, by the terminal device, transport blocks whose identifiers are the same as the joint identifier indicated by the first indication information, as the at least two transport blocks.

In a possible implementation, the terminal device receives downlink control information (DCI), where the DCI includes the joint identifier, and the DCI is used to indicate the at least two transport blocks.

With reference to any one of the first aspect to the second possible implementation of the first aspect, in a third possible implementation of the first aspect, the at least two transport blocks include a first transport block and a second transport block, the first transport block and the second transport block satisfy at least one of the following: the first transport block and the second transport block are mapped to different port number groups, where port numbers included in the different port number groups are different; the first transport block and the second transport block are corresponding to different reference signal groups, where reference signals included in the different reference signal groups are different; the first transport block and the second transport block are mapped to different BWPs, where indexes of the different BWPs are different; and the first transport block and the second transport block are scrambled by using different network identifiers.

With reference to any one of the first aspect to the third possible implementation of the first aspect, in a fourth possible implementation of the first aspect, the determining, by a terminal device, at least two transport blocks includes: determining, by the terminal device, second indication information, where the second indication information is used to indicate a parameter value of at least one parameter corresponding to the at least two transport blocks, and the at least one parameter includes one or more of the following parameters: a transport block size, a hybrid automatic repeat request (HARQ) process number, a new data indicator (NDI), a HARQ-acknowledgment (ACK) resource, a redundancy version (RV), a time domain resource and/or a frequency domain resource, a first timer start time, and a joint identifier, where the joint identifier is used to indicate transport blocks used for joint decoding; and determining, by the terminal device, the at least two transport blocks based on the second indication information. The at least two transport blocks are sent to the network device by using a parameter indicated by the second indication information. This helps the network device to determine that the received transport blocks can be used for joint decoding, to decode the first information transmitted by using the at least two transport blocks.

With reference to any one of the first aspect to the fourth possible implementation of the first aspect, in a fifth possible implementation of the first aspect, the at least two transport blocks include a first transport block and a second transport block; the second indication information indicates that a third parameter in the at least one parameter is corresponding to a plurality of parameter values, and parameter values of third parameters corresponding to the first transport block and the second transport block are different; and/or the second indication information indicates that a fourth parameter in the at least one parameter is corresponding to one parameter value, and parameter values of fourth parameters corresponding to the first transport block and the second transport block are the same.

With reference to any one of the first aspect to the fifth possible implementation of the first aspect, in a sixth possible implementation of the first aspect, the at least two transport blocks satisfy at least one of the following: sizes of the at least two transport blocks are equal to the transport block size indicated by the second indication information; the at least two transport blocks are transport blocks received by the network device within the first timer start time indicated by the second indication information; the at least two transport blocks are transport blocks received by the network device on the time domain resource and/or the frequency domain resource indicated by the second indication information; the at least two transport blocks are transport blocks received by the network device based on the hybrid automatic repeat request (HARQ) process number indicated by the second indication information; the at least two transport blocks are determined by the network device based on the new data indicator (NDI) indicated by the second indication information; the at least two transport blocks are received by the network device on the HARQ-ACK resource indicated by the second indication information; and a redundancy version (RV) corresponding to the at least two transport blocks is the RV indicated by the second indication information.

With reference to any one of the first aspect to the sixth possible implementation of the first aspect, in a seventh possible implementation of the first aspect, the at least two transport blocks are corresponding to at least one first uplink channel, and the method provided in this application further includes: determining, by the terminal device, a priority of the at least one first uplink channel, where the priority of the first uplink channel is used for uplink power allocation. Optionally, the method provided in this application further includes: allocating, by the terminal device, uplink power to the at least two transport blocks based on the priority of the at least one first uplink channel. Because there is an upper limit of maximum allowable transmit power for transmit power of the terminal device, the uplink power is allocated to the at least two transport blocks based on the priority of the at least one first uplink channel. In this way, power allocated to a transport block corresponding to a first uplink channel with a higher priority can be higher than power allocated to a transport block corresponding to a first uplink channel with a lower priority.

With reference to any one of the first aspect to the seventh possible implementation of the first aspect, in an eighth possible implementation of the first aspect, the determining, by the terminal device, a priority of the at least one first uplink channel includes: determining, by the terminal device, a parameter value of at least one parameter corresponding to the at least one first uplink channel, where the at least one parameter includes one or more of the following parameters: a modulation and coding scheme, a physical downlink control channel (PDCCH) control channel element (CCE) level, initially configured transmit power $P_{O\_PUSCH}$, a path-loss-value scale factor and/or a path loss value, and a cell, a carrier, or a BWP corresponding to the at least one first uplink channel; and determining, by the terminal device, the priority of the at least one first uplink channel based on the parameter value of the at least one parameter of the at least one first uplink channel. In this way, a manner in which the terminal device determines the priority of the first uplink channel can be more flexible.

With reference to any one of the first aspect to the eighth possible implementation of the first aspect, in a ninth possible implementation of the first aspect, second information is transmitted by using at least one second uplink channel, the second information is different from the first information, and a time domain position of the at least one second uplink channel overlaps a time domain position of the at least one first uplink channel; and the priority of the first uplink channel is higher than a priority of the second uplink channel. By preferentially allocating uplink power to a first uplink channel with a higher priority, reliable sending of a transport block corresponding to the first uplink channel with a higher priority can be ensured.

With reference to the first aspect to the ninth possible implementation of the first aspect, in a tenth possible implementation of the first aspect, a quantity of second uplink channels is less than a quantity of first uplink channels.

With reference to any one of the first aspect to the tenth possible implementation of the first aspect, in an eleventh possible implementation of the first aspect, transmit power of the at least one first uplink channel is greater than or equal to maximum transmit power; or a sum of transmit power of the at least one first uplink channel and transmit power of the second uplink channel is greater than or equal to maximum transmit power.

With reference to any one of the first aspect to the eleventh possible implementation of the first aspect, in a twelfth possible implementation of the first aspect, the terminal device determines the priority of the at least one first uplink channel based on the modulation and coding scheme of the at least one first uplink channel; the terminal device determines the priority of the at least one first uplink channel based on the physical downlink control channel (PDCCH) control channel element (CCE) level corresponding to the at least one first uplink channel; the terminal device determines the priority of the at least one first uplink channel based on the initially configured transmit power $P_{O\_PUSCH}$ of the at least one first uplink channel; the terminal device determines the priority of the at least one first uplink channel based on the path-loss-value scale factor and/or the path loss value of the at least one first uplink channel; or the terminal device determines the priority of the at least one first uplink channel based on the cell, the carrier, or the BWP corresponding to the at least one first uplink channel.

With reference to any one of the first aspect to the twelfth possible implementation of the first aspect, in a thirteenth possible implementation of the first aspect, the determining, by the terminal device, the priority of the at least one first uplink channel based on the modulation and coding scheme of the at least one first uplink channel includes: the at least one first uplink channel includes a first uplink channel A and a first uplink channel B, a priority of the first uplink channel A is higher than a priority of the first uplink channel B, and the first uplink channel A and the first uplink channel B satisfy at least one of the following: a modulation order in a modulation and coding scheme of the first uplink channel A is higher than a modulation order in a modulation and coding scheme of the first uplink channel B; a code rate in the modulation and coding scheme of the first uplink channel A is less than a code rate in the modulation and coding scheme of the first uplink channel B; a block error rate (BLER) corresponding to the modulation and coding scheme of the first uplink channel A is less than a block error rate (BLER) corresponding to the modulation and coding scheme of the first uplink channel B; and a priority of a first modulation and coding scheme table corresponding to the modulation and coding scheme of the first uplink channel A is higher than a priority of a first modulation and coding scheme table corresponding to the modulation and coding scheme of the first uplink channel B.

With reference to any one of the first aspect to the thirteenth possible implementation of the first aspect, in a fourteenth possible implementation of the first aspect, the determining, by the terminal device, the priority of the at least one first uplink channel based on the physical downlink control channel (PDCCH) control channel element (CCE) level corresponding to the at least one first uplink channel includes: the at least one first uplink channel includes a first uplink channel A and a first uplink channel B, a priority of the first uplink channel A is higher than a priority of the first uplink channel B, and a physical downlink control channel (PDCCH) control channel element (CCE) level of the first uplink channel A is higher than a physical downlink control channel (PDCCH) control channel element (CCE) level of the first uplink channel B.

With reference to any one of the first aspect to the fourteenth possible implementation of the first aspect, in a fifteenth possible implementation of the first aspect, the determining, by the terminal device, the priority of the at least one first uplink channel based on the initially configured transmit power $P_{O\_PUSCH}$ of the at least one first uplink channel includes: the at least one first uplink channel includes a first uplink channel A and a first uplink channel B, a priority of the first uplink channel A is higher than a priority of the first uplink channel B, and $P_{O\_PUSCH}$ of the first uplink channel A is lower than $P_{O\_PUSCH}$ of the first uplink channel B.

With reference to any one of the first aspect to the fifteenth possible implementation of the first aspect, in a sixteenth possible implementation of the first aspect, the determining, by the terminal device, the priority of the at least one first uplink channel based on the path-loss-value scale factor and/or the path loss value of the at least one first uplink channel includes: the at least one first uplink channel includes a first uplink channel A and a first uplink channel B, a priority of the first uplink channel A is higher than a priority of the first uplink channel B, a path-loss-value scale factor of the first uplink channel A is less than a path-loss-value scale factor of the first uplink channel B, and/or a path loss value of the first uplink channel A is less than a path loss value of the first uplink channel B.

With reference to any one of the first aspect to the sixteenth possible implementation of the first aspect, in a seventeenth possible implementation of the first aspect, the determining, by the terminal device, the priority of the at least one first uplink channel based on the cell, the carrier, or the BWP corresponding to the at least one first uplink channel includes: the at least one first uplink channel includes a first uplink channel A and a first uplink channel B, a priority of the first uplink channel A is higher than a priority of the first uplink channel B, and the first uplink channel A and the first uplink channel B include one of the following: a cell in which the first uplink channel A is located is a primary cell Pcell, and a cell in which the first uplink channel B is located is a secondary cell Scell; a carrier index number of a carrier on which the first uplink channel A is located is less than a carrier index number of a carrier on which the first uplink channel B is located; and a BWP index number of a BWP in which the first uplink channel A is located is less than a BWP index number of a BWP in which the first uplink channel B is located, or the BWP in which the first uplink channel A is located is an active BWP, and the BWP in which the first uplink channel B is located is an initial BWP.

With reference to any one of the first aspect to the seventeenth possible implementation of the first aspect, in an eighteenth possible implementation of the first aspect, the at least two transport blocks belong to a first transport block group, and the method provided in this application further includes: determining, by the terminal device, third indication information, where the third indication information is used to indicate a parameter value of at least one parameter corresponding to a second transport block group, second information transmitted by using at least one transport block included in the second transport block group is different from the first information, and time domain resources on which the first transport block group and the second transport block group are located partially or completely overlap. Optionally, the method provided in this application further includes: transmitting, by the terminal device, the second transport block group to the network device by using the parameter value of the at least one parameter indicated by the third indication information, where the second transport block group carries the second information.

With reference to any one of the first aspect to the eighteenth possible implementation of the first aspect, in a nineteenth possible implementation of the first aspect, one of the at least two transport blocks is used for initial transmission, and a transport block, other than the one transport block, in the at least two transport blocks is used for retransmission; the at least two transport blocks are used for retransmission; or the at least two transport blocks are used for initial transmission.

With reference to any one of the first aspect to the nineteenth possible implementation of the first aspect, in a twentieth possible implementation of the first aspect, before the determining, by a terminal device, at least two transport blocks, the method provided in this application further includes: receiving, by the terminal device, first configuration information, where the first configuration information is used to configure information that the terminal device can perform duplicate transmission by using two or more transport blocks, and the information includes at least one of data and control information. The terminal device receives the first configuration information, so that the terminal device has a function of sending information on the two or more transport blocks.

With reference to any one of the first aspect to the twentieth possible implementation of the first aspect, in a twenty-first possible implementation of the first aspect, time domain resources on which the at least two transport blocks are located partially or completely overlap.

According to a second aspect, this application provides an information receiving method, including: receiving, by a network device, at least two transport blocks sent by a terminal device; and decoding, by the network device, first information transmitted by using the at least two transport blocks, where the at least two transport blocks carry the first information, and the first information includes at least one of data and control information; and the decoding, by the network device, first information transmitted by using the at least two transport blocks includes: decoding, by the network device, at least one of the at least two transport blocks to obtain the first information; and/or jointly decoding, by the network device, a plurality of transport blocks in the at least two transport blocks to obtain the first information.

With reference to the second aspect, in a first possible implementation of the second aspect, the method provided in this application further includes: sending, by the network device, first indication information to the terminal device, where the first indication information is used to indicate a parameter value of at least one parameter corresponding to the at least two transport blocks, and the at least one parameter includes one or more of the following parameters: a first time period, a bandwidth part (BWP), a precoding matrix parameter, a network identifier, a reference signal, a cell index, and a joint identifier, where the joint identifier is used to indicate transport blocks used for joint decoding.

With reference to the second aspect or the first possible implementation of the second aspect, in a second possible implementation of the second aspect, the at least two transport blocks include a first transport block and a second transport block; and the first indication information indicates that a first parameter in the at least one parameter is corresponding to a plurality of parameter values, and parameter values of first parameters corresponding to the first transport block and the second transport block are different; and/or the first indication information indicates that a second parameter in the at least one parameter is corresponding to one parameter value, and parameter values of second parameters corresponding to the first transport block and the second transport block are the same.

With reference to any one of the second aspect to the second possible implementation of the second aspect, in a third possible implementation of the second aspect, the at least two transport blocks include a first transport block and a second transport block, the first transport block and the second transport block satisfy at least one of the following: the first transport block and the second transport block are mapped to different port number groups, where port numbers included in the different port number groups are different; the first transport block and the second transport block are corresponding to different reference signal groups, where reference signals included in the different reference signal groups are different; the first transport block and the second transport block are mapped to different BWPs, where indexes of the different BWPs are different; and the first transport block and the second transport block are scrambled by using different network identifiers.

With reference to any one of the second aspect to the third possible implementation of the second aspect, in a fourth possible implementation of the second aspect, the method provided in this application further includes: sending, by the network device, second indication information to the terminal device, where the second indication information is used to indicate a parameter value of at least one parameter corresponding to the at least two transport blocks, and the at least one parameter includes one or more of the following parameters: a transport block size, a hybrid automatic repeat request (HARQ) process number, an NDI, an HARQ-acknowledgment (ACK) resource, a redundancy version (RV), a time domain resource and/or a frequency domain resource, a first timer start time, and a joint identifier, where the joint identifier is used to indicate transport blocks used for joint decoding.

With reference to any one of the second aspect to the fourth possible implementation of the second aspect, in a fifth possible implementation of the second aspect, the at least two transport blocks include a first transport block and a second transport block; the second indication information indicates that a third parameter in the at least one parameter is corresponding to a plurality of parameter values, and parameter values of third parameters corresponding to the first transport block and the second transport block are different; and/or the second indication information indicates that a fourth parameter in the at least one parameter is corresponding to one parameter value, and parameter values of fourth parameters corresponding to the first transport block and the second transport block are the same.

With reference to any one of the second aspect to the fifth possible implementation of the second aspect, in a sixth possible implementation of the second aspect, the at least two transport blocks satisfy at least one of the following: sizes of the at least two transport blocks are equal to the transport block size indicated by the second indication information; the at least two transport blocks are transport blocks received by the network device within the first timer start time indicated by the second indication information; the at least two transport blocks are transport blocks received by the network device on the time domain resource and/or the frequency domain resource indicated by the second indication information; the at least two transport blocks are transport blocks received by the network device based on the hybrid automatic repeat request (HARQ) process number indicated by the second indication information; the at least two transport blocks are determined by the network device based on the NDI indicated by the second indication information; the at least two transport blocks are received by the network device on the HARQ-ACK resource indicated by the second indication information; and a redundancy version RV corresponding to the at least two transport blocks is the RV indicated by the second indication information.

With reference to any one of the second aspect to the sixth possible implementation of the second aspect, in a seventh possible implementation of the second aspect, the at least two transport blocks are used for initial transmission, and the decoding, by the network device, first information transmitted by using the at least two transport blocks includes: decoding, by the network device, at least one transport block used for initial transmission in the at least two transport blocks, to obtain the first information; and/or jointly decoding, by the network device, a plurality of transport blocks used for initial transmission in the at least two transport blocks, to obtain the first information.

With reference to any one of the second aspect to the seventh possible implementation of the second aspect, in an eighth possible implementation of the second aspect, the at least two transport blocks are used for retransmission, and the decoding, by the network device, first information transmitted by using the at least two transport blocks includes: decoding, by the network device, at least one transport block used for retransmission in the at least two transport blocks, to obtain the first information; and/or jointly decoding, by the network device, a plurality of transport blocks used for retransmission in the at least two transport blocks, to obtain the first information.

With reference to any one of the second aspect to the eighth possible implementation of the second aspect, in a ninth possible implementation of the second aspect, one of the at least two transport blocks is used for initial transmission, a transport block, other than the one transport block, in the at least two transport blocks is used for retransmission, and the decoding, by the network device, first information transmitted by using the at least two transport blocks includes: decoding, by the network device, one transport block used for initial transmission in the at least two transport blocks and at least one transport block used for retransmission in the at least two transport blocks, to obtain the first information; and/or jointly decoding, by the network device, the transport block used for initial transmission and the at least one transport block used for retransmission, to obtain the first information.

With reference to any one of the second aspect to the ninth possible implementation of the second aspect, in a tenth possible implementation of the second aspect, the network device sends first configuration information to the terminal device, where the first configuration information is used to perform configuration, so that the terminal device can send information by using two or more transport blocks, and the information includes at least one of data and control information.

With reference to any one of the second aspect to the tenth possible implementation of the second aspect, in an eleventh possible implementation of the second aspect, the at least two transport blocks belong to a first transport block group, and the method provided in this application further includes: receiving, by the network device, second information sent by the terminal device by using at least one transport block included in a second transport block group, where the second information is different from the first information, and time domain resources on which the first transport block group and the second transport block group are located partially or completely overlap; and decoding, by the network device, the second information transmitted by using the second transport block group.

With reference to any one of the second aspect to the eleventh possible implementation of the second aspect, in a twelfth possible implementation of the second aspect, time domain resources on which the at least two transport blocks are located partially or completely overlap.

According to a third aspect, this application provides a wireless apparatus. For example, the wireless apparatus may be an information sending apparatus, and the information sending apparatus can implement the information sending method described in any one of the first aspect to the twenty-first possible implementation of the first aspect. For example, the information sending apparatus may be a terminal device or a chip disposed in a terminal device. The foregoing method may be implemented by software, hardware, or hardware executing corresponding software.

According to the third aspect, the information sending apparatus includes: a determining unit, configured to determine at least two transport blocks; and a sending unit, configured to send first information to a network device by using the at least two transport blocks, where the first information includes at least one of data and control information, where each of the at least two transport blocks carries the first information.

With reference to the third aspect, in a first possible implementation of the third aspect, the determining unit is further configured to determine first indication information, where the first indication information is used to indicate a parameter value of at least one parameter corresponding to the at least two transport blocks, and the at least one parameter includes one or more of the following parameters: a first time period, a bandwidth part (BWP), a precoding matrix parameter, a network identifier, a reference signal, a cell index, and a joint identifier, where the joint identifier is used to indicate transport blocks used for joint decoding; and the determining unit is further configured to determine the at least two transport blocks based on the first indication information.

With reference to the third aspect or the first possible implementation of the third aspect, in a second possible implementation of the third aspect, the at least two transport blocks include a first transport block and a second transport block; and the first indication information indicates that a first parameter in the at least one parameter is corresponding to a plurality of parameter values, and parameter values of first parameters corresponding to the first transport block and the second transport block are different; and/or the first indication information indicates that a second parameter in the at least one parameter is corresponding to one parameter value, and parameter values of second parameters corresponding to the first transport block and the second transport block are the same.

In a possible implementation, the first indication information is used to indicate a joint identifier corresponding to the at least two transport blocks; and the determining unit is specifically configured to determine transport blocks that are in a plurality of transport blocks and whose identifiers are associated with the joint identifier indicated by the first indication information, as the at least two transport blocks; or the determining unit is specifically configured to determine transport blocks whose identifiers are the same as the joint identifier indicated by the first indication information, as the at least two transport blocks.

In a possible implementation, the apparatus further includes a receiving unit, configured to receive downlink control information (DCI), where the DCI includes the joint identifier, and the DCI is used to indicate the at least two transport blocks.

With reference to any one of the third aspect to the second possible implementation of the third aspect, in a third possible implementation of the third aspect, the at least two transport blocks include a first transport block and a second transport block, the first transport block and the second transport block satisfy at least one of the following: the first transport block and the second transport block are mapped to different port number groups, where port numbers included in the different port number groups are different; the first transport block and the second transport block are corresponding to different reference signal groups, where reference signals included in the different reference signal groups are different; the first transport block and the second transport block are mapped to different BWPs, where indexes of the different BWPs are different; and the first transport block and the second transport block are scrambled by using different network identifiers.

With reference to any one of the third aspect to the third possible implementation of the third aspect, in a fourth possible implementation of the third aspect, the determining unit is configured to determine second indication information, where the second indication information is used to indicate a parameter value of at least one parameter corresponding to the at least two transport blocks, and the at least one parameter includes one or more of the following parameters: a transport block size, a hybrid automatic repeat request (HARQ) process number, an NDI, an HARQ-acknowledgment (ACK) resource, a redundancy version (RV), a time domain resource and/or a frequency domain resource, a first timer start time, and a joint identifier, where the joint identifier is used to indicate transport blocks used for joint decoding; and the determining unit is further configured to determine the at least two transport blocks based on the second indication information.

With reference to any one of the third aspect to the fourth possible implementation of the third aspect, in a fifth possible implementation of the third aspect, the at least two transport blocks include a first transport block and a second transport block; the second indication information indicates that a third parameter in the at least one parameter is corresponding to a plurality of parameter values, and parameter values of third parameters corresponding to the first transport block and the second transport block are different; and/or the second indication information indicates that a fourth parameter in the at least one parameter is corresponding to one parameter value, and parameter values of fourth parameters corresponding to the first transport block and the second transport block are the same.

With reference to any one of the third aspect to the fifth possible implementation of the third aspect, in a sixth possible implementation of the third aspect, the at least two transport blocks satisfy at least one of the following: sizes of the at least two transport blocks are equal to the transport block size indicated by the second indication information; the at least two transport blocks are transport blocks received by the network device within the first timer start time indicated by the second indication information; the at least two transport blocks are transport blocks received by the network device on the time domain resource and/or the frequency domain resource indicated by the second indication information; the at least two transport blocks are transport blocks received by the network device based on the hybrid automatic repeat request (HARQ) process number indicated by the second indication information; the at least two transport blocks are determined by the network device based on the NDI indicated by the second indication information; the at least two transport blocks are received by the network device on the HARQ-ACK resource indicated by the second indication information; and a redundancy version (RV) corresponding to the at least two transport blocks is the RV indicated by the second indication information.

With reference to any one of the third aspect to the sixth possible implementation of the third aspect, in a seventh possible implementation of the third aspect, the at least two transport blocks are corresponding to at least one first uplink channel, and the determining unit is further configured to determine a priority of the at least one first uplink channel, where the priority of the first uplink channel is used for uplink power allocation.

With reference to any one of the third aspect to the seventh possible implementation of the third aspect, in an eighth possible implementation of the third aspect, the determining unit is specifically configured to determine a parameter value of at least one parameter corresponding to the at least one first uplink channel, where the at least one parameter includes one or more of the following parameters: a modulation and coding scheme, a physical downlink control channel (PDCCH) control channel element (CCE) level, initially configured transmit power $P_{O\_PUSCH}$, a path-loss-value scale factor and/or a path loss value, and a cell, a carrier, or a BWP corresponding to the at least one first uplink channel; and the determining unit is further specifically configured to determine the priority of the at least one first uplink channel based on the parameter value of the at least one parameter of the at least one first uplink channel.

With reference to any one of the third aspect to the eighth possible implementation of the third aspect, in a ninth possible implementation of the third aspect, second information is transmitted by using at least one second uplink channel, the second information is different from the first information, and a time domain position of the at least one second uplink channel overlaps a time domain position of the at least one first uplink channel; and the priority of the first uplink channel is higher than a priority of the second uplink channel.

With reference to the third aspect to the ninth possible implementation of the third aspect, in a tenth possible implementation of the third aspect, a quantity of second uplink channels is less than a quantity of first uplink channels.

With reference to any one of the third aspect to the tenth possible implementation of the third aspect, in an eleventh possible implementation of the third aspect, transmit power of the at least one first uplink channel is greater than or equal to maximum transmit power; or a sum of transmit power of the at least one first uplink channel and transmit power of the second uplink channel is greater than or equal to maximum transmit power.

With reference to any one of the third aspect to the eleventh possible implementation of the third aspect, in a twelfth possible implementation of the third aspect, the terminal device determines the priority of the at least one first uplink channel based on the modulation and coding scheme of the at least one first uplink channel; the terminal device determines the priority of the at least one first uplink channel based on the physical downlink control channel (PDCCH) control channel element (CCE) level corresponding to the at least one first uplink channel; the terminal device determines the priority of the at least one first uplink channel based on the initially configured transmit power $P_{O\_PUSCH}$ of the at least one first uplink channel; the terminal device determines the priority of the at least one first uplink channel based on the path-loss-value scale factor and/or the path loss value of the at least one first uplink channel; or the terminal device determines the priority of the at least one first uplink channel based on the cell, the carrier, or the BWP corresponding to the at least one first uplink channel.

With reference to any one of the third aspect to the twelfth possible implementation of the third aspect, in a thirteenth possible implementation of the third aspect, the determining, by the terminal device, the priority of the at least one first uplink channel based on the modulation and coding scheme of the at least one first uplink channel includes: the at least one first uplink channel includes a first uplink channel A and a first uplink channel B, a priority of the first uplink channel A is higher than a priority of the first uplink channel B, and the first uplink channel A and the first uplink channel B include at least one of the following: a modulation order in a modulation and coding scheme of the first uplink channel A is higher than a modulation order in a modulation and coding scheme of the first uplink channel B; a code rate in the modulation and coding scheme of the first uplink channel A is less than a code rate in the modulation and coding scheme of the first uplink channel B; a block error rate (BLER) corresponding to the modulation and coding scheme of the first uplink channel A is less than a block error rate (BLER) corresponding to the modulation and coding scheme of the first uplink channel B; and a priority of a first modulation and coding scheme table corresponding to the modulation and coding scheme of the first uplink channel A is higher than a priority of a first modulation and coding scheme table corresponding to the modulation and coding scheme of the first uplink channel B.

With reference to any one of the third aspect to the thirteenth possible implementation of the third aspect, in a fourteenth possible implementation of the third aspect, the determining, by the terminal device, the priority of the at least one first uplink channel based on the physical downlink control channel (PDCCH) control channel element (CCE) level corresponding to the at least one first uplink channel includes: the at least one first uplink channel includes a first uplink channel A and a first uplink channel B, a priority of the first uplink channel A is higher than a priority of the first uplink channel B, and a physical downlink control channel (PDCCH) control channel element (CCE) level of the first uplink channel A is higher than a physical downlink control channel PDCCH control channel element CCE level of the first uplink channel B.

With reference to any one of the third aspect to the fourteenth possible implementation of the third aspect, in a fifteenth possible implementation of the third aspect, the determining, by the terminal device, the priority of the at least one first uplink channel based on the initially configured transmit power $P_{O\_PUSCH}$ of the at least one first uplink channel includes: the at least one first uplink channel includes a first uplink channel A and a first uplink channel B, a priority of the first uplink channel A is higher than a priority of the first uplink channel B, and $P_{O\_PUSCH}$ of the first uplink channel A is lower than $P_{O\_PUSCH}$ of the first uplink channel B.

With reference to any one of the third aspect to the fifteenth possible implementation of the third aspect, in a sixteenth possible implementation of the third aspect, the determining, by the terminal device, the priority of the at least one first uplink channel based on the path-loss-value scale factor and/or the path loss value of the at least one first uplink channel includes: the at least one first uplink channel includes a first uplink channel A and a first uplink channel B, a priority of the first uplink channel A is higher than a priority of the first uplink channel B, a path-loss-value scale factor of the first uplink channel A is less than a path-loss-value scale factor of the first uplink channel B, and/or a path loss value of the first uplink channel A is less than a path loss value of the first uplink channel B.

With reference to any one of the third aspect to the sixteenth possible implementation of the third aspect, in a seventeenth possible implementation of the third aspect, the determining, by the terminal device, the priority of the at least one first uplink channel based on the cell, the carrier, or the BWP corresponding to the at least one first uplink channel includes: the at least one first uplink channel includes a first uplink channel A and a first uplink channel B, a priority of the first uplink channel A is higher than a priority of the first uplink channel B, and the first uplink channel A and the first uplink channel B include one of the following: a cell in which the first uplink channel A is located is a primary cell Pcell, and a cell in which the first uplink channel B is located is a secondary cell Scell; a carrier index number of a carrier on which the first uplink channel A is located is less than a carrier index number of a carrier on which the first uplink channel B is located; and a BWP index number of a BWP in which the first uplink channel A is located is less than a BWP index number of a BWP in which the first uplink channel B is located, or the BWP in which the first uplink channel A is located is an active BWP, and the BWP in which the first uplink channel B is located is an initial BWP.

With reference to any one of the third aspect to the seventeenth possible implementation of the third aspect, in an eighteenth possible implementation of the third aspect, the at least two transport blocks belong to a first transport block group, and the apparatus provided in this application further includes: a receiving unit, configured to determine third indication information, where the third indication information is used to indicate a parameter value of at least one parameter corresponding to a second transport block group, second information transmitted by using at least one transport block included in the second transport block group is different from the first information, and time domain resources on which the first transport block group and the second transport block group are located partially or completely overlap. Optionally, the sending unit is further configured to transmit the second transport block group to the network device by using the parameter value of the at least one parameter indicated by the third indication information, where the second transport block group carries the second information.

With reference to any one of the third aspect to the eighteenth possible implementation of the third aspect, in a nineteenth possible implementation of the third aspect, one of the at least two transport blocks is used for initial transmission, and a transport block, other than the one transport block, in the at least two transport blocks is used for retransmission; the at least two transport blocks are used for retransmission; or the at least two transport blocks are used for initial transmission.

With reference to any one of the third aspect to the nineteenth possible implementation of the third aspect, in a twentieth possible implementation of the third aspect, the receiving unit provided in this application is further configured to receive first configuration information, where the first configuration information is used to configure information that the terminal device can perform duplicate transmission by using two or more transport blocks, and the information includes at least one of data and control information.

With reference to any one of the third aspect to the twentieth possible implementation of the third aspect, in a twenty-first possible implementation of the third aspect, time domain resources on which the at least two transport blocks are located partially or completely overlap.

In addition, this application further provides a wireless apparatus. The wireless apparatus includes a processor and a transmitter, where the processor is configured to determine at least two transport blocks, and the transmitter is further configured to send first information to a network device by using the at least two transport blocks, where each of the at least two transport blocks carries the first information.

Optionally, the transmitter is configured to support the wireless apparatus in implementing the operation of sending information/data on the wireless apparatus side described in any one of the first aspect to the twenty-first possible implementation of the first aspect. Optionally, the apparatus further includes a receiver, configured to support the wireless apparatus in implementing the operation of receiving information/data on the wireless apparatus side described in any one of the first aspect to the twenty-first possible implementation of the first aspect. The processor is further configured to perform the operation of processing information/data on the wireless apparatus side described in any one of the first aspect to the twenty-first possible implementation of the first aspect. Optionally, the service transmission apparatus in this application further includes a bus and a memory, where the memory is configured to store code and data, and the processor, the receiver, the transmitter, and the memory are coupled by using the bus.

According to a fourth aspect, in a possible design, the information sending apparatus may be a terminal device or a chip disposed in a terminal device, and the information sending apparatus may include at least one processor. The at least one processor is configured to execute an instruction to support the information sending apparatus in performing a related operation of message processing or control performed on the information sending apparatus side in the method described in any one of the first aspect to the twenty-first possible implementations of the first aspect. Optionally, the apparatus may further include a memory, where the memory is configured to couple to the at least one processor, and stores a program (instruction) and data that are necessary for the apparatus. In addition, optionally, the information transmission apparatus may further include a communications interface, configured to support communication between the information sending apparatus and another network element (for example, a network device). The communications interface may be a transceiver circuit, where the transceiver circuit is configured to support the information sending apparatus in performing related operations of message receiving and sending performed on the information sending apparatus side in the method described in any one of the first aspect to the twenty-first possible implementation of the first aspect. Optionally, the information sending apparatus may further include a bus, and the memory, the communications interface, and the at least one processor may be connected to each other by using the bus.

According to a fifth aspect, this application provides an information receiving apparatus. The information sending apparatus can implement the information receiving method described in any one of the second aspect to the twelfth possible implementation of the second aspect. For example, the information receiving apparatus may be a network device or a chip disposed in a network device. The foregoing method may be implemented by software, hardware, or hardware executing corresponding software.

According to the fifth aspect, this application provides the information receiving apparatus, including: a receiving unit, configured to receive at least two transport blocks sent by a terminal device; and a decoding unit, configured to decode first information transmitted by using the at least two transport blocks, where the at least two transport blocks carry the first information, and the first information includes at least one of data and control information; and the decoding unit is specifically configured to perform the following steps: decoding at least one of the at least two transport blocks to obtain the first information, and/or jointly decoding a plurality of transport blocks in the at least two transport blocks to obtain the first information.

With reference to the fifth aspect, in a first possible implementation of the fifth aspect, the apparatus provided in this application further includes a sending unit, configured to send first indication information to the terminal device, where the first indication information is used to indicate a parameter value of at least one parameter corresponding to the at least two transport blocks, and the at least one parameter includes one or more of the following parameters: a first time period, a bandwidth part (BWP), a precoding matrix parameter, a network identifier, a reference signal, a cell index, and a joint identifier, where the joint identifier is used to indicate transport blocks used for joint decoding.

With reference to the fifth aspect or the first possible implementation of the fifth aspect, in a second possible implementation of the fifth aspect, the at least two transport blocks include a first transport block and a second transport block; and the first indication information indicates that a first parameter in the at least one parameter is corresponding to a plurality of parameter values, and parameter values of first parameters corresponding to the first transport block and the second transport block are different; and/or the first indication information indicates that a second parameter in the at least one parameter is corresponding to one parameter value, and parameter values of second parameters corresponding to the first transport block and the second transport block are the same.

With reference to any one of the fifth aspect to the second possible implementation of the fifth aspect, in a third possible implementation of the fifth aspect, the at least two transport blocks include a first transport block and a second transport block, the first transport block and the second transport block satisfy at least one of the following: the first transport block and the second transport block are mapped to different port number groups, where port numbers included in the different port number groups are different; the first transport block and the second transport block are corresponding to different reference signal groups, where reference signals included in the different reference signal groups are different; the first transport block and the second transport block are mapped to different BWPs, where indexes of the different BWPs are different; and the first transport block and the second transport block are scrambled by using different network identifiers.

With reference to any one of the fifth aspect to the third possible implementation of the fifth aspect, in a fourth possible implementation of the fifth aspect, the sending unit is further configured to send second indication information to the terminal device, where the second indication information is used to indicate a parameter value of at least one parameter corresponding to the at least two transport blocks, and the at least one parameter includes one or more of the following parameters: a transport block size, a hybrid automatic repeat request (HARQ) process number, an NDI, an HARQ-acknowledgment (ACK) resource, a redundancy version (RV), a time domain resource and/or a frequency domain resource, a first timer start time, and a joint identifier, where the joint identifier is used to indicate transport blocks used for joint decoding.

With reference to any one of the fifth aspect to the fourth possible implementation of the fifth aspect, in a fifth possible implementation of the fifth aspect, the at least two transport blocks include a first transport block and a second transport block; the second indication information indicates that a third parameter in the at least one parameter is corresponding to a plurality of parameter values, and parameter values of third parameters corresponding to the first transport block and the second transport block are different; and/or the second indication information indicates that a fourth parameter in the at least one parameter is corresponding to one parameter value, and parameter values of fourth parameters corresponding to the first transport block and the second transport block are the same.

With reference to any one of the fifth aspect to the fifth possible implementation of the fifth aspect, in a sixth possible implementation of the fifth aspect, the at least two transport blocks satisfy at least one of the following: sizes of the at least two transport blocks are equal to the transport block size indicated by the second indication information; the at least two transport blocks are transport blocks received by the network device within the first timer start time indicated by the second indication information; the at least two transport blocks are transport blocks received by the network device on the time domain resource and/or the frequency domain resource indicated by the second indication information; the at least two transport blocks are transport blocks received by the network device based on the hybrid automatic repeat request (HARQ) process number indicated by the second indication information; the at least two transport blocks are determined by the network device based on the NDI indicated by the second indication information; the at least two transport blocks are received by the network device on the HARQ-ACK resource indicated by the second indication information; and a redundancy version (RV) corresponding to the at least two transport blocks is the RV indicated by the second indication information.

With reference to any one of the fifth aspect to the sixth possible implementation of the fifth aspect, in a seventh possible implementation of the fifth aspect, the at least two transport blocks are used for initial transmission, and the decoding unit is specifically configured to perform the following steps: decoding at least one transport block used for initial transmission in the at least two transport blocks, to obtain the first information; and/or jointly decoding a plurality of transport blocks used for initial transmission in the at least two transport blocks, to obtain the first information.

With reference to any one of the fifth aspect to the seventh possible implementation of the fifth aspect, in an eighth possible implementation of the fifth aspect, the at least two transport blocks are used for retransmission, and the decoding unit is specifically configured to perform the following steps: decoding at least one transport block used for retransmission in the at least two transport blocks, to obtain the first information; and/or jointly decoding a plurality of transport blocks used for retransmission in the at least two transport blocks, to obtain the first information.

With reference to any one of the fifth aspect to the eighth possible implementation of the fifth aspect, in a ninth possible implementation of the fifth aspect, one of the at least two transport blocks is used for initial transmission, a transport block, other than the one transport block, in the at least two transport blocks is used for retransmission, and the decoding unit is specifically configured to perform the following steps: decoding one transport block used for initial transmission in the at least two transport blocks and at least one transport block used for retransmission in the at least two transport blocks, to obtain the first information; and/or jointly decoding the transport block used for initial transmission and the at least one transport block used for retransmission, to obtain the first information.

With reference to any one of the fifth aspect to the ninth possible implementation of the fifth aspect, in a tenth possible implementation of the fifth aspect, the sending unit is specifically configured to send first configuration information to the terminal device, the network device sends first configuration information to the terminal device, where the first configuration information is used to configure information that the terminal device can perform duplicate transmission by using two or more transport blocks, and the information includes at least one of data and control information.

With reference to any one of the fifth aspect to the tenth possible implementation of the fifth aspect, in an eleventh possible implementation of the fifth aspect, the at least two transport blocks belong to a first transport block group, and the sending unit provided in this application is further configured to send third indication information to the terminal device, where the third indication information is used to indicate a parameter value of at least one parameter corresponding to a second transport block group, second information transmitted by using the second transport block group is different from the first information, and time domain resources on which the first transport block group and the second transport block group are located partially or completely overlap. Optionally, the receiving unit provided in this application is configured to receive the second transport block group sent by the terminal device, and the decoding unit is further configured to decode the second information transmitted by using the second transport block group.

With reference to any one of the fifth aspect to the eleventh possible implementation of the fifth aspect, in a twelfth possible implementation of the fifth aspect, time domain resources on which the at least two transport blocks are located partially or completely overlap.

In addition, this application further provides a wireless apparatus. The wireless apparatus includes a processor and a receiver. The receiver is configured to receive at least two transport blocks sent by a terminal device. The processor is configured to decode first information transmitted by using the at least two transport blocks, where the first information includes at least one of data and control information, and the processor is specifically configured to perform the following steps: decoding at least one of the at least two transport blocks to obtain the first information, and/or jointly decoding a plurality of transport blocks in the at least two transport blocks to obtain the first information.

Optionally, the receiver is configured to support the wireless apparatus in implementing the operation of receiving information/data on the wireless apparatus side described in any one of the second aspect to the twelfth possible implementation of the second aspect. The apparatus further includes a transmitter, configured to support the wireless apparatus in implementing the operation of sending information/data on the wireless apparatus side described in any one of the second aspect to the twelfth possible implementation of the second aspect. The processor is further configured to perform the operation of processing information/data on the wireless apparatus side according to any one of the second aspect to the twelfth possible implementation of the second aspect. Optionally, the wireless apparatus in this application further includes a bus and a memory, where the memory is configured to store code and data, and the processor, the transmitter, the receiver, and the memory are connected by using the bus.

According to a sixth aspect, in a possible design, the information receiving apparatus may be a network device or a chip disposed in a network device, and the information receiving apparatus may include at least one processor. The at least one processor is configured to execute an instruction to support the information receiving apparatus in performing a related operation of message processing or control performed on the information receiving apparatus side in the method described in any one of the second aspect to the twelfth possible implementation of the second aspect.

Optionally, the apparatus may further include a memory, where the memory is configured to couple to the at least one processor, and stores a program (instruction) and data that are necessary for the apparatus. In addition, optionally, the information receiving apparatus may further include a communications interface, configured to support communication between the information receiving apparatus and another network element (for example, a terminal device). The communications interface may be a transceiver circuit, where the transceiver circuit is configured to support the information receiving apparatus in performing related operations of message receiving and sending performed on the information receiving apparatus side in the method described in any one of the second aspect to the twelfth possible implementation of the second aspect. Optionally, the information receiving apparatus may further include a bus, and the memory, the communications interface, and the at least one processor may be connected to each other by using the bus.

This application provides an information transmission system, including at least one terminal device described in any possible implementation of the third aspect and the network device described in any possible implementation of the fifth aspect.

According to a seventh aspect, this application provides a computer readable storage medium. The computer readable storage medium stores an instruction. When the instruction is run, the information sending method described in the first aspect to the twenty-first possible implementation of the first aspect is performed.

According to an eighth aspect, this application provides a computer readable storage medium. The computer readable storage medium stores an instruction. When the instruction is executed, the information receiving method described in the second aspect to the twelfth possible implementation of the second aspect is performed.

According to a ninth aspect, this application provides a computer program product including an instruction. The computer program product stores the instruction. When the instruction is run, a terminal device is enabled to perform the information sending method described in any one of the first aspect to the twenty-first possible implementation of the first aspect.

According to a tenth aspect, this application provides a computer program product including an instruction. The computer program product stores the instruction. When the instruction is run, a network device is enabled to perform the information receiving method described in any one of the second aspect to the twelfth possible implementation of the second aspect.

According to an eleventh aspect, this application provides a chip system, applied to an information sending apparatus. The chip system includes at least one processor and an interface circuit, where the interface circuit and the at least one processor are connected to each other by using a line, and the processor is configured to run an instruction to perform the information sending method described in any one of the first aspect to the twenty-first possible implementation of the first aspect.

According to a twelfth aspect, this application provides a chip system, applied to an information transmission apparatus. The chip system includes at least one processor and an interface circuit, where the interface circuit and the at least one processor are connected to each other by using a line, and the processor is configured to run an instruction to perform the information receiving method described in any one of the second aspect to the twelfth possible implementation of the second aspect.

Optionally, the chip system described above in this application further includes at least one memory, and the at least one memory stores an instruction.

DETAILED DESCRIPTION OF ILLUSTRATIVE EMBODIMENTS

Figure 1:
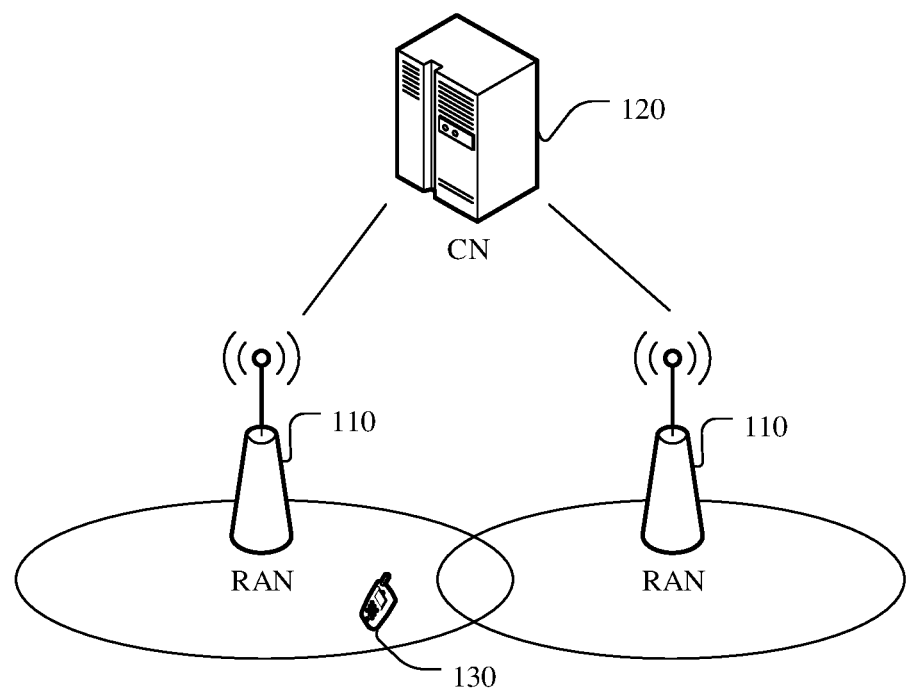
FIG. 1 shows an architecture of a communications system according to this application.

A joint decoding mechanism is a mechanism in which a receive end combines initially transmitted information and information retransmitted at least once or a plurality of pieces of retransmitted information to decode target information, and may also be referred to as combined decoding. This application provides an information transmission method and an apparatus, to resolve an issue that a service in a communications system requires quite high reliability, a relatively low error rate, for example, $10e^{-4}$, $10e^{-5}$, and $10e^{-6}$, and a low transmission latency. In the prior art, the joint decoding mechanism is usually used for data transmitted on one channel. Joint decoding mechanisms are generally classified into chase combing (CC) and incremental redundancy (IR). Chase combing can be understood as: In a pure HARQ mechanism, received error data packets are directly discarded. Although the error data packets cannot be correctly decoded independently, the error data packets still contain specific information. During chase combing (CC), this part of information is used. To be specific, a received error data packet is stored in a memory, and the error data packet is combined with a retransmitted data packet for decoding, thereby improving transmission efficiency. Incremental redundancy can be understood as: An information bit and a part of redundant bits are sent during the first transmission, while an additional redundant bit is sent through retransmission. If decoding fails during the first transmission, more redundant bits may be retransmitted to reduce a channel coding rate, thereby increasing a decoding success rate. If decoding still cannot be implemented normally after addition of retransmitted redundant bits, retransmission is performed again. As a quantity of times of retransmission increases, redundant bits are continually accumulated and a channel coding rate is continually reduced, thereby achieving a better decoding effect. In contrast, in this application, a terminal device transmits first information to a network device by using a plurality of transport blocks. In this way, after receiving the first information transmitted by using the plurality of transport blocks, the network device can combine, though HARQ combination, information carried in the plurality of transport blocks to determine the first information. "Combination" in this application may be chase combing, may be incremental redundancy combination, or may be another manner. This is not limited in this application. The method and the apparatus are based on a same inventive concept. Because problem-resolving principles of the method and the device are similar, for implementations of the device and the method, mutual reference may be made, and repeated content is not elaborated.

Because a performance gain can be brought by joint decoding by a receive end, a transmit end corresponding to the receive end needs to perform duplicate transmission. To be specific, the transmit end adds same information or information from a same information source to different transport blocks for sending. It can be understood that, when the transmit end is a terminal device and the receive end is a network device, duplicate transmission behavior of the terminal device needs to be indicated by the network device. In other words, the terminal device needs to determine, based on indication information, a transport block used for duplicate transmission of the first information. When the transmit end is a network device and the receive end is a terminal device, the network device may directly perform duplicate transmission, and send indication information before, during, or after the duplicate transmission, to instruct the terminal device to perform joint decoding, or indicate a performance benefit of joint decoding.

It should be noted that, in this application, the word "exemplary" or "for example" is used to represent giving an example, an illustration, or a description. Any embodiment or design scheme described as an "exemplary" or "for example" in this application should not be explained as being more preferred or having more advantages than another embodiment or design scheme. Exactly, use of the word "exemplary" or "example" or the like is intended to present a relative concept in a specific manner.

In this application, "of", "relevant", and "corresponding" may be used interchangeably sometimes. It should be noted that, meanings expressed by "of", "relevant", and "corresponding" are consistent when differences there between are not emphasized.

The term "a plurality of" in this application means two or more.

In this application, the terms "first", "second", and the like are merely used to distinguish different objects, but not limit a sequence thereof. For example, a first transport block and a second transport block are merely used to distinguish between different transport blocks, but do not limit a sequence of the first transport block and the second transport block.

Before this application is described, related terms used in this application are first described.

Joint/Combine: Combine generally involves combination of transport blocks or information in transport blocks. For example, a plurality of transport blocks (TB) are combined, and a part or the whole of information in a plurality of TBs is combined. Combined decoding can be understood as: Joint decoding or decoding is performed based on a plurality of transport blocks or information in a plurality of transport blocks, to obtain first information transmitted by using the plurality of transport blocks. There are a plurality of implementations. For example, some or all information separately transmitted by using a plurality of transport blocks overlaps, and a plurality of transport blocks are combined.

Duplicate: Duplicate generally involves repetition or duplication of transport blocks or information in transport blocks. For example, a plurality of transport blocks are combined, and a part or the whole of information in a plurality of TBs is same information. Duplicate transmission can be understood as: Same information is transmitted based on a plurality of transport blocks or information in a plurality of transport blocks, so that a receive end performs joint decoding or decoding. Duplicate transmission of same piece of first information is performed by using a plurality of transport blocks. There are a plurality of implementations. For example, each of a plurality of transport blocks is used for duplicate transmission of whole information of one transport block; each of a plurality of transport blocks is used for duplicate transmission of a part of information of one transport block; or a plurality of transport blocks are used to generate first information in different specific forms based on a same data source, for example, first information with different redundancy versions.

Initial transmission: Data/information sent by a terminal device to a network device or another terminal device for the first time or information received by a network device (another terminal device) for the first time is determined as initially transmitted information. In this case, the information received by the network device for the first time may alternatively be information retransmitted by the terminal device.

Retransmission: A terminal device retransmits error or lost data/information. The retransmitted information can be combined with initially transmitted information, and combined information is decoded.

Multi-carrier: which is also referred to as carrier aggregation (CA). Spectra of two or more component carriers are aggregated to obtain higher transmission bandwidth, and the spectrums of the component carriers may be adjacent continuous spectrums, or may be non-adjacent spectrums in a same frequency band, or even discontinuous spectrums in different frequency bands. User equipment may transmit or receive data according to a capability and a service requirement of the user equipment by simultaneously using a plurality of component carriers. In a CA system, carrier aggregation is performed in a same base station, or carrier aggregation is performed in a macro cell and a micro cell that have an ideal backhaul (backhaul). For example, the macro cell and the micro cell are connected by using an optical fiber (in this case, the micro cell may be a radio-frequency head). In this way, information carried on a plurality of carriers can be obtained by a base station in time, and a network device can perform joint scheduling on the plurality of carriers. In addition, downlink transmission in a plurality of cells in the CA system are synchronous with an error less than 260 ns.

For example, the terminal device may send information to a network device through a carrier 1 and a carrier 2 in a same time period by using a plurality of transport blocks, a plurality of code blocks, or a plurality of code block groups. For a TB, a code block (CB), or a plurality of code block groups (CBG), one CBG includes one or more CBs, and one TB includes one or more CBs, or may include one or more CBGs.

Multi-layer transmission: A massive-antenna technology MIMO is supported in an NR system, and resources for data transmission include a time domain resource, a frequency domain resource, and a space domain resource. In the multi-layer transmission, orthogonality of a space domain, that is, orthogonality of transmission channel space, is used, and the terminal device may send data to the network device by using a plurality of spatial channels. In current NR, one codeword (CW) may be mapped to a maximum of four layers. If transmission is based on more than four layers, two codewords CWs need to be mapped. In a standard, a CW is also referred to as a transport block.

Multi-bandwidth part (BWP) transmission: A BWP is introduced in NR, and a plurality of BWPs may be configured in one carrier. For current use of the BWP, refer to use of an LTE carrier, and details are not described in this application.

Higher layer signaling in this application may be signaling sent by a higher layer protocol layer, and the higher layer protocol layer is at least one of a plurality of protocol layers above a physical layer. For example, the higher layer protocol layer may specifically be at least one of the following protocol layers: a medium access control (MAC) layer, a radio link control (RLC) layer, a packet data convergence protocol (PDCP) layer, a radio resource control (RRC) layer, and a non-access stratum (NAS).

FIG. 1 shows an architecture of a communications system to which an information transmission method is applied according to this application. The communications system includes a terminal device 130. The terminal device 130 is connected to a wireless network to obtain a service of an external network (for example, an Internet) through the wireless network, or communicates with another terminal through the wireless network. The wireless network includes an access network (for example, a radio access network (RAN)) 110 and a core network (CN) 120. The RAN no is configured to connect the terminal device 130 to the wireless network, and the CN 120 is configured to manage the terminal device and provide a gateway for communicating with the external network.

The terminal device in this application may also be referred to as a terminal, or may also be referred to as user equipment (UE), an access terminal, a user unit, a user station, a mobile station, a mobile console, a remote station, a remote terminal, mobile equipment, a user terminal, a wireless communication device, a user agent, user equipment, or a user apparatus. The terminal device may be a station (ST) in a wireless local area network (WLAN), and may be a cellular phone, a cordless phone, a session initiation protocol (SIP) phone, a wireless local loop (WLL) station, a personal digital assistant (PDA) device, a handheld device having a wireless communication function, a computing device, another processing device connected to a wireless modem, a vehicle-mounted device, a wearable device, and a next-generation communications system, for example, a terminal device in a fifth-generation (5G) network, a terminal device in a future evolved public land mobile network (PLMN), or a terminal device in a new radio (NR) communications system.

As an example instead of a limitation, in the embodiments of the present invention, the terminal device may be alternatively a wearable device. The wearable device may also be referred to as a wearable intelligent device, and is a general term of wearable devices, such as glasses, gloves, watches, clothes, and shoes, that are developed by applying wearable technologies to intelligent designs of daily wear. The wearable device is a portable device that can be directly worn on a body or integrated into clothes or an accessory of a user. The wearable device is not merely a hardware device, but is used to implement a powerful function through software support, a data exchange, and cloud interaction. Generalized wearable intelligent devices include full-featured and large-size devices that can implement complete or partial functions without depending on smartphones, for example, smart watches or smart glasses, and devices that focus on only one type of application function and need to work with other devices such as smartphones, for example, various smart bands or smart jewelry for monitoring physical signs.

In addition, the network device may be a device communicating with a terminal device. For example, the network device may be an access point (AP) in a WLAN, or a base transceiver station (BTS) in GSM or CDMA, or may be a NodeB (NB) in WCDMA, or may be an evolved Node B (evolutional Node B, eNB or eNodeB) in LTE, a relay node or an access point, a vehicle-mounted device, a wearable device, a network device in a future 5G network, a network device in a future evolved PLMN network, a new generation NodeB (gNodeB) in an NR system, or the like.

In addition, in the embodiments of the present invention, the network device provides a service for a cell, and the terminal device communicates with the network device by using a transmission resource (for example, a frequency domain resource or a spectrum resource) used by the cell. The cell may be a cell corresponding to the network device (for example, a base station), and the cell may belong to a macro base station, or may belong to a base station corresponding to a small cell. The small cell herein may include: a metro cell (metro cell), a micro cell, a pico cell, a femto cell, and the like. These small cells feature in small coverage and low transmit power, and are applicable to providing a high-rate information transmission service.

In addition, in an LTE system or an NR system, a plurality of cells may simultaneously work on a carrier on a same frequency. In some special scenarios, it may also be considered that a concept of the carrier is equivalent to a concept of a cell. For example, in a carrier aggregation (CA) scenario, both a carrier index of a secondary component carrier and a cell identifier (Cell ID) of a secondary serving cell that works on the secondary component carrier are carried when the secondary component carrier is configured for UE. In this case, it may be considered that the concept of the carrier is equivalent to that of the cell. For example, that the UE accesses a carrier is equivalent to that the UE accesses a cell.

Figure 2:
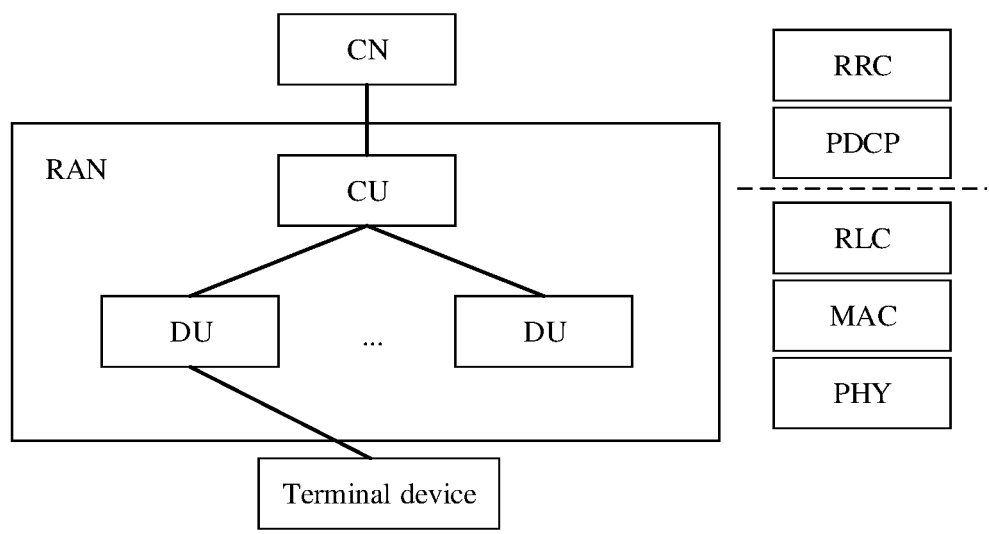
FIG. 2 is a first schematic structural diagram of a base station according to this application.

A future access network may be implemented by using a cloud radio access network (C-RAN) architecture. Therefore, in a possible manner, a protocol stack architecture and a function of a conventional base station are divided into two parts: One part is referred to as a central unit (CU), and the other part is referred to as a distributed unit (DU). An actual deployment manner of the CU and the DU is relatively flexible. For example, CU parts of a plurality of base stations are integrated to form a functional entity with a relatively large scale. FIG. 2 is a schematic diagram of a network architecture according to an embodiment of this application. As shown in FIG. 2, the network architecture includes a CN device and a RAN device. The RAN device includes a baseband apparatus and a radio frequency apparatus. The baseband apparatus may be implemented by one node, or may be implemented by a plurality of nodes. The radio frequency apparatus may be remote from the baseband apparatus and independently implemented, or may be integrated into the baseband apparatus, or may be partially remotely arranged and partially integrated into the baseband apparatus. For example, in an LTE communications system, a RAN device (eNB) includes a baseband apparatus and a radio frequency apparatus. The radio frequency apparatus may be remotely arranged relative to the baseband apparatus (for example, a remote radio unit (RRU) is remotely arranged relative to a baseband processing unit (BBU)). The RAN device is implemented by one node, and the node is configured to implement functions of protocol layers such as an RRC layer, a PDCP layer, an RLC layer, and a MAC layer. For another example, in an evolved structure, a baseband apparatus may include a central unit (CU) and a distributed unit (DU), and a plurality of DUs may be centrally controlled by one CU. As shown in FIG. 2, a CU and a DU may be obtained though division based on a protocol layer of a wireless network. For example, functions of a packet data convergence protocol (packet data convergence protocol, PDCP) layer and a protocol layer above the PDCP layer are set in the CU, and functions of protocol layers below the PDCP layer, for example, a radio link control (RLC) layer and a media access control (MAC) layer, are set in the DU.

Such protocol layer-based division is merely an example, and division may be performed based on another protocol layer. For example, division may be performed based on an RLC layer, functions of the RLC layer and a protocol layer above the RLC layer are set in the CU, and a function of a protocol layer below the RLC layer is set in the DU. Alternatively, division is performed at a protocol layer. For example, some functions of the RLC layer and a function of a protocol layer above the RLC layer are set in the CU, and a remaining function of the RLC layer and a function of a protocol layer below the RLC layer are set in the DU. In addition, division may be performed in another manner. For example, division is performed based on a latency. A function whose processing time needs to satisfy a latency requirement is set in the DU, and a function whose processing time does not need to satisfy the latency requirement is set in the CU.

In addition, the radio frequency apparatus may be remotely arranged and is not placed in the DU, or may be integrated into the DU, or may be partially remotely arranged and partially integrated into the DU. This is not limited herein.

Figure 3:
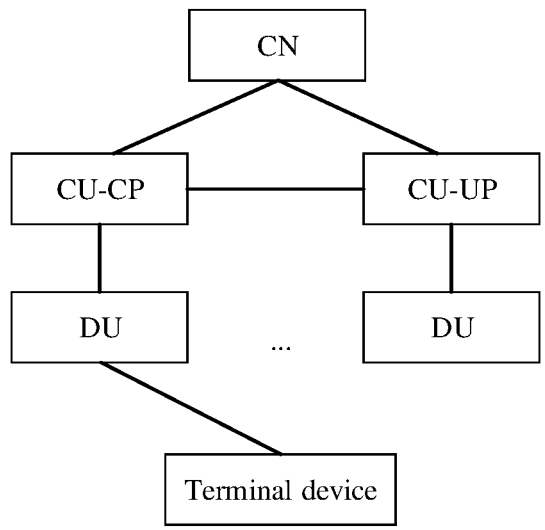
FIG. 3 is a second schematic structural diagram of a base station according to this application.

In addition, referring to FIG. 3, compared with the architecture shown in FIG. 2, a control plane (CP) and a user plane (UP) of the CU may be separated and implemented by using different entities: a control plane CU entity (CU-CP entity) and a user plane CU entity (CU-UP entity).

In the foregoing network architecture, signaling generated by the CU may be sent to a terminal by using a DU, or signaling generated by a terminal may be sent to the CU by using a DU. The DU may transparently transmit the signaling to the terminal or the CU by directly encapsulating the signaling at a protocol layer without parsing the signaling. In the following embodiments, if transmission of such signaling between the DU and the terminal is involved, that the DU sends or receives the signaling includes this scenario. For example, signaling of an RRC or a PDCP layer is finally processed as signaling of a physical layer (PHY) and sent to the terminal, or is converted from received signaling of a PHY layer. In this architecture, the signaling at the RRC or the PDCP layer may also be considered to be sent by the DU, or sent by the DU and a radio frequency.

In the foregoing embodiment, the CU is classified as a network device in the RAN. In addition, the CU may be alternatively classified as a network device in the CN. This is not limited herein.

The apparatus in the following embodiments of this application may be located in the terminal device or the network device based on a function implemented by the apparatus. When the foregoing CU-DU structure is used, the network device may be a CU node, a DU node, or a RAN device including the CU node and the DU node.

Figure 4:
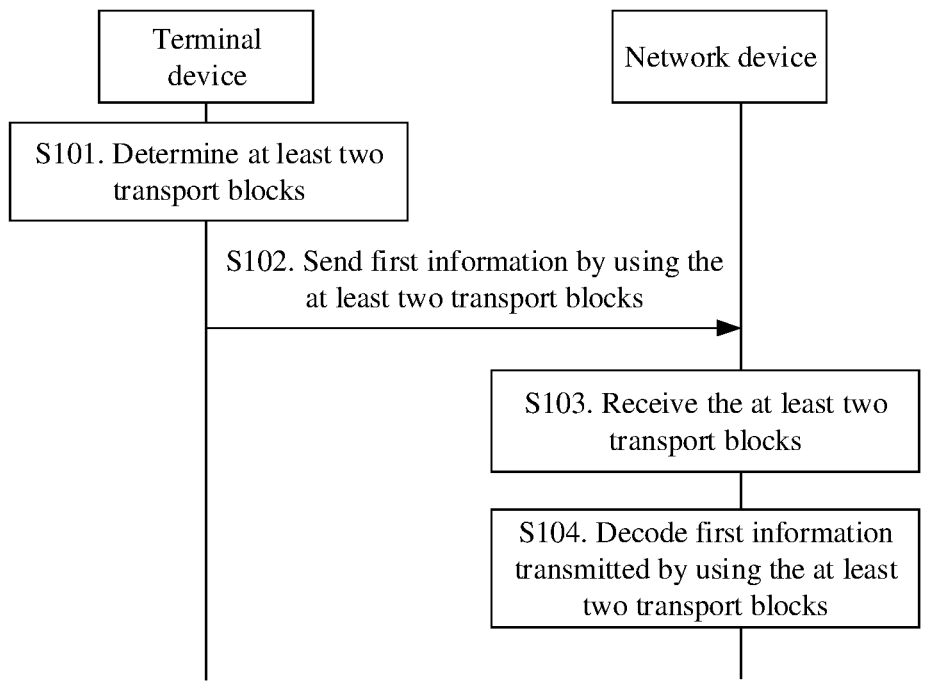
FIG. 4 is a first schematic flowchart of interaction in an information sending method and an information receiving method according to this application.

FIG. 4 shows a procedure of an information sending method and an information receiving method according to this application. The procedure includes the following steps.

S101. A terminal device determines at least two transport blocks.

S102. The terminal device sends first information by using the at least two transport blocks, where the first information includes at least one of data and control information.

It can be understood that, in this application, when the terminal device sends the first information to a network device by using the at least two transport blocks, information carried in each of the at least two transport blocks may be a part of the first information; each of the at least two transport blocks carries the first information or information including the first information; or the at least two transport blocks are the same. In conclusion, information carried in the at least two transport blocks may be used by the network device to obtain the first information.

For example, information carried in each of the at least two transport blocks is a part of the first information. The first information is A, and the first information includes a1, a2, and a3. In this case, the terminal device may send the first information to the network device by using a transport block 1 for transmitting a1, a transport block 2 for transmitting a2, and a transport block 3 for transmitting a3. Certainly, in this application, alternatively, a1 and a2 may be transmitted to the network device by using the transport block 2, and a3 may be transmitted to the network device by using the transport block 2.

For example, information carried in each of the at least two transport blocks is a part of the first information. The first information is information of one transport block, and the first information includes three CBGs. In this case, the terminal device may transmit a CBG 1 by using a transport block 1, transmit a CBG 2 by using a transport block 2, and transmit a CBG 3 by using a transport block 3, to transmit the first information to the network device by using the transport block 1, the transport block 2, and the transport block 3.

For example, information carried in each of the at least two transport blocks is information including the first information, and the first information is a CBG 1. In this case, the terminal device may transmit the CBG 1 by using a transport block 1, transmit the CBG 1 by using a transport block 2, and transmit the CBG 1 by using a transport block 3, to send the first information to the network device.

Specifically, the first information may be information of one or more TBs, information of one or more CBs, or information of one or more CBGs.

Specifically, in this application, the first information may be divided into a plurality of pieces of sub information based on a size of information that can be carried in each transport block and/or a size of the first information, so that each transport block is used to carry one or more pieces of sub information. In this application, information carried in the at least two transport blocks may be considered as same information or information from a same information source.

Optionally, the at least two transport blocks in this application are used to carry same information or information from a same information source.

S103. The network device receives the at least two transport blocks sent by the terminal device.

S104. The network device decodes the first information transmitted by the terminal device by using the at least two transport blocks.

Optionally, S104 in this application may be implemented by using the following steps: decoding, by the network device, at least one of the at least two transport blocks to obtain the first information; and/or jointly decoding, by the network device, two or more of the at least two transport blocks to obtain the first information. For all the following processes in which the network device decodes information transmitted by using a transport block group, refer to the description herein. To be specific, the network device decodes at least one transport block in the transport block group to obtain the first information, or jointly decodes a plurality of transport blocks in the at least two transport blocks to obtain the first information.

It should be noted that, the jointly decoding, by the network device, a plurality of transport blocks in the at least two transport blocks to obtain the first information includes the following two cases. In one case, in this application, when the network device fails to separately decode a transport block in the at least two transport blocks, the network device may jointly decode the plurality of transport blocks in the at least two transport blocks to obtain the first information. In the other case, the network device does not separately perform decoding, but directly jointly decodes the plurality of transport blocks in the at least two transport blocks to obtain the first information. A condition of correct decoding or incorrect decoding is described in the following in this embodiment of this application.

It should be noted that, the network device in this embodiment may be replaced with another terminal device, that is, information transmission is performed between two terminal devices. The foregoing uses only information transmission between the terminal device and the network device as an example. It can be understood that, the foregoing method is also applicable to information transmission between two or more terminal devices. When the foregoing method is applicable to information transmission between two or more terminal devices, the steps related to the network device in this application may be performed by another terminal device that sends first information to the terminal device. This is not limited in this embodiment of the present invention.

Generally, although the terminal device has a capability of transmitting information by using a plurality of transport blocks, the plurality of transport blocks need to carry same information or information from a same information source, resulting in low system transmission efficiency. Therefore, the network device configures, for the terminal device, a capability of transmitting information by using a plurality of transport blocks, only when the network device needs to ensure high-reliability transmission. In this case, when receiving the at least two transport blocks, the network device can decode the first information transmitted by using the at least two transport blocks. Therefore, optionally, in another embodiment of this application, before S101, the procedure in this application further includes: receiving, by the terminal device, first configuration information, where the first configuration information is used to configure information that the terminal device can perform duplicate transmission by using two or more transport blocks, and the information includes at least one of data and control information.

A manner in which the terminal device determines the first configuration information is not limited in this application. For example, the terminal device may obtain the first configuration information from the network device, or may obtain the first configuration information from another terminal device that performs information transmission with the terminal device. For example, the first configuration information is sent by the network device to the terminal device. In this case, before the terminal device determines the first configuration information, the procedure in this application further includes: S105. The network device sends the first configuration information to the terminal device. S106. The terminal device determines the first configuration information based on information received from the network device.

It should be noted herein that the first configuration information is used to perform configuration, so that the terminal device can perform duplicate transmission, but this does not mean that the terminal device immediately starts to perform duplicate transmission. The terminal device further needs to receive indication information used to determine the at least two transport blocks for duplicate transmission, to determine whether duplicate transmission needs to be performed on a plurality of transport blocks in the at least two transport blocks. Optionally, the first configuration information may alternatively be used to perform configuration, so that the terminal device does not perform duplicate transmission. In this case, even if the terminal device receives the indication information used to determine the at least two transport blocks for duplicate transmission, the terminal device still does not perform duplicate transmission.

It should be noted that, in this application, the network device may send the first configuration information to the terminal device when the network device needs to receive high-reliability transmission sent by the terminal device. Alternatively, the terminal device may send a first request message or a first capability reporting message to the network device when the terminal device determines that high-reliability transmission needs to be sent to the network device. The first request message is used to instruct the network device to configure, for the terminal device, a function that can be used for performing duplicate transmission on a plurality of transport blocks. The first capability reporting message is used to indicate, to the network device, that the terminal device has a capability of performing duplicate transmission on a plurality of transport blocks. In other words, after receiving the first request message or the first capability reporting message, the network device performs S105. This is not limited in this application.

It should be noted that, S105 and S106 in this application are mainly used to perform configuration, so that the terminal device has a function of performing duplicate transmission on a plurality of transport blocks. When the terminal device has no capability of performing duplicate transmission on a plurality of transport blocks, S105 and S106 can be omitted. In other words, S105 and S106 are optional.

Optionally, when the terminal device does not receive the first configuration information, the terminal device may not perform duplicate transmission on two or more transport blocks when sending the two or more transport blocks. In other words, the terminal device may consider that information in the two or more transport blocks sent to the network device is different information or information from different information sources. In this case, the terminal device does not start an operation of performing duplicate transmission on a plurality of transport blocks.

It should be noted that, the first configuration information in this application is specific to uplink information (that is, a process in which the terminal device sends a plurality of transport blocks to the network device, and the network device receives the first information by using the plurality of transport blocks). Further, there may alternatively be second configuration information, and the second configuration information is specific to downlink information (that is, a process in which the network device sends the at least two transport blocks to the terminal device, and the terminal device receives the first information by using the at least two transport blocks). In other words, configuration may be separately performed on the uplink and downlink information, and the network device may configure the first configuration information and/or the second configuration information for the terminal device. If the uplink information of the terminal device needs to be highly reliably transmitted, the first configuration information is configured. If the downlink information of the terminal device needs to be highly reliably transmitted, the second configuration information is configured. Flexible configuration can improve receiving or sending efficiency of the terminal device.

According to the information sending method provided in this embodiment of this application, the first information from the terminal device is transmitted to the network device by using the at least two transport blocks. Because transport blocks in the at least two transport blocks may be used for joint decoding to obtain the first information, the network device can jointly decode the at least two transport blocks to obtain the first information, thereby improving reliability of uplink transmission. In the prior art, duplicate transmission is usually performed on a transport block used for initial transmission and a transport block used for retransmission, or performed on two transport blocks used for retransmission. Transmission of the transport block used for initial transmission and the transport block used for retransmission and transmission of the two transport blocks used for retransmission are both performed in a sequence, and the transport blocks are sent only after a receive end feeds back a negative acknowledgment. This increases a transmission latency. In contrast, in this application, it is not required that after one of at least two transport blocks is sent, another transport block be sent only after a next sending occasion and after the receive end feeds back a negative acknowledgment. Therefore, a transmission latency can be reduced.

It can be understood that, usually, a plurality of transport blocks are carried on at least one physical downlink data channel (or referred to as a physical downlink shared channel (PDSCH)). Generally, one PDSCH carries a maximum of two transport blocks. In other words, when a quantity of a plurality of transport blocks is greater than 3, at least two PDSCH channels are required to transmit the plurality of transport blocks.

Optionally, when S105 and S106 can be omitted, or when the terminal device does not receive the first configuration information due to a reason (for example, channel quality), to improve high reliability of service transmission, the terminal device may determine, in another manner, that the first information can be transmitted by using a plurality of transport blocks. In this application, the terminal device may determine the at least two transport blocks in a plurality of manners. Therefore, a possible implementation of S101 is as follows.

S1011. The terminal device determines first indication information, where the first indication information is used to indicate a parameter value of at least one parameter corresponding to the at least two transport blocks, and the at least one parameter includes one or more of the following parameters: a first time period, a bandwidth part (BWP), a precoding matrix parameter, a network identifier, a reference signal, a cell index, and a joint identifier, where the joint identifier is used to indicate a transport block used for duplicate transmission.

Optionally, the parameter indicated by the first indication information in this application further includes a parameter such as a time domain resource and/or a frequency domain resource, and a port number group, for example, a DMRS port.

Optionally, the first indication information in this application may be sent by the network device to the terminal device, or configured or predefined in the terminal device. When the first indication information may be sent by the network device to the terminal device, before S101, the method provided in this application further includes: S107. The network device sends the first indication information to the terminal device. Correspondingly, S1011 may be determining, by the terminal device, information received from the network device as the first indication information.

Specifically, in this application, the terminal device may determine the first indication information by using dynamic signaling or higher layer signaling or in a predefined manner. The dynamic signaling is usually indication information carried in downlink control information (DCI).

S1012. The terminal device determines the at least two transport blocks based on the first indication information.

The following uses a first transport block and a second transport block in the at least two transport blocks as an example for description. The first transport block and the second transport block are any two transport blocks in the at least two transport blocks, or the first transport block represents one or more transport blocks in the at least two transport blocks, and the second transport block represents one or more transport blocks in the at least two transport blocks. The first transport block and the second transport block in this application do not have any indicative meanings.

It can be understood that after determining the at least two transport blocks, the terminal device may send the first information to the network device by using the at least two transport blocks. The at least two transport blocks are used for duplicate transmission. To enable the network device to determine, after receiving the at least two transport blocks sent by the terminal device, that the plurality of transport blocks sent by the terminal device are used for duplicate transmission, in this application, the terminal device determines, as the at least two transport blocks based on the first indication information, transport blocks that are in the plurality of transport blocks and whose identifiers are the same as or associated with the parameter indicated by the first indication information.

For example, if the terminal device determines that a resource on which two or more transport blocks in the plurality of transport blocks are located is in a time-frequency resource or the first time period, the terminal device determines that two or more transport blocks sent on the time-frequency resource indicated by the first indication information or sent in the first time period can be used for duplicate transmission.

Specifically, the at least two transport blocks include a first transport block and a second transport block; and the first indication information indicates that a first parameter in the at least one parameter is corresponding to a plurality of parameter values, and parameter values of first parameters corresponding to the first transport block and the second transport block are different; and/or the first indication information indicates that a second parameter in the at least one parameter is corresponding to one parameter value, and parameter values of second parameters corresponding to the first transport block and the second transport block are the same.

It should be noted that, in this application, the first parameter may be one or more of parameters indicated by the first indication information, or may be another parameter, and the second parameter may be one or more of the parameters indicated by the first indication information, or may be another parameter. In addition, a plurality of different parameters indicated by the first indication information may be used in combination, to determine the at least two transport blocks.

For example, first parameters corresponding to the at least two transport blocks are a first BWP and a second BWP. The first transport block is corresponding to the first BWP, and the second transport block is corresponding to the second BWP.

For example, first parameters corresponding to the at least two transport blocks are a first BWP and a second BWP, and a second parameter corresponding to the at least two transport blocks is a first time period. The first transport block is corresponding to the first BWP, the second transport block is corresponding to the second BWP, and the first transport block and the second transport block are corresponding to the same first time period.

For example, a second parameter corresponding to the at least two transport blocks is a first time period. The first transport block and the second transport block are corresponding to the same first time period.

For example, first parameters corresponding to the at least two transport blocks are a first port number group and a second port number group, and a second parameter corresponding to the at least two transport blocks is a first time domain resource. The first transport block is corresponding to the first port number group, the second transport block is corresponding to the second port number group, and the first transport block and the second transport block have the same first time domain resource.

For still another example, the first indication information indicates that the second parameter in the at least one parameter is corresponding to one parameter value, the parameter value is a joint identifier, and the first transport block and the second transport block are corresponding to a same joint identifier.

Because the first indication information indicates different content, there is a difference between manners in which the terminal device determines the at least two transport blocks based on the first indication information. Therefore, specific implementations of S1012 are separately described below with reference to specific content of the first indication information.

A1. The first indication information is used to indicate a joint identifier corresponding to the at least two transport blocks, where the joint identifier is used to indicate a transport block used for duplicate transmission. The terminal device determines transport blocks that are in a plurality of transport blocks and whose identifiers are associated with the joint identifier indicated by the first indication information, as the at least two transport blocks; or the terminal device determines transport blocks whose identifiers are the same as the joint identifier indicated by the first indication information, as the at least two transport blocks. In other words, before sending the at least two transport blocks to the network device, the terminal device has determined that the joint identifier indicated by the first indication information is associated with the at least two transport blocks or is the same as the identifiers of the at least two transport blocks.

The joint identifier in this application may be an index associated with a plurality of transport blocks. The terminal device determines identifiers corresponding to the plurality of transport blocks. In this way, the terminal device sends at least two transport blocks associated with the index of the joint identifier, and transmission of the at least two transport blocks is duplicate transmission.

For example, a transport block 1, a transport block 2, and a transport block 3 are all associated with an index Y1. In this way, the terminal device can send the first information to the network device by using the transport block 1, the transport block 2, and the transport block 3 that are associated with the index Y1. For example, Y1=10. Both a transport block 4 and a transport block 5 are associated with an index Y2. In this way, the terminal device can send second information to the network device by using the transport block 4 and the transport block 5 that are associated with the index Y2. For example, Y2=01. The transport block 1, the transport block 2, and the transport block 3 are transport blocks in a first transport block group, and the transport block 4 and the transport block 5 are transport blocks in a second transport block group.

It can be understood that the transport block 1, the transport block 2, and the transport block 3 may be respectively scheduled by using three pieces of downlink control information (DCI), or may be scheduled by using same DCI. To be specific, the network device indicates, by using a joint identifier carried in DCI, whether the terminal device sends information from a same information source or same information by using a plurality of transport blocks, that is, whether the terminal device performs duplicate transmission by using the plurality of transport blocks. The DCI may be DCI for scheduling a transport block, or may be other DCI.

The joint identifier in this application may be indication information, and the indication information includes first indication information and second indication information. The first indication information indicates that a plurality of transport blocks associated with the first indication information may be used to transmit same information or information from a same information source, that is, can be used for duplicate transmission. The second indication information indicates that a transport block associated with the second indication information cannot be used for duplicate transmission, that is, the transport block associated with the second indication information is used to transmit different information or information from different information sources. In this way, the terminal device can determine, based on same indication information, a transport block used for duplicate transmission. Information in the transport block is same information or information from a same information source, and information in transport blocks with different joint identifiers is different information.

In this embodiment of the present invention, a same information source refers to a same bit sequence transmitted by a physical layer. When the bit sequence is modulated and encoded, processed based on a redundancy version, and mapped to a time-frequency domain resource, actual transmission forms of finally transmitted first information may be different due to different modulation and coding schemes, redundancy versions, mapping resources, or other factors. In other words, a same information source may be used for joint decoding. On the contrary, even if actual transmission forms of different information sources are the same, joint decoding cannot be performed because of different information. This can also be understood as: If joint decoding is performed, decoding cannot be performed correctly regardless of how many times the information is transmitted.

For example, when the joint identifier indicated by the first indication information is 1, the terminal device transmits same information to the network device by using a code word 1 and a code word 2. In this case, the terminal device associates the code word 1 and the code word 2 with the joint identifier 1. When the joint identifier indicated by the first indication information is 0, the terminal device adds different information to the code word 1 and the code word 2. In this way, when determining that a joint identifier corresponding to the at least two transport blocks is 0, the terminal device can determine that different information or information from different information sources is transmitted by using the codeword 1 and the codeword 2. In this case, the network device does not use the codeword 1 and the codeword 2 for joint decoding. In other words, the terminal device may transmit information A by using the codeword 1 and transmit information B by using the codeword 2, and the information A is different from the information B. It can be understood that the codeword 1 and the codeword 2 may be scheduled by using a same piece of DCI, or may be scheduled by using different pieces of DCI.

Certainly, in this application, the joint identifier may alternatively be corresponding to a transport block group. To be specific, the joint identifier is used to indicate whether information is transmitted by using at least one transport block included in a transport block group. Specifically, as listed in Table 1 to Table 4, Table 1 to Table 4 list joint identifiers provided in this application.

TABLE 1

| Joint identifier 1 | Indication |
| --- | --- |
| 0 | Transport block not used for duplicate transmission |
| 1 | Transport block used for duplicate transmission |

TABLE 2

| Joint identifier 1 | Indication |
| --- | --- |
| 00 | Transport block not used for duplicate transmission |
| 10 | Transport block used for duplicate transmission in a first transport block group |
| 01 | Transport block used for duplicate transmission in a second transport block group |
| 11 | Transport block used for duplicate transmission in a third transport block group |

TABLE 3

| Joint identifier 2 | Indication |
| --- | --- |
| 0 | CW not used for duplicate transmission |
| 1 | CW used for duplicate transmission |

TABLE 4

| Joint identifier 2 | Indication |
|---|---|
| 00 | A CW cannot be used for duplicate transmission |
| 10 | A first CW can be used for duplicate transmission |
| 01 | A second CW can be used for duplicate transmission |
| 11 | The first CW and the second CW can be used for duplicate transmission |

In still another aspect, the joint identifier may be the joint identifier 1 and/or the joint identifier 2. In other words, there may be only one of the two joint identifiers or there may be the two joint identifiers. The joint identifier 2 is used to indicate whether the terminal device performs duplicate transmission when sending transport blocks at different layers, for example, the joint identifier 2. For example, a size of the joint identifier 2 may be 1 bit.

The joint identifier 1 is used to indicate whether a transport block transmitted by the terminal device on a carrier or a BWP can be used for duplicate transmission. The joint identifier 2 is used to indicate whether transport blocks between different layers can be used for duplicate transmission. The joint identifier 1 is used to identify whether a transport block on a frequency domain resource is used for duplicate transmission. For example, transport blocks on a carrier 1 and a carrier 2 corresponding to the joint identifier 10 can be used for joint decoding, and the carrier 1 and the carrier 2 are in a first frequency domain resource group. Further, a CW1 and a CW2 transmitted on the carrier 1 can be used for duplicate transmission or separately transmitted. Therefore, in this case, there are three possible combination methods:

Possibility 1: The CW1 on the carrier 1 and a CW1 on the carrier 2 are used for duplicate transmission together.

Possibility 2: The CW2 on the carrier 1 and a CW2 on the carrier 2 are used for duplicate transmission together.

Possibility 3: The CW1 and the CW2 on the carrier 1 and the CW1 and the CW2 on the carrier 2 are used for duplicate transmission together.

Possibility 4: The CW1 on the carrier 1 and the CW2 on the carrier 2 are used for duplicate transmission together.

Possibility 5: The CW2 on the carrier 1 and the CW1 on the carrier 2 are used for duplicate transmission together.

Possibility 6: The CW1 on the carrier 1 and the CW1 and the CW2 on the carrier 2 are used for duplicate transmission together.

Possibility 7: The CW2 on the carrier 1 and the CW1 and the CW2 on the carrier 2 are used for duplicate transmission together.

Possibility 8: The CW1 and the CW2 on the carrier 1 and the CW1 on the carrier 2 are used for duplicate transmission together.

Possibility 9: The CW1 and the CW2 on the carrier 1 and the CW2 on the carrier 2 are used for duplicate transmission together.

Details are listed in Table 5 to Table 7.

TABLE 5

| Joint identifier 1 | Indication |
|---|---|
| 00 | Cannot be used for duplicate transmission |
| 10 | A first frequency domain resource group can be used for duplicate transmission |
| 01 | A second frequency domain resource group can be used for duplicate transmission |

TABLE 5-continued

| Joint identifier 1 | Indication |
|---|---|
| 11 | A third frequency domain resource group can be used for duplicate transmission |

TABLE 6

| Joint identifier 2-1 | indication |
|---|---|
| 0 | CW1 not used for duplicate transmission |
| 1 | CW1 used for duplicate transmission |

TABLE 7

| Joint identifier 2-2 | Indication |
|---|---|
| 0 | CW2 not used for duplicate transmission |
| 1 | CW2 used for duplicate transmission |

In other words, the terminal device determines, based on the joint identifier indicated by the first indication information, whether to perform duplicate transmission on the at least two transport blocks to the network device.

A2. The terminal device determines first indication information, where the first indication information is corresponding to a first time period of the at least two transport blocks. In this case, the terminal device determines, based on time information of a plurality of transport blocks, transport blocks whose time information belongs to the time period indicated by the first indication information as the at least two transport blocks. In this way, the network device can determine transport blocks received in the first time period indicated by the first indication information as transport blocks that can be used for joint decoding.

Specifically, the terminal device determines a plurality of transport blocks in the first time period as the at least two transport blocks. Specifically, a start time of the first time period is a time point at which the terminal device receives the first indication information plus K symbols or slots, where K is greater than or equal to 0. Certainly, the start time of the first time period may alternatively be indicated by the network device in the first indication information. In addition, duration of the first time period may be a predefined time length, or may be indicated in second indication information or other information. This is not limited in this application.

Specifically, the first indication information may be information used to indicate the first time period, may be the first time period, or may be an index associated with the first time period. To be specific, it can be understood that, all transport blocks in the first time period can be used for duplicate transmission.

Example 1

The first indication information indicates an index number of a slot or a symbol. It can be understood that, when the first indication information indicates a symbol 0 to a symbol 6, the terminal device sends the at least two transport blocks on the symbol 0 to the symbol 6. For example, if the slot indicated by the first indication information is a slot 0, the terminal device sends the at least two transport blocks on the slot 0.

Example 2

The first indication information indicates a relative offset group of a slot or a symbol.

It can be understood that, the first indication information is carried in DCI, and the first indication information indicates an offset time or an offset index number relative to a slot or a symbol in which the current DCI exists. For example, if the symbol in which the current DCI exists is 1, and a relative offset group indicated by the first indication information is {2-5} symbols, the terminal device transmits the at least two transport blocks to the network device in a symbol 3 to a symbol 6.

For example, if a slot 0 in which the current DCI exists is 1, and a relative offset group indicated by the first indication information is {0-1} slots, the terminal device transmits the at least two transport blocks to the network device in the slot 0 and a slot 1.

It should be noted that, there may be one or more pieces of information in the relative offset group. This is not limited in this embodiment of the present invention.

To be specific, the terminal device sends, based on the first time period indicated by the first indication information, transport blocks in the at least two transport blocks to the network device. In this way, the network device can determine the transport blocks received in the first time period as transport blocks that can be used for joint decoding.

A3. The terminal device determines first indication information, where the first indication information is used to indicate a frequency domain resource corresponding to the at least two transport blocks.

It can be understood that, the first indication information indicates information about the frequency domain resource corresponding to the at least two transport blocks. In this case, the terminal device determines, as the at least two transport blocks based on frequency domain resource information of a plurality of transport blocks, transport blocks that are in the plurality of transport blocks and whose frequency domain resource is the same as the frequency domain resource indicated by the first indication information. In other words, before the terminal device transmits the at least two transport blocks to the network device, the terminal device determines that the at least two transport blocks has been associated with the frequency domain resource indicated by the first indication information. For example, the frequency domain resource on which the at least two transport blocks are located is in the frequency domain resource indicated by the first indication information, or the frequency domain resource on which the at least two transport blocks are located is the same as the frequency domain resource indicated by the first indication information. Optionally, in this application, the terminal device may further send the at least two transport blocks to the network device on the frequency domain resource indicated by the first indication information.

The frequency domain resource indicated by the first indication information may be information used to indicate an identifier of the frequency domain resource, an identifier of the frequency domain resource, or an index associated with the frequency domain resource. This is not limited in this application.

Example 1

The first indication information indicates an index of a carrier. It can be understood that, when the first indication information indicates a carrier 0 and a carrier 1, the terminal device may determine transport blocks that are in a plurality of transport blocks and that are associated with the carrier 0 and the carrier 1, as the at least two transport blocks. Optionally, the terminal device may further transmit the at least two transport blocks to the network device on the carrier 0 and the carrier 1.

Example 2

The first indication information indicates a BWP index. It can be understood that, when the first indication information indicates a BWP 0, a BWP 1, and a BWP 2, the terminal device determines, as the at least two transport blocks based on the first indication information, transport blocks that are in a plurality of transport blocks and that are corresponding to BWPs with indexes the same as or associated with the BWP indexes indicated by the first indication information.

Optionally, the terminal device may further transmit transport blocks in the at least two transport blocks to the network device in the BWP 0, the BWP 1, and the BWP 2.

To be specific, the terminal device performs determining by using the frequency domain resource indicated by the first indication information, to determine transport blocks that are in a plurality of transport blocks and that are corresponding to the frequency domain resource the same as or associated with the frequency domain resource indicated by the first indication information, as the at least two transport blocks, so that the network device determines transport blocks received on the frequency domain resource indicated by the first indication information as the at least two transport blocks.

Specifically, the terminal device determines, as the at least two transport blocks based on two or more frequency domain resources indicated by the first indication information, transport blocks that are in a plurality of transport blocks and that are corresponding to frequency domain resources associated with or the same as the two or more frequency domain resources.

Specifically, the frequency domain resource may be a BWP or a carrier.

A4. The terminal device determines first indication information, where the first indication information is used to indicate a precoding matrix parameter corresponding to the at least two transport blocks.

Specifically, the terminal device determines, as the at least two transport blocks based on the precoding matrix parameter indicated by the first indication information, transport blocks that are in a plurality of transport blocks and whose precoding matrix parameters are the same as or associated with the precoding matrix parameter indicated by the first indication information.

The precoding matrix parameter indicated by the first indication information may be information used to indicate an identifier of the precoding matrix parameter, an identifier of the precoding matrix parameter, or an index associated with the precoding matrix parameter. This is not limited in this application.

Example 1

The first indication information indicates an index of the precoding matrix parameter. It can be understood that, when the first indication information indicates a precoding matrix parameter 1 and a precoding matrix parameter 2, the terminal device determines a transport block corresponding to the precoding matrix parameter 1 and a transport block corresponding to the precoding matrix parameter 2 as the at least two transport blocks. In other words, the terminal device determines, by using precoding matrix parameters, whether transport blocks received on different beams are transport blocks in the at least two transport blocks.

A5. The terminal device determines first indication information, where the first indication information is used to indicate a network identifier corresponding to the at least two transport blocks.

The network identifier in this application may be used to identify the terminal device in a cell accessed by the terminal device. For example, the network device may be an RNTI in an LTE system.

Specifically, the terminal device determines, based on the network identifier or a cell index indicated by the first indication information, two or more transport blocks scrambled by using the network identifier or the cell index indicated by the first indication information as the at least two transport blocks. Alternatively, the terminal device scrambles any two transport blocks by using the network identifier or a cell index indicated by the first indication information, and transmits, to the network device after scrambling, at least two transport blocks carrying the network identifier or the cell index indicated by the first indication information. It can be understood that, before the terminal device sends the at least two transport blocks to the network device, the at least two transport blocks already carry the network identifier or the cell index indicated by the first indication information.

The network identifier indicated by the first indication information may be information used to indicate the network identifier, or a network identifier, or may be an index associated with the network identifier. This is not limited in this application.

Example 1

The first indication information indicates an index of the network identifier. For example, the network identifier may be an RNTI. It can be understood that, when the first indication information indicates an RNTI 1 and an RNTI 2, the terminal device determines a transport block that is in a plurality of transport blocks and whose identifier is associated with or the same as the RNTI 1, as a transport block in the at least two transport blocks, and determines a transport block that is in the plurality of transport blocks and whose identifier is associated with or the same as the RNTI 2, as a transport block in the at least two transport blocks.

A5. The terminal device determines first indication information, where the first indication information is used to indicate information about a reference signal corresponding to the at least two transport blocks.

Specifically, the terminal device determines, as the at least two transport blocks based on the first indication information, transport blocks that are in a plurality of transport blocks and that are corresponding to a reference signal the same as the reference signal indicated by the first indication information, or the terminal device transmits, to the network device, the at least two transport blocks based on the reference signal indicated by the first indication information.

The reference signal indicated by the first indication information may be information used to indicate an identifier of the reference signal or an identifier of the reference signal, may be an index associated with the reference signal, may be a scrambling code corresponding to the reference signal, may be sequence information corresponding to the reference signal, may be frequency domain information corresponding to the reference signal, may be sequence sorting information corresponding to the reference signal, or may be time domain position and/or time domain density information corresponding to the reference signal. This is not limited in this application.

Example 1

The first indication information indicates a reference signal, for example, sequence information of the reference signal. It can be understood that, when the first indication information indicates a sequence 1 and a sequence 2, the terminal device determines a transport block that is in a plurality of transport blocks and that is corresponding to a reference signal with a sequence the same as the sequence 1, as a transport block in the at least two transport blocks, and determines a transport block that is in the plurality of transport blocks and that is corresponding to a reference signal with a sequence the same as the sequence 2, as a transport block in the at least two transport blocks. In this way, the network device determines, by using a sequence of a reference signal corresponding to a received transport block, whether the received transport block is used for duplicate transmission.

Example 2

The first indication information indicates a reference signal, for example, information about a port number. It can be understood that, when the first indication information indicates port numbers 1 and 3 and port numbers 4 and 8, the terminal device determines transport blocks that are in a plurality of transport blocks and that are corresponding to ports with the port numbers 1 and 3 and the port numbers 4 and 8, as transport blocks in the at least two transport blocks. In addition, the terminal device may further send the at least two transport blocks based on the ports indicated by the first indication information. In this way, when receiving transport blocks sent by the terminal device, the network device can determine transport blocks transmitted by the terminal device based on the port numbers indicated by the network device as the at least two transport blocks. For example, when the network device receives the transport blocks sent by the terminal device, even if a transport block is transmitted at another layer, the network device does not combine information in the transport block transmitted at the another layer and information in transport blocks transmitted at a layer 8 and a layer 0. By analogy, other cases about a reference signal are not described herein in this application.

A6. The terminal device determines first indication information, where the first indication information is used to indicate a cell index corresponding to the at least two transport blocks.

Specifically, the terminal device determines, based on the cell index indicated by the first indication information, transport blocks scrambled by using the cell index as the at least two transport blocks.

It can be understood that, the terminal device determines cell index information of the at least two transport blocks. The terminal device determines the at least two transport blocks based on the cell index information of the at least two transport blocks.

The cell index indicated by the first indication information may be information used to indicate an identifier of the cell index or an identifier of the cell index, may be an index associated with the cell index, or may be a scrambling code corresponding to the cell index. This is not limited in this application.

Example 1

The first indication information indicates a cell index, for example, identifier information of the cell index.

For example, when the first indication information indicates that the cell index is an identifier 1 and an identifier 2, the terminal device determines transport blocks that are in a plurality of transport blocks and whose identifiers are the identifier 1 and the identifier 2, as the at least two transport blocks; the terminal device associates a part of the plurality of transport blocks with the identifier 1 and associates the other part of the at least two transport blocks with the identifier 2 based on the first indication information; or the terminal device associates each of the at least two transport blocks with the identifier 1, or associates each of the at least two transport blocks with the identifier 2. In other words, the terminal device indicates, to the network device by using the cell index, which transport blocks are used for duplicate transmission.

A7. The terminal device determines first indication information, where the first indication information is used to indicate an HARQ process number corresponding to the at least two transport blocks. Specifically, the terminal device determines transport blocks transmitted based on the HARQ process number indicated by the first indication information as the at least two transport blocks.

It can be understood that, the terminal device determines information about an HARQ process number corresponding to each of a plurality of transport blocks, and the terminal device determines transport blocks that are in the plurality of transport blocks and that are corresponding to HARQ process numbers the same as the HARQ process number indicated by the first indication information, as the at least two transport blocks.

The HARQ process number indicated by the first indication information may be information used to indicate an identifier of the HARQ process number, or may be an index associated with the HARQ process number. This is not limited in this application.

Example 1

The first indication information indicates an HARQ process number. For example, the HARQ process number may be identifier information of the HARQ process number.

For example, when the first indication information indicates an HARQ process number 1 and an HARQ process number 2, the terminal device may determine a transport block transmitted based on the HARQ process number 1 corresponding to a carrier 1, a BWP 1, and a cell 1 as a transport block in the at least two transport blocks, and determine a transport block transmitted based on the HARQ process number 2 corresponding to a carrier 2, the BWP 1, and a cell 2 as a transport block in the at least two transport blocks.

Specifically, the first indication information may be information used to indicate the first time period, may be the first time period, or may be an index associated with the first time period. The frequency domain resource indicated by the first indication information may be information used to indicate an identifier of the frequency domain resource, an identifier of the frequency domain resource, or an index associated with the frequency domain resource. This is not limited in this application. By analogy, content indicated by the first indication information may be the content, or may be an index or information associated with the content. Details are not described in this application.

It should be noted that, the first time period, the frequency domain resource, the precoding matrix parameter, the network identifier, the reference signal, the cell index, the HARQ process number, and the joint identifier may include two or more parameters. For example, the frequency domain resource indicated by the first indication information may be a frequency domain resource subset, and the frequency domain resource subset includes two or more frequency domain resources; the network identifier indicated by the first indication information may be a network identifier subset, and the network identifier subset includes two or more network identifiers; and the cell index indicated by the first indication information may be a cell index subset, and the cell index subset includes two or more cell indexes. The reference signal indicated by the first indication information may be a reference signal subset, and the reference signal subset includes port numbers or layers corresponding to at least two reference signals. By analogy, details are not described in this application.

It can be understood that, the reference signal indicated by the first indication information may alternatively be a port number or a layer corresponding to the reference signal.

The frequency domain resource may be at least one of a BWP, a carrier, or a cell. This is not limited in this application. This is not limited in this application.

It should be noted that, in this application, the terminal device may jointly determine, based on a plurality of parameters indicated by the first indication information, whether transport blocks are the at least two transport blocks. Specifically, the terminal device determines transport blocks sent to the network device in the first time period as the at least two transport blocks. For another example, the terminal device determines, as the at least two transport blocks, transport blocks that are in the first time period and whose network identifier is the network identifier indicated by the first indication information.

It should be noted that, after determining, based on the first indication information, that transport blocks corresponding to at least one parameter are the at least two transport blocks, the terminal device sends the first information to the network device by using the at least two transport blocks.

Based on the first indication information, the at least two transport blocks in this application satisfy at least one of the following. Therefore, only a first transport block and a second transport block are used as an example for description in this application. The first transport block and the second transport block are any two transport blocks in the at least two transport blocks, or the first transport block represents one or more transport blocks in the at least two transport blocks, and the second transport block represents one or more transport blocks in the at least two transport blocks. The first transport block and the second transport block in this application do not have any indicative meanings. However, there is no limitation to determining a third transport block and a fourth transport block by using a same condition.

Specifically, the first transport block and the second transport block satisfy at least one of the following:

1. The first transport block and the second transport block are corresponding to different reference signal groups; reference signals included in different reference signal groups are different; and one reference signal group includes at least one reference signal.

For example, the first transport block is corresponding to a first reference signal group, and the second transport block is corresponding to a second reference signal group. At least one reference signal included in the first reference signal group is different from at least one reference signal included in the second reference signal group. The first reference signal group and the second reference signal group may be predefined, or may be notified by using higher layer signaling or dynamic signaling. It should be understood that, the network device determines transport blocks received based on the first reference signal group and the second reference signal group as transport blocks that can be used for joint decoding.

Optionally, the first transport block and the second transport block are corresponding to different reference signal groups, and the first transport block and the second transport block are sent on a same time domain resource and a same frequency domain resource.

Optionally, that different reference signal groups include different reference signals includes at least one of the following: time domain resource locations of reference signals are different; frequency domain resource locations of reference signals are different (particularly, frequency domain resource locations are different, one is corresponding to a reference signal in an odd subcarrier group, and another is corresponding to a reference signal in an even subcarrier group); sequence groups of reference signals are different, and sequences in the sequence groups are sorted differently; or sequences are different. The reference signal group may further include the information about the reference signal in A5, and details are not described herein in this embodiment of the present invention.

2. The first transport block and the second transport block are located on different frequency domain resources. For example, the first transport block is located on a first frequency domain resource, the second transport block is located on a second frequency domain resource, and an index of the first frequency domain resource is different from an index of the second frequency domain resource.

Specifically, a frequency domain resource on which the first transport block is located is carried on a first carrier, a frequency domain resource on which the second transport block is located is carried on a second carrier, and index numbers of the first carrier and the second carrier are different.

Specifically, a frequency domain resource on which the first transport block is located is carried in a first BWP, a frequency domain resource on which the second transport block is located is carried in a second BWP, and index numbers of the first BWP and the second BWP are different.

Specifically, a frequency domain resource on which the first transport block is located is carried in a first cell, a frequency domain resource on which the second transport block is located is carried in a second cell, and index numbers of the first cell and the second cell are different.

Optionally, the first transport block and the second transport block are located on different frequency domain resources, and time domain resources on which the first transport block and the second transport block are located partially or completely overlap. For example, the first transport block occupies a symbol 0 to a symbol 6, and the second transport block occupies a symbol 5 to a symbol 7.

Specifically, lengths of time domain resources occupied by the first transport block and the second transport block may be the same or may be different. The first frequency domain resource and the second frequency domain resource may be predefined, or may be notified by using higher layer signaling or dynamic signaling. It should be understood that, the network device determines transport blocks received on the first frequency domain resource and the second frequency domain resource as transport blocks that can be used for joint decoding.

Optionally, for example, a frequency domain resource is a BWP, and a first BWP and a second BWP partially overlap or do not overlap in frequency domain.

3. The first transport block and the second transport block are scrambled by using different network identifiers. In other words, the first transport block is scrambled by using a first network identifier, the second transport block is scrambled by using a second network identifier, and the first network identifier is different from the second network identifier. The first network identifier and the second network identifier may be predefined, or may be notified by using higher layer signaling or dynamic signaling. It should be understood that, the network device determines that the first transport block scrambled by using the first network identifier and the second transport block scrambled by using the second network identifier can be used for joint decoding.

4. The first transport block is mapped to at least one port in a first port number group of a demodulation reference signal (DMRS); the second transport block is mapped to at least one port in a second port number group of the DMRS; and a port number in the first port number group is different from a port number in the second port number group. Specifically, the first port number group includes two or more port numbers, and the second port number group includes two or more port numbers. For example, the port numbers included in the first port number group are 0, 1, 2, and 3, and the first transport block is mapped to at least one of the port numbers 0, 1, 2, and 3; and the port numbers included in the second port number group are 4, 5, 6, 7, and the second transport block is mapped to at least one of the port numbers 4, 5, 6, and 7. The first port number group and the second port number group may be predefined, or may be notified by using higher layer signaling or dynamic signaling. It should be understood that, the network device determines transport blocks received based on the first port number group and the second port number group as transport blocks that can be used for combined reception in the at least two transport blocks. In this manner, the network device can dynamically determine transport blocks used for combined reception or transport blocks used for joint decoding.

5. The first transport block and the second transport block are in a first time period in time domain. 6. The first transport block and the second transport block are corresponding to a same precoding matrix parameter or different precoding matrix parameters. 7. The first transport block and the second transport block are corresponding to a same cell index or different cell indexes. 8. The first transport block and the second transport block are corresponding to a same joint identifier.

It should be noted that, parameter values of at least one parameter indicated by the foregoing first indication information may be used in combination. Therefore, the first transport block and the second transport block further satisfy a result presented by combining two or more parameters. For example, the first transport block and the second transport block are in the first time period in time domain, and the first transport block and the second transport block are scrambled by using different network identifiers. The first transport block and the second transport block are in the first time period, and the first transport block and the second transport block are corresponding to a same precoding matrix parameter or different precoding matrix parameters. The first transport block and the second transport block are in the first time period in time domain, and the first transport block and the second transport block are corresponding to a same cell index or different cell indexes. The first transport block and the second transport block are in the first time period in time domain, and the first transport block and the second transport block are corresponding to a same joint identifier. The first transport block and the second transport block are corresponding to a same precoding matrix parameter or different precoding matrix parameters, and the first transport block and the second transport block are corresponding to a same cell index or different cell indexes. The first transport block and the second transport block are in the first time period in time domain, the first transport block and the second transport block are corresponding to a same joint identifier, and the first transport block and the second transport block are corresponding to a same precoding matrix parameter or different precoding matrix parameters.

It can be understood that, when the terminal device determines that a transport block satisfies a parameter value of the at least one parameter indicated by the first indication information, the transport block is a transport block that can be used for duplicate transmission. The first indication information may be higher layer signaling (semi-static signaling) or dynamic signaling, or may be predefined.

Specifically, in another aspect, S101 in this application may be determined in the following manner:

S1013. The terminal device determines second indication information, where the second indication information is used to indicate a parameter value of at least one parameter corresponding to the at least two transport blocks, and the at least one parameter includes one or more of the following parameters: a transport block size, an HARQ process number, a new data indicator (NDI), an HARQ-ACK resource, a redundancy version (RV), a time domain resource and/or a frequency domain resource, a first timer start time, and a joint identifier, where the joint identifier is used to indicate transport blocks used for joint decoding.

Optionally, the second indication information in this application may be sent by the network device to the terminal device, or may be sent by another device to the network device. This is not limited in this application. In other words, before S103, the procedure further includes:

S108. The network device sends the second indication information to the terminal device, where the second indication information may be higher layer signaling (semi-static signaling) or dynamic signaling, or may be predefined.

S1014. The terminal device determines the at least two transport blocks based on the second indication information.

Specifically, the at least two transport blocks include a first transport block and a second transport block; the second indication information indicates that a third parameter in the at least one parameter is corresponding to a plurality of parameter values, and parameter values of third parameters corresponding to the first transport block and the second transport block are different; and/or the second indication information indicates that a fourth parameter in the at least one parameter is corresponding to one parameter value, and parameter values of fourth parameters corresponding to the first transport block and the second transport block are the same.

The third parameter may be one or more of parameters indicated by the second indication information, and the fourth parameter may be one or more of the parameters indicated by the second indication information.

For example, third parameters corresponding to the at least two transport blocks are HARQ process numbers, and the first transport block and the second transport block have different HARQ process numbers. The terminal device may perform duplicate transmission on transport blocks corresponding to two different HARQ process numbers. It can be understood that an association relationship between the at least two HARQ process numbers may be predefined, or may be notified by using higher layer signaling or dynamic signaling.

For example, fourth parameters corresponding to the at least two transport blocks are redundancy versions. For example, the first transport block and the second transport block have different redundancy versions: RV=0 and RV=3. The terminal device may perform duplicate transmission on transport blocks with two different redundancy versions. It can be understood that an association relationship between the at least two redundancy versions may be predefined, or may be notified by using higher layer signaling or dynamic signaling.

In still another example, third parameters corresponding to the at least two transport blocks are a first time domain and/or frequency domain resource and a second time domain and/or frequency domain resource. For example, the first transport block is corresponding to the first time domain and/or frequency domain resource, and the second transport block is corresponding to the second time domain and/or frequency domain resource. The first time domain and/or frequency domain resource is different from the second time domain and/or frequency domain resource. For example, the terminal device may perform duplicate transmission on transport blocks on different frequency domain resources. It can be understood that an association relationship between the at least two frequency domain resources may be predefined, or may be notified by using higher layer signaling or dynamic signaling.

In still another example, third parameters corresponding to the at least two transport blocks are transport block sizes, and the first transport block and the second transport block have a same transport block size or different transport block sizes. The terminal device may perform duplicate transmission on transport blocks of different transport block sizes. It can be understood that an association relationship between the at least two transport block sizes may be predefined, or may be notified by using higher layer signaling or dynamic signaling. Further, the at least two transport block sizes belong to a same transport block set, or a difference between the at least two transport block sizes falls within a difference range. For example, a difference between 100 bits and 99 bits is 1 bit. Assuming that the difference range is defined as 8 bits, transport blocks corresponding to the two transport block sizes are at least two transport blocks that can be used for joint decoding. The transport block set and the difference range indicate an association relationship between the at least two transport block sizes.

For example, third parameters corresponding to the at least two transport blocks are NDIs. For example, both the first transport block and the second transport block have flipped NDIs. For example, the NDIs corresponding to the first transport block and the second transport block may be 1.

The third parameter may be one or more of parameters indicated by the second indication information, and the fourth parameter may be one or more of the parameters indicated by the second indication information.

For example, fourth parameters corresponding to the at least two transport blocks are HARQ process numbers, and the first transport block and the second transport block have a same HARQ process number. Therefore, the first transport block and the second transport block can be used for duplicate transmission.

For example, fourth parameters corresponding to the at least two transport blocks are redundancy versions. For example, the first transport block and the second transport block have a same redundancy version: RV=3. Therefore, the first transport block and the second transport block can be used for duplicate transmission.

For example, fourth parameters corresponding to the at least two transport blocks are NDIs. For example, the first transport block and the second transport block have a same NDI. For example, NDI=0 or 1. Therefore, the first transport block and the second transport block can be used for duplicate transmission.

In still another example, third parameters corresponding to the at least two transport blocks are a first time domain and/or frequency domain resource and a second time domain and/or frequency domain resource. For example, the first transport block is corresponding to the first time domain and/or frequency domain resource, and the second transport block is corresponding to the second time domain and/or frequency domain resource. The first frequency domain resource is the same as the second frequency domain resource, and/or the first time domain resource is the same as or partially overlaps the second time domain resource. Therefore, the first transport block and the second transport block can be used for duplicate transmission.

In still another example, fourth parameters corresponding to the at least two transport blocks are transport block sizes (TBS). For example, the first transport block and the second transport block are transport blocks of a same transport block size, and therefore can be used for duplicate transmission. For example, TBS is 256 bits, or TBS+cyclic redundancy check (CRC) is equal to 256 bits plus 24 bits.

In still another example, fourth parameters corresponding to the at least two transport blocks are a first timer start time and an HARQ process number. For example, both the first transport block and the second transport block are transport blocks that are within the first timer start time and that have a same HARQ process number, and therefore can be used for duplicate transmission.

In still another example, fourth parameters corresponding to the at least two transport blocks are a first time domain and/or frequency domain resource and a second time domain and/or frequency domain resource, and fourth parameters corresponding to the at least two transport blocks are HARQ process numbers. For example, the first transport block is corresponding to the first time domain and/or frequency domain resource, the second transport block is corresponding to the second time domain and/or frequency domain resource, and the first transport block and the second transport block have a same HARQ process number.

In still another example, if fourth parameters corresponding to the at least two transport blocks are transport block sizes, and third parameters corresponding to the at least two transport blocks are a first HARQ-ACK resource and a second HARQ-ACK resource, the first transport block and the second transport block have a same transport block size, the first transport block is corresponding to the first HARQ-ACK resource, and the second transport block is corresponding to the second HARQ-ACK resource.

In still another example, if third parameters corresponding to the at least two transport blocks are NDIs, and corresponding third or fourth parameters are transport block sizes, the first transport block and the second transport block have a same transport block size, the first transport block is corresponding to a first NDI, and the second transport block is corresponding to a second NDI. The first NDI and the second NDI may be the same or may be different, but an association relationship between the two NDIs depends on whether the first NDI is flipped compared with previous transmission. When both the first NDI and the second NDI indicate NDIs flipped in current transmission (that is, initial transmission is performed, but specific values of the first NDI and the second NDI may be different or may be the same), the first transport block and the second transport block can be used for duplicate transmission. When both the first NDI and the second NDI indicate NDIs that are not flipped in current transmission (that is, retransmission is performed, but specific values of the first NDI and the second NDI may be different or may be the same), the first transport block and the second transport block can also be used for joint decoding. When the first NDI indicates an NDI flipped in current transmission and the second NDI indicates an NDI that is not flipped in current transmission (that is, initial transmission and retransmission are performed, but specific values of the first NDI and the second NDI may be different or may be the same), the first transport block and the second transport block cannot be used for duplicate transmission.

Specifically, according to indication of the second indication information, the at least two transport blocks satisfy at least one of the following: sizes of the at least two transport blocks are equal to the transport block size indicated by the second indication information; the at least two transport blocks are transport blocks within the first timer start time indicated by the second indication information; the at least two transport blocks are transport blocks corresponding to the HARQ process number indicated by the second indication information; the at least two transport blocks are transport blocks on the time domain resource and/or the frequency domain resource indicated by the second indication information; the at least two transport blocks are transport blocks corresponding to the NDI indicated by the second indication information; the at least two transport blocks are transport blocks on the HARQ-ACK resource indicated by the second indication information; and the at least two transport blocks are transport blocks whose corresponding redundancy version RV is the redundancy version indicated by the second indication information.

It can be understood that, in this application, according to indication of the second indication information, the at least two transport blocks satisfy a case in which parameters indicated by the second indication information are used in combination. For example, sizes of the at least two transport blocks are equal to the transport block size indicated by the second indication information, and the at least two transport blocks further satisfy at least one of the following: the at least two transport blocks are transport blocks received by the terminal device within the first timer start time indicated by the second indication information; the sizes of the at least two transport blocks are equal to the transport block size indicated by the second indication information, and the at least two transport blocks are transport blocks received by the terminal device based on the HARQ process number indicated by the second indication information; the sizes of the at least two transport blocks are equal to the transport block size indicated by the second indication information, and the at least two transport blocks are transport blocks received by the terminal device on the HARQ-ACK resource indicated by the second indication information; a redundancy version RV corresponding to the at least two transport blocks is the redundancy version indicated by the second indication information; and the at least two transport blocks are transport blocks received by the terminal device based on the NDI indicated by the second indication information. It should be noted that only states of the at least two transport blocks are listed above. Specifically, in an actual process, the states of the at least two transport blocks may alternatively be a combination of the at least one parameter indicated by the second indication information. Details are not described in this application.

It can be understood that when the terminal device determines that a transport block satisfies the parameter value of the at least one parameter indicated by the second indication information, the transport block is a transport block that can be used for duplicate transmission.

Specifically, S1014 in this application may be implemented in a plurality of manners.

B1. The terminal device determines the at least two transport blocks based on the transport block size indicated by the first indication information.

In this way, when receiving the transport blocks, the network device may determine a size of each transport block based on information, such as a modulation and coding scheme (MCS), in uplink control information (UCI).

Example 1

The terminal device determines that sizes of the at least two transport blocks belong to a first transport block set. The first transport block set includes a size of at least one transport block. Optionally, the terminal device determines transport blocks that are in a plurality of transport blocks and whose transport block sizes are less than or equal to a first transport block size threshold and/or greater than or equal to a second transport block size threshold, as transport blocks in the at least two transport blocks. In this way, the network device may determine transport blocks whose transport block sizes are less than or equal to a first transport block size and/or greater than or equal to a second transport block size, as the at least two transport blocks. Optionally, the terminal device determines transport blocks whose transport block sizes belong to a same transport block set and/or transport blocks whose transport block size difference falls within a difference range, as the at least two transport blocks.

Example 2

The terminal device determines transport blocks that are in a plurality of transport blocks and whose transport block sizes are the same as the transport block size indicated by the second indication information, as transport blocks in the at least two transport blocks. In other words, the terminal device transmits the at least two transport blocks of a same size to the network device. In this way, the network device can perform joint decoding by using the at least two transport blocks that has undergone duplicate transmission.

B2. If the second indication information is corresponding to the first timer start time of the at least two transport blocks, the terminal device determines transport blocks that are in a plurality of transport blocks and whose times are within the first timer start time indicated by the second indication information, as the at least two transport blocks. In this way, the network device can perform joint decoding by using the at least two transport blocks that has undergone duplicate transmission.

Specifically, the first timer start time may be determined based on that a time at which the terminal device receives the first configuration information, the first indication information, the second indication information, or the first information plus K symbols or a slot K is greater than or equal to 0. First timer duration may be a predefined time length, or may be indicated in other information received before the first configuration information, the first indication information, the second indication information, or the first information. This is not limited in this application.

B3. If the second indication information indicates a same process number of different frequency domain resources corresponding to the at least two transport blocks, the terminal device determines transport blocks that are on the different frequency domain resources and that have the same process number as the at least two transport blocks. This is because when the terminal device schedules the same process number, it is considered that this indicates that the current transport blocks carry same information or information from a same information source.

For example, the terminal device determines a transport block 1 corresponding to a first process number of a first frequency domain resource (carrier) as a transport block in the at least two transport blocks, and determines a transport block 2 corresponding to the first process number of a second frequency domain resource (carrier) as a transport block in the at least two transport blocks.

Example 2

The terminal device determines transport blocks that are on different frequency domain resources and that have process numbers having a correspondence, as transport blocks in the at least two transport blocks. This is because when the terminal device schedules the process numbers having a correspondence, it is considered that this indicates that the current transport blocks TBs are used for duplicate transmission.

For example, the terminal device determines a transport block 1 corresponding to a first process number of a first frequency domain resource (carrier) and a transport block 2 corresponding to a second process number of a second frequency domain resource (carrier), as the at least two transport blocks. There is an association relationship between the first process number and the second process number. In this way, the network device may determine that the transport block 1 received based on the first process number of the first frequency domain resource and the transport block 2 transmitted based on the second process number of the second frequency domain resource (carrier) may be used for joint decoding. The association relationship between the first process number and the second process number may be predefined, or may be notified by using higher layer signaling or dynamic signaling.

B4. If the second indication information is used to indicate the NDI, the terminal device determines transport blocks that are in a plurality of transport blocks and that are corresponding to NDIs the same as the NDI indicated by the second indication information, as the at least two transport blocks.

Specifically, B4 may be implemented in the following manners:

Example 1

The terminal device sends the at least two transport blocks corresponding to a same NDI to the network device. In this way, the network device determines that the received transport blocks are corresponding to a same NDI, and in this case, the network device determines that the received transport blocks can be used for joint decoding.

Example 2

The terminal device sends the at least two transport blocks whose NDIs are flipped NDIs (indicating initial transmission) to the network device. In this way, the network device determines that NDIs corresponding to the received transport blocks are flipped NDIs, and determines that the received transport blocks are used for joint decoding. Flipping of an NDI new data indicator can be understood as: For example, the NDI indicates 0 last time but indicates 1 this time; or there is no NDI last time, and then it is considered that current transmission is initial transmission.

Therefore, when the terminal device performs determining based on the NDI indicated by the second indication information, and performs duplicate transmission on the at least two transport blocks, the network device can perform joint decoding by using the at least two transport blocks that has undergone duplicate transmission.

B5. If the second indication information is used to indicate HARQ-ACK resources indicated in DCI corresponding to the at least two transport blocks, the terminal device determines transport blocks that are in a plurality of transport blocks and that are corresponding to HARQ-ACK resources the same as the HARQ-ACK resources indicated by the first indication information, as the at least two transport blocks. In this way, the network device can determine the at least two transport blocks based on an HARQ-ACK resource corresponding to each received transport block.

For example, the terminal device determines an HARQ-ACK resource indicated in DCI corresponding to each of the plurality of transport blocks, and sends the at least two transport blocks on a same HARQ-ACK resource to the network device. The same HARQ-ACK resource may be at least one of a same frequency domain resource, a same code domain resource, a same time domain resource, and a same mapping mode. This is not limited in this application.

B6. If the second indication information indicates redundancy versions (RV) corresponding to the at least two transport blocks, the terminal device determines transport blocks that are in a plurality of transport blocks and whose redundancy versions are the redundancy versions indicated by the second indication information, as transport blocks in the at least two transport blocks. The network device can perform joint decoding by using the at least two transport blocks that has undergone duplicate transmission.

It can be understood that before the terminal device sends the at least two transport blocks to the network device, redundancy versions of the at least two transport blocks are the same as the redundancy versions indicated by the second indication information. In this way, the network device can determine, based on an RV version indicated in DCI corresponding to each of the plurality of transport blocks, transport blocks whose RV versions are the same, as the at least two transport blocks.

For example, the terminal device determines the RV version indicated in the DCI corresponding to each of the plurality of transport blocks, and determines transport blocks whose RV versions are the same as the RV versions indicated by the second indication information, as the at least two transport blocks. For example, if the RV versions indicated by the second indication information are {0, 3}, the terminal device determines transport blocks that are in the plurality of transport blocks and whose RV versions are 0 and 3, as the at least two transport blocks.

It should be noted that the redundancy versions of the at least two transport blocks in this application include at least RV=0 or RV=3. This is because self-decoding can be performed when RV=0 or RV=3, without depending on reception of another redundancy version.

Optionally, when a quantity of the at least two transport blocks is greater than or equal to 4, RVs corresponding to the transmitted transport blocks definitely include {0, 2, 3, 1}. In other words, the at least four transport blocks include transport blocks corresponding to all redundancy versions. When a quantity of the at least two transport blocks is less than 4, redundancy versions of the at least two transport blocks include at least RV=0 or RV=3. For example, if the at least two transport blocks are a transport block 1, a transport block 2, and a transport block 3, a redundancy version combination corresponding to the transport block 1, the transport block 2, and the transport block 3 may be either of the following: {0, 2, 3} and {0, 3, 1}.

It should be noted that in this application, the terminal device receives the first indication information only in the first time period, to determine to decode the first information in the at least two transport blocks. In other words, the terminal device detects the first indication information and determines content indicated by the first indication information, only after receiving the second indication information.

Figure 5:
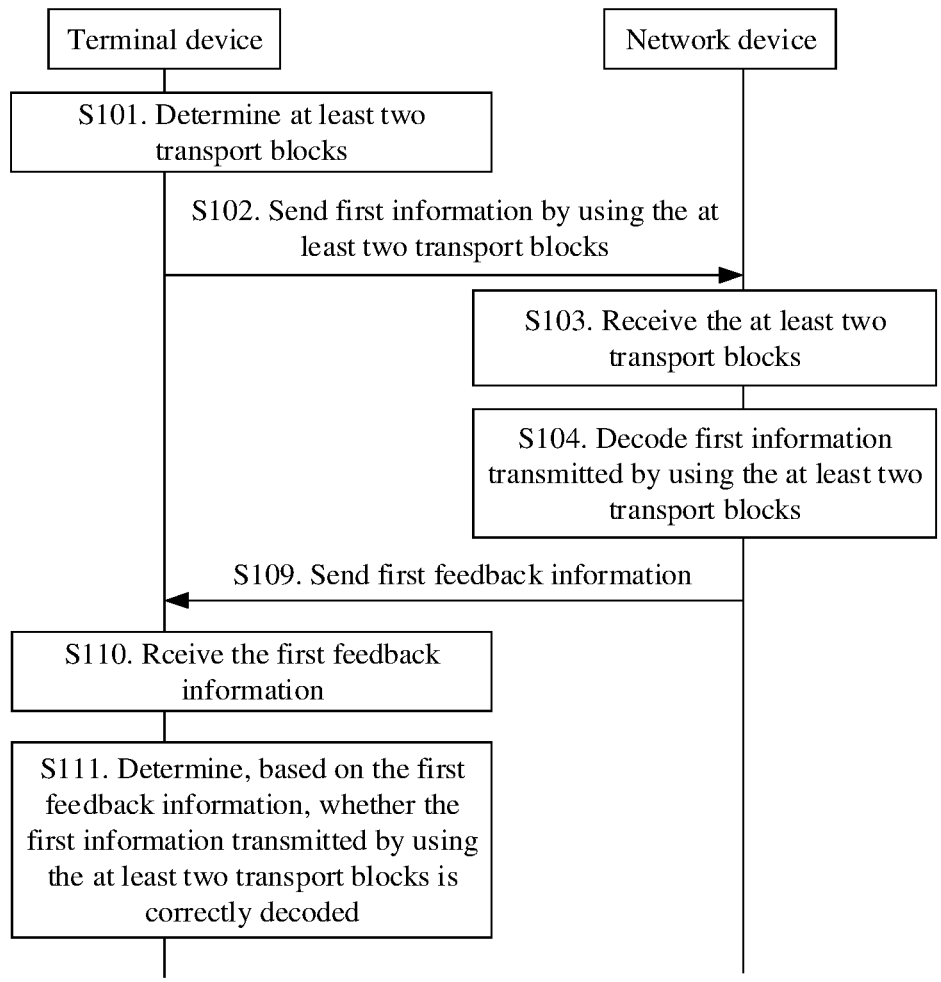
FIG. 5 is a second schematic flowchart of interaction in an information sending method and an information receiving method according to this application.

After receiving the first information in the at least two transport blocks, the network device may correctly decode or may fail to correctly decode the first information in the at least two transport blocks. Therefore, the network device may provide a feedback to indicate whether the network device correctly decodes the first information or fails to correctly decode the first information, and the terminal device determines whether to retransmit the first information or transmit information other than the first information. As shown in FIG. 5, the method provided in this application includes the following steps.

S109. The network device sends first feedback information to the terminal device, where the first feedback information is used to indicate that the network device correctly decodes or incorrectly decodes the first information in the at least two transport blocks.

In one aspect, the first feedback information in this application may be fed back by the terminal device to the network device based on the at least two transport blocks, and the first feedback information may be a negative acknowledgment (NACK)/acknowledgment (ACK) whose size is equal to 1 bit or a NACK/ACK whose size is N bits, where N is an integer greater than or equal to 2. In this case, the first feedback information may also be a bit sequence. Each bit in the bit sequence is used to indicate whether information transmitted by using a transport block associated with the bit is correctly decoded. For example, the bit sequence is 011, where 0 is associated with a transport block 1, 1 corresponding to a second bit and 1 corresponding to a third bit in the bit sequence 011 are respectively associated with a transport block 2 and a transport block 3. When 0 indicates that decoding is incorrectly performed, and 1 indicates that decoding is correctly performed, the bit sequence 011 may indicate that information in the transport block 1 is incorrectly decoded and information in the transport block 2 and the transport block 3 is correctly decoded.

Specifically, the first feedback information is first acknowledgment information or second acknowledgment information, and the first acknowledgment information is used to indicate that the terminal device correctly decodes the first information in the at least two transport blocks. The second acknowledgment information is used to indicate that the terminal device incorrectly decodes the first information in the at least two transport blocks.

To reduce signaling overheads, optionally, the first acknowledgment information is a first sequence, and the second acknowledgment information is a second sequence. The sequence may be a reference signal sequence or a Zadoff-Chu sequence.

For example, the first acknowledgment information indicates a NACK. To be specific, the first acknowledgment information indicates that the network device incorrectly decodes the first information in the at least two transport blocks. The second acknowledgment information indicates an ACK. To be specific, the second acknowledgment information indicates that the network device correctly decodes the first information in the at least two transport blocks. Optionally, the first acknowledgment information is 0, and the second acknowledgment information is 1.

Specifically, that the network device correctly decodes the first information transmitted by using the at least two transport blocks includes one of the following:

1. The network device correctly decodes at least one of the at least two transport blocks, to obtain the first information.

When the network device receives a plurality of transport blocks, the network device feeds back an ACK to the terminal device when determining that information in at least one transport block is correctly decoded. On the contrary, the network device feeds back a NACK to the terminal device when determining that information in the plurality of transport blocks is incorrectly decoded.

2. A quantity of times the network device correctly decodes the first information in the at least two transport blocks is greater than or equal to a quantity of times the network device incorrectly decodes the first information in the at least two transport blocks. This condition is usually applicable to a scenario that has a high reliability requirement. If there is only one ACK, it does not necessarily mean that decoding is correctly performed. It is considered that decoding is correctly performed only when the quantity of times the network device correctly decodes the first information in the at least two transport blocks is greater than or equal to the quantity of times the network device incorrectly decodes the first information in the at least two transport blocks. Therefore, when a plurality of transport blocks are received, an ACK is fed back if "a quantity of correctly received transport blocks is greater than or equal to a quantity of incorrectly received transport blocks"; and a NACK is fed back if "the quantity of correctly received transport blocks is less than the quantity of incorrectly received transport blocks".

3. The network device correctly jointly decodes a plurality of transport blocks in the at least two transport blocks at least once.

Specifically, that the network device incorrectly decodes the first information transmitted by using the at least two transport blocks includes one of the following:

The network device fails to correctly decode any one of the at least two transport blocks; a quantity of times the network device correctly decodes a transport block in the at least two transport blocks is less than a quantity of times the network device incorrectly decodes a transport block in the at least two transport blocks; and the network device fails to correctly jointly decode the plurality of transport blocks in the at least two transport blocks.

In another aspect, the first feedback information in this application is fed back by the network device to the terminal device based on each of the at least two transport blocks, and the network device feeds back at least one bit of HARQ to the terminal device based on each transport block. Optionally, when the first feedback information is fed back by the network device to the terminal device based on each transport block, the first feedback information fed back based on each transport block may carry an identifier of the transport block.

S110. The terminal device receives the first feedback information sent by the network device.

S111. The terminal device determines, based on the first feedback information, whether the network device correctly decodes or incorrectly decodes the first information transmitted by using the at least two transport blocks.

Specifically, in one aspect, when the first feedback information is fed back by the network device to the terminal device based on the at least two transport blocks, the terminal device may directly determine, based on the first feedback information, that the network device correctly decodes or incorrectly decodes the first information transmitted by using the at least two transport blocks. Specifically, S111 may specifically be implemented in the following manner:

When the first feedback information indicates that the network device correctly decodes the first information transmitted by using the at least two transport blocks, the terminal device determines that the network device correctly decodes the first information transmitted by using the at least two transport blocks. When the first feedback information indicates that the network device incorrectly decodes the first information transmitted by using the at least two transport blocks, the terminal device determines that the network device incorrectly decodes the first information transmitted by using the at least two transport blocks. When the first feedback information indicates that the network device jointly decodes a plurality of transport blocks in the at least two transport blocks, but the first information is not obtained, the terminal device determines that the network device incorrectly decodes the first information transmitted by using the at least two transport blocks. If the first feedback information indicates that the network device jointly decodes a plurality of transport blocks in the at least two transport blocks to obtain the first information, the terminal device determines that the network device correctly decodes the first information transmitted by using the at least two transport blocks.

In another aspect, when the first feedback information is fed back by the network device to the terminal device based on each of the at least two transport blocks, Sill may specifically be implemented in the following manner.

S1111. If the terminal device determines that the network device correctly decodes a transport block in the at least two transport blocks at least once, the terminal device determines that the network device correctly decodes the first information transmitted by using the at least two transport blocks.

Specifically, if the terminal device determines that the first feedback information includes at least one piece of first sub-feedback information, and the at least one piece of first sub-feedback information is used to indicate that the network device correctly decodes a transport block in the at least two transport blocks, the terminal device determines that the network device correctly decodes the first information transmitted by using the at least two transport blocks.

S1112. If the terminal device determines that a quantity of times the network device correctly decodes a transport block in the at least two transport blocks is greater than or equal to a quantity of times the network device incorrectly decodes a transport block in the at least two transport blocks, the terminal device determines that the network device correctly decodes the first information transmitted by using the at least two transport blocks.

Specifically, if the terminal device determines that a quantity of pieces of first sub-feedback information that is included in the first feedback information and that indicates that the network device correctly decodes a transport block in the at least two transport blocks is greater than or equal to a quantity of pieces of first sub-feedback information that is included in the first feedback information and that indicates that the network device incorrectly decodes a transport block in the at least two transport blocks, the terminal device determines that the network device correctly decodes the first information transmitted by using the at least two transport blocks.

S1113. If the terminal device determines that the network device jointly decodes a plurality of transport blocks in the at least two transport blocks to obtain the first information, the terminal device determines that the network device correctly decodes the first information transmitted by using the at least two transport blocks.

S1114. If the terminal device determines that a quantity of times the network device correctly decodes a transport block in the at least two transport blocks is less than a quantity of times the network device incorrectly decodes a transport block in the at least two transport blocks, the terminal device determines that the network device incorrectly decodes the first information transmitted by using the at least two transport blocks.

S1115. If the terminal device determines that the network device fails to correctly decode any one of the at least two transport blocks, the terminal device determines that the network device incorrectly decodes the first information transmitted by using the at least two transport blocks.

S1116. If the terminal device determines that the network device fails to correctly jointly decode a plurality of transport blocks in the at least two transport blocks, the terminal device determines that the network device incorrectly decodes the first information transmitted by using the at least two transport blocks.

It should be noted that, in this application, the network device feeds back the first feedback information to the terminal device. In this way, after receiving the first feedback information, the terminal device can determine, based on the first feedback information, whether the network device correctly decodes the first information transmitted by using the at least two transport blocks; and when the terminal device determines that the network device correctly decodes the first information transmitted by using the at least two transport blocks, the terminal device can transmit, to the network device by using other two or more transport blocks, information different from the first information in the at least two transport blocks. For example, if the first information in the at least two transport blocks is A, after the network device feeds back the feedback information indicating that decoding is correctly performed, the terminal device may send information B to the network device. When the terminal device determines that the network device incorrectly decodes the first information transmitted by using the at least two transport blocks, the terminal device can continue to transmit, to the network device, information that is the same as the first information transmitted by using the at least two transport blocks. For example, if the first information in the at least two transport blocks is A, after the network device feeds back feedback information indicating that decoding is incorrectly performed, the terminal device may continue to transmit A to the network device.

When the terminal device sends the first information to the network device, performance of information in all of a plurality of transport blocks is different. For example, performance of initially transmitted information may be higher than performance of retransmitted information, or performance of retransmitted information is higher than a function of initially transmitted information. That performance of initially transmitted information is higher than a function of retransmitted information is used as an example. The network device determines the initially transmitted information, helping to combine subsequent packets successively. If combination and decoding are performed from information with good performance to information with poor performance, a quantity of times of combination and decoding can be reduced, thereby saving power. Information carried in each of the at least two transport blocks may be corresponding to the following scenarios:

Scenario 1: One of the at least two transport blocks is used for initial transmission, and a transport block, other than the one transport block, in the at least two transport blocks is used for retransmission. Scenario 2: Each of the at least two transport blocks is used for retransmission. Scenario 3: Each of the at least two transport blocks is used for initial transmission. Because manners in which the terminal device decodes the first information in the at least two transport blocks are different in different scenarios, the following separately describes the manners.

That a transport block is used for initial transmission can be understood as: Information transmitted by using the transport block is initially transmitted information, and that a transport block is used for retransmission can be understood as: Information transmitted by using the transport block is retransmitted information.

In one aspect, in Scenario 1, S104 in this application may alternatively be implemented in the following manner.

S1041. The network device separately decodes a transport block used for initial transmission, and decodes at least one transport block used for retransmission, to obtain the first information; and/or the network device jointly decodes a transport block used for initial transmission and at least one transport block used for retransmission in the at least two transport blocks, to obtain the first information.

It can be understood that, in this application, performance of information transmitted by using a transport block used for initial transmission is higher than performance of information transmitted by using a transport block used for retransmission. In a plurality of transport blocks used for retransmission and carrying same information or a plurality of transport blocks used for retransmission and carrying information from a same information source, performance of information in a transport block used for retransmission and having a higher priority is higher than performance of information in a transport block used for retransmission and having a lower priority; and in a plurality of transport blocks used for initial transmission and carrying same information or a plurality of transport blocks used for initial transmission and carrying information from a same information source, performance of information in a transport block used for initial transmission and having a higher priority is higher than performance of information in a transport block used for initial transmission and having a lower priority.

Specifically, the terminal device may determine, based on the following parameters, that one of the at least two transport blocks is a transport block used for initial transmission:

The parameters include: a carrier index number, a BWP index number, an RNTI index number, a layer index number, a reference signal sequence group index, a start time of a time domain resource, a length of a time domain resource, an index number of a frequency domain resource PRB, a quantity of frequency domain resources PRBs, a block error rate, a block error rate BLER value, and an RV version.

Specifically, in this application, each of the at least two transport blocks is corresponding to one carrier index number, one BWP index number, one RNTI index number, one layer index number, and one reference signal sequence group index, and the carrier index number, the BWP index number, the RNTI index number, the layer index number, and the reference signal sequence group index that are corresponding to each of the at least two transport blocks may be sorted in a preset order (in descending order of the index numbers or in ascending order of the index numbers). In this way, based on the preset order, the terminal device may determine a transport block with a largest index number as a transport block used for initial transmission, or determine a transport block with a smallest index number as a transport block used for retransmission. After determining the transport block used for initial transmission, the terminal device may successively determine, based on the preset order, an order of decoding all pieces of first information and/or an order of combining first information in the transport block used for initial transmission and first information in at least one transport block used for retransmission. For example, sorting is performed in ascending order or descending order. This is not limited in this application.

For example, a carrier index number corresponding to a transport block 1 is 1, a carrier index number corresponding to a transport block 2 is 2, and a carrier index number corresponding to a transport block 3 is 3. When the preset order is an ascending order, the terminal device may determine the transport block 1 as a transport block used for initial transmission and carrying initially transmitted information, and determines the transport block 2 and the transport block 3 as transport blocks used for retransmission and carrying retransmitted information; and may determine to first decode information in the transport block 2 and then decode information in the transport block 3. After the decoding, the terminal device combines information in the transport block 1, the information in the transport block 2, and the information in the transport block 3 based on the information in the transport block 1, the information in the transport block 2, and the information in the transport block 3.

Specifically, in this application, a time domain resource on which each transport block is located is corresponding to a start time, and start times of time domain resources on which all the transport blocks are located are sorted in a preset time order. In this way, the terminal device can determine a transport block on a time domain resource with an earliest start time as a transport block used for initial transmission, or determine a transport block on a time domain resource with a latest start time as a transport block used for initial transmission. This is not limited in this application. For a manner in which the terminal device determines, based on a start time corresponding to a time domain resource on which each transport block is located, a transport block used for retransmission, refer to the foregoing manner in which the carrier index number is used as an example. Details are not described again in this application.

Specifically, in this application, lengths of time domain resources on which all transport blocks are located are sorted in a preset order, for example, sorted in descending order or descending order. For example, a transport block on a time domain resource with a shortest length in the at least two transport blocks is determined as a transport block used for initial transmission, or a transport block on a time domain resource with a longest length in the at least two transport blocks is determined as a transport block used for initial transmission. For a manner in which the terminal device determines, based on a length of a time domain resource on which each transport block is located, a transport block used for retransmission, refer to the foregoing manner in which the carrier index number is used as an example. Details are not described again in this application.

Specifically, in this application, index numbers of frequency domain resources PRBs on which all transport blocks are located are sorted in a preset order, and the terminal device may determine a transport block on a frequency domain resource PRB with a smallest or largest index number in the at least two transport blocks as a transport block used for initial transmission. Quantities of frequency domain resources PRBs on which all the transport blocks are located are sorted in a preset order, and the terminal device may determine a transport block on a smallest or largest quantity of frequency domain resources PRBs in the at least two transport blocks as a transport block used for initial transmission.

Specifically, in this application, each transport block is corresponding to one RV version, and the terminal device may determine a transport block corresponding to a redundancy version 0 or 3 as a transport block used for initial transmission.

Specifically, in this application, each transport block is corresponding to a small (large) BLER. For example, a BLER $10^{-5}$ is corresponding to a transport block used for initial transmission. A lower block error rate indicates a higher success rate. For example, a BLER $10^{-3}$ is corresponding to a transport block used for initial transmission, and fewer resources are used when a block error rate is higher, thereby reducing resource consumption.

In this application, each transport block is corresponding to one modulation and coding scheme (MCS) index, and modulation and coding scheme indexes corresponding to all the transport blocks are sorted in a preset order. The terminal device may determine a transport block corresponding to a largest modulation and coding scheme index in the at least two transport blocks as a transport block used for initial transmission. This is because an MCS is corresponding to a block error rate, and a larger MCS indicates better channel quality. In this way, a lower block error rate leads to a higher success rate.

In this application, each transport block is corresponding to one code rate (referred to as a code rate for short). The terminal device may determine a transport block corresponding to a lowest code rate in the at least two transport blocks as a transport block carrying initially transmitted information. A code rate is corresponding to a block error rate. A lower code rate indicates a lower block error rate, and in this way, a success rate is higher.

It should be noted that, a rule for determining, by the terminal device, a transport block used for initial transmission and a rule for determining, by the terminal device, a transport block used for retransmission are configured on the network device side.

In another aspect, in Scenario 2, S104 may alternatively be implemented in the following manner.

S1042. The network device decodes at least one transport block used for retransmission in the at least two transport blocks, to obtain the first information; and/or the network device jointly decodes a plurality of transport blocks used for retransmission in the at least two transport blocks, to obtain the first information.

It can be understood that, a case in which a plurality of transport blocks carry the first information is applicable to only retransmission, while during initial transmission, only one transport block is used to transmit the first information, which is the same as that in the prior art.

Optionally, in this application, the network device may determine a transport block that carries same first information as that in the at least two transport blocks and that is transmitted before the at least two transport blocks, as a transport block used for initial transmission. This is because a BLER corresponding to a transport block used for initial transmission may be $10e^{-1}$. To save resources, a BLER of retransmission should be $10e^{-4}$ or $10e^{-5}$. To ensure overall reliability, retransmission reliability needs to be further improved.

In still another aspect, in Scenario 3, S104 in this application may alternatively be implemented in the following manner:

S1043. The network device separately decodes at least one transport block used for initial transmission in the at least two transport blocks, to obtain the first information; and/or the network device jointly decodes a plurality of transport blocks used for initial transmission in the at least two transport blocks, to obtain the first information. Optionally, in this application, time domain resources on which the at least two transport blocks are located partially or completely overlap.

Optionally, in another embodiment of this application, the method in this application is also applicable to the following application scenario. To be specific, when sending the first information to the network device, the terminal device further sends second information. In this case, the terminal device may send the first information to the network device by using a plurality of transport blocks included in a first transport block group, and send the second information to the network device by using at least one transport block included in a second transport block group. Specifically, the at least two transport blocks belong to the first transport block group. The method provided in this application further includes the following steps.

S112. The terminal device determines third indication information, where the third indication information is used to indicate a parameter value of at least one parameter corresponding to a second transport block group, and second information transmitted by using a second transport block group is different from the first information.

Optionally, the third indication information may be sent by the network device to the terminal device, or may be sent by another terminal device that performs information transmission with the terminal device to the terminal device. When the third indication information is sent by the network device to the terminal device, before S112, the procedure in this application further includes: S113. The network device sends the third indication information to the terminal device. Correspondingly, S112 may be implemented in the following manner: The terminal device receives the third indication information from the network device.

It can be understood that, S113 may be sending, by the network device, the third indication information under triggering of the terminal device. For example, when determining that information different from the first information needs to be transmitted, the terminal device may send a second request message to the network device. The second request message is used to instruct the network device to indicate the second transport block group to the terminal device. Alternatively, the network device may preconfigure a plurality of transport block groups for the terminal device, and different transport block groups are used to transmit different information. In this case, the third indication information may be sent to the terminal device together with the first indication information or the second indication information. In addition, in this application, after receiving the first indication information and the second indication information or the third indication information, the terminal device may not immediately transmit information on a transport block group indicated by each piece of indication information, but selects a transport block group to transmit information only when specific information needs to be scheduled. This is not limited in this application.

It should be noted that in this application, time domain resources on which the first transport block group and the second transport block group are located partially or completely overlap. For example, a time domain resource on which at least two transport blocks included in the first transport block group are located partially or completely overlap a time domain resource on which at least one transport block included in the second transport block group is located.

Optionally, provided that time domain resources on which one transport block in the first transport block group and one transport block in the second transport block group are located partially or completely overlap, it is considered that time domain resources on which the first transport block group and the second transport block group are located partially or completely overlap.

Optionally, one transport block in the transport block group is a reference transport block, and the transport block may occupy a largest quantity of time domain resources, or occupy a time domain resource with an earliest start location, or occupy a time domain resource with a latest end location. If time domain resources on which a reference transport block in the first transport block and a reference transport block in the second transport block group are located partially or completely overlap, it is considered that time domain resources on which the first transport block group and the second transport block group are located partially or completely overlap.

For example, information A may be transmitted by using a transport block 1, a transport block 2, and a transport block 3 that are included in the first transport block group, information transmitted by using the transport block 1 is a1, information transmitted by using the transport block 2 is a2, and information transmitted by using the transport block 3 is a3. Information B may be transmitted by using a transport block 4, a transport block 5, and a transport block 6 that are included in the second transport block group, information transmitted by using the transport block 4 is b1, information transmitted by using the transport block 5 is b2, and information transmitted by using the transport block 6 is b3. The information A is different from the information B. In this case, the terminal device transmits the information A by using at least one of the information a1 transmitted by using the transport block 1, the information a2 transmitted by using the transport block 2, and the information a3 transmitted by using the transport block 3. The terminal device transmits the information B by using at least one of the information b1 transmitted by using the transport block 4, the information b2 transmitted by using the transport block 5, and the information b3 transmitted by using the transport block 6.

When the second transport block group includes one transport block, and the terminal device sends the first transport block group and the second transport block group, the terminal device may add the second information to one transport block in the second transport block group, to obtain the second information transmitted by using the second transport block group. When the second transport block group includes two or more transport blocks, and the terminal device sends the first transport block group and the second transport block group, the terminal device may send the first information by using the first transport block group, and send the second information by using the second transport block group.

In this embodiment of this application, that the first transport block group and the second transport block group partially or completely overlap in time domain can be understood as: When any transport block in the first transport block group and any transport block in the second transport block group completely or partially overlap on a time domain resource, it is considered that the first transport block group and the second transport block group partially or completely overlap in time domain. Alternatively, when a specific transport block in the first transport block group and a specific transport block in the second transport block group completely or partially overlap on a time domain resource, it is considered that the first transport block group and the second transport block group partially or completely overlap in time domain. The specific transport block herein may be a transport block used for initial transmission (a definition manner is the same as that in S1041, and details are not described herein again), or may be a transport block corresponding to an earliest time, or may be another transport block. This is not limited in this embodiment of the present invention.

In addition, it should be noted that in this application, each transport block is corresponding to one group identifier. In this way, when receiving a plurality of transport blocks belonging to different transport block groups, the network device may decode, based on group identifiers, information carried in transport blocks belonging to a same transport block group.

In an actual transmission process, a transport block may usually be transmitted on an uplink channel, and at least two transport blocks may be transmitted on one uplink channel or may be transmitted on different uplink channels. The uplink channel herein may include an uplink control channel, for example, a physical uplink control channel (PUCCH); and may further include an uplink data channel, for example, a physical uplink shared channel (PUSCH). The PUCCH is used to carry control information, and the PUSCH is used to carry service data. Certainly, control information may alternatively be carried on a PUSCH. Content carried on a channel is not limited in this application.

Currently, a process for controlling power used by a terminal to send an uplink channel generally includes: preparing, by the terminal, data or uplink control information that needs to be carried on the uplink channel; calculating, based on a path loss, required transmit power of all uplink channels of the terminal in a current TTI; and if a sum of the required transmit power of all the uplink channels exceeds allowable maximum transmit power of the terminal, reducing, by the terminal, power of all or some of the uplink channels based on a priority of a channel type or a priority of carried uplink control information.

Possible manner 1: Power is preferentially allocated to a channel with a higher priority, and then power is allocated to a channel with a lower priority. If priorities of channels are the same, transmit power is reduced proportionally, to ensure that a sum of transmit power of all uplink channels does not exceed the allowable maximum transmit power of the terminal. Then, all or some of the uplink channels are sent with transmit power allocated based on priorities. It can be understood that, when a sum of required transmit power of all the uplink channels exceeds the allowable maximum transmit power of the terminal, power may not be allocated to an uplink channel with a lower priority or power allocated to an uplink channel with a lower priority is zero, and finally the uplink channel is not sent.

Possible manner 2: Power allocated to a channel with a lower priority is preferentially discarded or reduced, and then power allocated to a channel with a higher priority is discarded or reduced. If priorities of channels are the same, transmit power is reduced proportionally, to ensure that a sum of transmit power of all uplink channels does not exceed the allowable maximum transmit power of the terminal. Then, all or some of the uplink channels are sent with transmit power allocated based on priorities. It can be understood that, when a sum of required transmit power of all the uplink channels exceeds the allowable maximum transmit power of the terminal, power may not be allocated to an uplink channel with a lower priority, power allocated to an uplink channel with a lower priority is directly discarded, or power allocated to an uplink channel with a lower priority is zero, and finally the uplink channel is not sent.

There is an upper limit of maximum allowable transmit power for transmit power of the terminal device. Therefore, when transmit power used by the terminal device to transmit a plurality of transport blocks exceeds the maximum power value, the transmit power of the plurality of transport blocks needs to be adjusted. There are a plurality of manners of adjusting the transmit power of the transport blocks. For example, uplink power may be allocated to a transport block based on a priority of an uplink channel.

Specifically, the uplink power may be all transmit power of the terminal device, the allowable maximum transmit power of the terminal device, or a part of transmit power of the terminal device. It can be understood that, when the terminal device has other channels that are more important or is configured, by the network device, to being unable to use all transmit power, the terminal device can allocate only a part of transmit power of the terminal device.

The at least two transport blocks are corresponding to at least one first uplink channel. The method provided in this application further includes the following steps.

S114. The terminal device determines a priority of at least one first uplink channel, where the priority of the first uplink channel is used to allocate uplink power.

Optionally, S114 may specifically be implemented in the following manner:

S1141. The terminal device determines a parameter value of at least one parameter corresponding to the at least one first uplink channel, where the at least one parameter includes one or more of the following parameters: a modulation and coding scheme (MCS), a physical downlink control channel (PDCCH) control channel element (CCE) level, initially configured transmit power, a path-loss-value scale factor and/or a path loss value, and a cell, a carrier, or a BWP corresponding to the at least one first uplink channel.

S1142. The terminal device determines the priority of the at least one first uplink channel based on the parameter value of the at least one parameter of the at least one first uplink channel.

Specifically, S1142 may be implemented in at least one of the following manners: The terminal device determines the priority of the at least one first uplink channel based on the modulation and coding scheme of the at least one first uplink channel. The terminal device determines the priority of the at least one first uplink channel based on the physical downlink control channel (PDCCH) control channel element (CCE) level corresponding to the at least one first uplink channel. The terminal device determines the priority of the at least one first uplink channel based on the initially configured transmit power $P_{O\_PUSCH}$ of the at least one first uplink channel. The terminal device determines the priority of the at least one first uplink channel based on the path-loss-value scale factor and/or the path loss value of the at least one first uplink channel. The terminal device determines the priority of the at least one first uplink channel based on the cell, the carrier, or the BWP corresponding to the at least one first uplink channel.

Optionally, a physical downlink control channel corresponding to the first uplink channel is a physical downlink control channel carrying scheduling information of the first uplink channel. For example, the scheduling information is DCI.

Optionally, a fifth parameter in the at least one parameter corresponding to the at least two transport blocks is corresponding to one parameter value, and parameter values of fifth parameters corresponding to different transport blocks in the at least two transport blocks are the same; and/or a sixth parameter in the at least one parameter corresponding to the at least two transport blocks is corresponding to one parameter value, and parameter values of sixth parameters corresponding to different transport blocks in the at least two transport blocks are different.

Specifically, one first uplink channel in the foregoing may be corresponding to two or more parameters. When fifth parameters of the two or more first uplink channels are the same, priorities of the two or more first uplink channels may be determined with reference to different sixth parameters corresponding to the two or more first uplink channels.

A first uplink channel A and a second uplink channel B are used as an example. If modulation and coding schemes of the first uplink channel A and the second uplink channel B are the same, priorities of the first uplink channel A and the second uplink channel B are determined based on initially configured transmit power 1 corresponding to the first uplink channel A and initially configured transmit power 2 corresponding to the second uplink channel B. Specifically, a priority of a first uplink channel whose initially configured transmit power is greater is higher than a priority of a first uplink channel whose initially configured transmit power is lower.

C1. The determining, by the terminal device, the priority of the at least one first uplink channel based on the modulation and coding scheme of the at least one first uplink channel includes: the at least one first uplink channel includes a first uplink channel A and a first uplink channel B, a priority of the first uplink channel A is higher than a priority of the first uplink channel B, and the first uplink channel A and the first uplink channel B include at least one of the following: a modulation order in a modulation and coding scheme of the first uplink channel A is higher than a modulation order in a modulation and coding scheme of the first uplink channel B; a code rate in the modulation and coding scheme of the first uplink channel A is less than a code rate in the modulation and coding scheme of the first uplink channel B; a block error rate BLER corresponding to the modulation and coding scheme of the first uplink channel A is less than a block error rate BLER corresponding to the modulation and coding scheme of the first uplink channel B; and a priority of a first modulation and coding scheme table corresponding to the modulation and coding scheme of the first uplink channel A is higher than a priority of a first modulation and coding scheme table corresponding to the modulation and coding scheme of the first uplink channel B.

C2. The determining, by the terminal device, the priority of the at least one first uplink channel based on the physical downlink control channel PDCCH control channel element CCE level corresponding to the at least one first uplink channel includes: the at least one first uplink channel includes a first uplink channel A and a first uplink channel B, a priority of the first uplink channel A is higher than a priority of the first uplink channel B, and a physical downlink control channel PDCCH control channel element CCE level of the first uplink channel A is higher than a physical downlink control channel PDCCH control channel element CCE level of the first uplink channel B. It can be understood that, a priority of an uplink channel corresponding to a lower aggregation level is lower than or equal to a priority of an uplink channel corresponding to a higher aggregation level. A high aggregation level indicates high reliability. Therefore, a channel corresponding to a high aggregation level needs to be preferentially sent.

Optionally, the determining, by the terminal device, the priority of the at least one first uplink channel based on the physical downlink control channel (PDCCH) control channel element CCE level corresponding to the at least one first uplink channel includes: the at least one first uplink channel includes a first uplink channel A and a first uplink channel B, a priority of the first uplink channel A is higher than a priority of the first uplink channel B, and a physical downlink control channel (PDCCH) control channel element (CCE) level of the first uplink channel A is lower than a physical downlink control channel (PDCCH) control channel element CCE level of the first uplink channel B. A high aggregation level indicates poor channel quality, and a low aggregation level is corresponding to good channel quality. Therefore, an uplink channel with a low aggregation level should be preferentially sent.

Optionally, channel quality may alternatively be determined by using a CQI index recently reported by the terminal device. A priority of an uplink control channel corresponding to a cell with a smaller reported CQI index is higher than or equal to a priority of an uplink control channel corresponding to a cell with a larger reported CQI index. This is because a smaller CQI index indicates poorer channel quality. Therefore, an uplink channel with a larger CQI index should be preferentially sent.

C3. The determining, by the terminal device, the priority of the at least one first uplink channel based on the initially configured transmit power $P_{O\_PUSCH}$ of the at least one first uplink channel includes the at least one first uplink channel includes a first uplink channel A and a first uplink channel B, a priority of the first uplink channel A is higher than a priority of the first uplink channel B, and $P_{O\_PUSCH}$ of the first uplink channel A is lower than $P_{O\_PUSCH}$ of the first uplink channel B.

Specifically, initially configured transmit power $P_{O\_PUSCH}$ of a PUSCH is equal to initially configured cell-level transmit power of the PUSCH plus initially configured user-level transmit power of the PUSCH.

It can be understood that, when the uplink channel is a PUCCH channel, the initially configured transmit power $P_{O\_PUCCH}$ is equal to initially configured cell-level transmit power of the PUCCH plus initially configured user-level transmit power of the PUCCH.

C4. The determining, by the terminal device, the priority of the at least one first uplink channel based on the path-loss-value scale factor and/or the path loss value of the at least one first uplink channel includes: the at least one first uplink channel includes a first uplink channel A and a first uplink channel B, a priority of the first uplink channel A is higher than a priority of the first uplink channel B, a path-loss-value scale factor of the first uplink channel A is less than a path-loss-value scale factor of the first uplink channel B, and/or a path loss value of the first uplink channel A is less than a path loss value of the first uplink channel B.

Specifically, a value of the path-loss-value scale factor is between 0 and 1, and may be predefined, may be configured by using higher layer signaling, or may be notified by using dynamic signaling.

Specifically, the path loss value is obtained by the terminal device by performing measurement based on a signal sent by the network device. A specific channel may be measured based on a downlink signal such as a synchronization signal.

C5. The determining, by the terminal device, the priority of the at least one first uplink channel based on the cell, the carrier, or the BWP corresponding to the at least one first uplink channel includes: the at least one first uplink channel includes a first uplink channel A and a first uplink channel B, a priority of the first uplink channel A is higher than a priority of the first uplink channel B, and the first uplink channel A and the first uplink channel B include one of the following: a cell in which the first uplink channel A is located is a primary cell Pcell, and a cell in which the first uplink channel B is located is a secondary cell Scell; a carrier index number of a carrier on which the first uplink channel A is located is less than a carrier index number of a carrier on which the first uplink channel B is located; and a BWP index number of a BWP in which the first uplink channel A is located is less than a BWP index number of a BWP in which the first uplink channel B is located, or the BWP in which the first uplink channel A is located is an active BWP, and the BWP in which the first uplink channel B is located is an initial BWP. The initial BWP is bandwidth used when all terminal devices initially access a cell or perform rollback. Therefore, it may be considered that, when the terminal device uses the initial BWP, performance may not be ensured. After the terminal device performs access, the network device configures, for the terminal device, an active BWP for data transmission, and such a configuration is user-level configuration. When the terminal device uses the BWP, it may be considered that performance and reliability of a user can be ensured.

Optionally, the determining, by the terminal device, the priority of the at least one first uplink channel based on the cell, the carrier, or the BWP corresponding to the at least one first uplink channel includes: the at least one first uplink channel includes a first uplink channel A and a first uplink channel B, a priority of the first uplink channel A is higher than a priority of the first uplink channel B, a BWP in which the first uplink channel B is located is an active BWP, and a BWP in which the first uplink channel A is located is an initial BWP. The initial BWP is bandwidth used when all terminal devices initially access a cell or perform rollback. Therefore, it is considered that, no interference is caused to uplink transmission or a relatively small quantity of users coexist. Therefore, performance can be ensured. After the terminal device performs access, an active BWP is configured for data transmission, and such a configuration is a user-level configuration. It may be considered that, performance and reliability of a user may be affected by another active user. Therefore, performance cannot be ensured.

Optionally, after the terminal device determines the priority of the at least one first uplink channel, the method provided in this application further includes the following.

S115. The terminal device allocates uplink power to the at least two transport blocks based on the priority of the at least one first uplink channel.

Specifically, S115 may be implemented in the following manner. The terminal device allocates uplink power to the at least two transport blocks in descending order of priorities of the at least one first uplink channel, where power allocated to a transport block corresponding to a first uplink channel with a higher priority is greater than power allocated to a transport block corresponding to a first uplink channel with a lower priority. The transmit power of the uplink channel on which the transport block corresponding to a first uplink channel with a lower priority is located may be 0.

Specifically, S115 may alternatively be implemented in the following manner. The terminal device discards an uplink channel in ascending order of priorities of the at least one first uplink channel, until a sum of transmit power of uplink channels on which the terminal device sends remaining data blocks is less than or equal to maximum allowable transmit power of the terminal device, where an uplink channel on which a transport block corresponding to a first uplink channel with a lower priority is located is first discarded, and an uplink channel on which a transport block corresponding to a first uplink channel with a higher priority is located is sent.

Specifically, S115 in this application may be implemented in the following manner.

S1151. Transmit second information by using at least one second uplink channel, where the second information is different from the first information, and a time domain position of the at least one second uplink channel overlaps a time domain position of the at least one first uplink channel; and the priority of the first uplink channel is higher than a priority of the second uplink channel.

Specifically, the terminal device determines a priority of the at least one second uplink channel. That the second information is different from the first information may be that the information is different or information sources thereof are different.

The terminal device allocates uplink power based on the priority of the at least one second uplink channel and the priority of the at least one first uplink channel, and transmission of the at least one first uplink channel and transmission of the at least one second uplink channel overlap in time.

It can be understood that, if the second uplink channel does not overlap with the first uplink channel, there is no need to compare power priorities. In this case, the second uplink channel is not considered during power allocation for the first uplink channel. It can be understood that, power allocation for the first uplink channel and the second uplink channel is not simultaneously performed.

S1152. The terminal device preferentially allocates uplink power to the at least one first uplink channel.

Optionally, the terminal device determines a priority of an uplink channel based on whether the uplink channel is used for duplicate transmission. When the at least one first uplink channel is an uplink channel used for duplicate transmission, and the at least one second uplink channel is an uplink channel is not used for duplicate transmission, the priority of the first uplink channel is higher than the priority of the second uplink channel. Further, when the at least one first uplink channel is an uplink channel used for duplicate transmission, and the at least one second uplink channel is an uplink channel used for duplicate transmission, the priority of the first uplink channel is higher than the priority of the second uplink channel. A channel priority may be determined based on the foregoing fifth parameter.

Optionally, when the second uplink channel is corresponding to a maximum of two transport blocks, or the second uplink channel carries one transport block, the priority of the first uplink channel is higher than the priority of the second uplink channel. Optionally, no other transport blocks for transmitting the second information exist on a time domain resource on which the second uplink channel is located. In other words, the terminal device does not send, on the time domain resource on which the second uplink channel is located or on a time domain resource overlapping the time domain resource on which the second uplink channel is located, another uplink channel carrying the second information.

Optionally, when a quantity of second uplink channels is less than a quantity of first uplink channels, the priority of the first uplink channel is higher than the priority of the second uplink channel. When the quantity of second uplink channels is greater than the quantity of first uplink channels, the priority of the second uplink channel is higher than the priority of the first uplink channel. In other words, the terminal device determines a priority of an uplink channel based on a quantity of uplink channels carrying information. It can be understood that, when there are D1 first uplink channels and D2 second uplink channels, and D1 is greater than D2, the channel priority of the first uplink channel is higher than the channel priority of the second uplink channel. When D1 is less than D2, the channel priority of the first uplink channel is lower than the channel priority of the second uplink channel. When D1 is equal to D2, it may be considered that, the channel priority of the first uplink channel is equal to the channel priority of the second uplink channel, or the channel priority of the first uplink channel and the channel priority of the second uplink channel are determined by using different fifth parameters.

Optionally, transmit power of the at least one first uplink channel is greater than or equal to maximum transmit power of the terminal device. To be specific, when the transmit power of the at least one first uplink channel is greater than or equal to the maximum transmit power of the terminal device, uplink power needs to be allocated based on the channel priority of the at least one first uplink channel.

Optionally, a sum of transmit power of the at least one first uplink channel and transmit power of the second uplink channel is greater than or equal to maximum transmit power of the terminal device. To be specific, when the sum of the transmit power of the at least one first uplink channel and the transmit power of the second uplink channel is greater than or equal to the maximum transmit power of the terminal device, uplink power needs to be allocated based on the channel priority of the at least one first uplink channel and the at least one second uplink channel.

The foregoing mainly describes the solutions provided in the embodiments of this application from a perspective of interaction between the network elements. It may be understood that, to implement the foregoing functions, the network elements, such as the network device and the terminal device, include a corresponding hardware structure and/or software module that is used to perform each function. A person skilled in the art should easily be aware that, in combination with units and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the network device and the terminal device may be divided into functional modules based on the foregoing method example. For example, functional modules may be obtained through division based on corresponding functions, or at least two functions may be integrated into one processing module. The integrated module may be implemented in a form of hardware, or may be implemented in a form of a software functional module. It should be noted that, in the embodiments of this application, module division is an example, and is merely a logical function division. In actual implementation, another division manner may be used. The following uses an example in which each functional module is divided based on each corresponding function for description.

Figure 6:
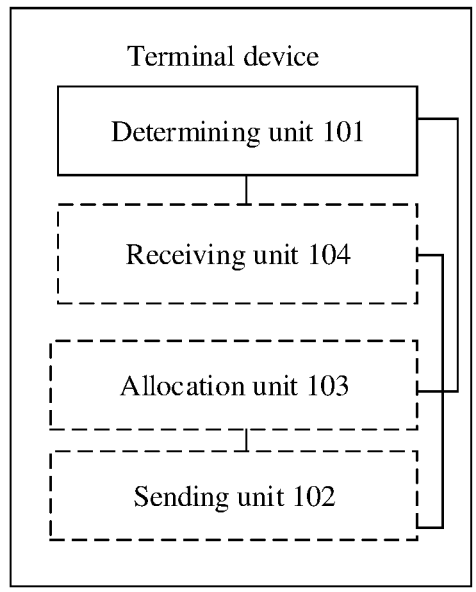
FIG. 6 is a first schematic structural diagram of a terminal device according to this application.

When an integrated unit is used, FIG. 6 is a possible schematic structural diagram of the terminal device described in the foregoing embodiments. The terminal device includes a determining unit 101 and a sending unit 102. The determining unit 101 is configured to support the terminal device in performing S101 in the foregoing embodiment. The sending unit 102 is configured to support the terminal device in performing S102 in the foregoing embodiment.

Optionally, the determining unit 101 is configured to support the terminal device in performing S106, S1011, S1013, S111, S1111, S1112, S1113, S1114, S1115, S1116, S112, S114, S1141, S1142, and S1151 in the foregoing embodiments.

Optionally, the sending unit 102 is specifically configured to support the terminal device in performing S1012 and S1014 in the foregoing embodiment. In addition, the terminal device may further include an allocation unit 103 and a receiving unit 104.

The allocation unit 103 is configured to support the terminal device in performing S115 and S1152 in the foregoing embodiment. The receiving unit 104 is configured to support the terminal device in performing S110 in the foregoing embodiment. All related content of the steps in the foregoing method embodiments may be cited in function descriptions of the corresponding functional modules. Details are not described herein again.

Figure 7:
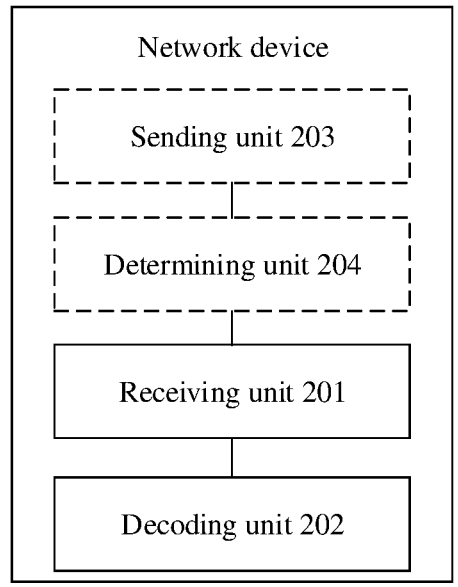
FIG. 7 is a first schematic structural diagram of a network device according to this application.

When an integrated unit is used, FIG. 7 is a possible schematic structural diagram of the network device in the foregoing embodiments. The network device includes a receiving unit 201 and a decoding unit 202. The receiving unit 201 is configured to support the network device in performing S103 in the foregoing embodiment. The decoding unit 202 is configured to support the network device in performing S104 in the foregoing embodiment.

Optionally, the decoding unit 202 is specifically configured to support the network device in performing S1041, S1042, and S1043 in the foregoing embodiment. In addition, the network device may further include a sending unit 203 and a determining unit 204. Optionally, the sending unit 203 is configured to support the network device in performing S105, S107, S109, and S113 in the foregoing embodiment. All related content of the steps in the foregoing method embodiments may be cited in function descriptions of the corresponding functional modules. Details are not described herein again.

It should be understood that the division of the units in the apparatus is merely division of logical functions. During actual implementation, all or some of the units may be integrated into a physical entity, or may be physically separated. In addition, all the units in the apparatus may be implemented by software invoked by a processing element; or all may be implemented by hardware; or some units may be implemented by software invoked by a processing element, and some units are implemented by hardware. For example, during implementation, each unit may be a separately disposed processing element, or may be integrated into a chip of the apparatus. Alternatively, each unit may be stored in a memory as a program and invoked by a processing element of the apparatus to perform a function of the unit. In addition, the units may be integrated together or may be individually implemented. The processing element may be an integrated circuit and has a signal processing capability. During implementation, the steps of the foregoing methods or the foregoing units may be implemented by using a hardware integrated logic circuit in the processor element, or may be implemented in a form of software invoked by the processing element.

In an example, the units in any one of the foregoing apparatuses may be configured as one or more integrated circuits, to implement the foregoing methods, for example, one or more application-specific integrated circuits (ASIC), or one or more microprocessors (DSP), or one or more field programmable gate arrays (FPGA). For another example, when the units in the apparatus can be implemented in a form of a processing element scheduling a program, the processing element may be a general-purpose processor, for example, a central processing unit (CPU) or another processor that can invoke a program. For another example, the units can be integrated together and implemented in a form of a system-on-a-chip (SOC).

The foregoing receiving unit (or a unit used for receiving) is an interface circuit of the apparatus, configured to receive a signal from another apparatus. For example, when the apparatus is implemented in a manner of a chip, the receiving unit is an interface circuit that is of the chip and that is configured to receive a signal from another chip or apparatus. The foregoing sending unit (or a unit used for sending) is an interface circuit of the apparatus, configured to send a signal to another apparatus. For example, when the apparatus is implemented in a manner of a chip, the sending unit is an interface circuit that is of the chip and that is configured to send a signal from another chip or apparatus.

Figure 8:
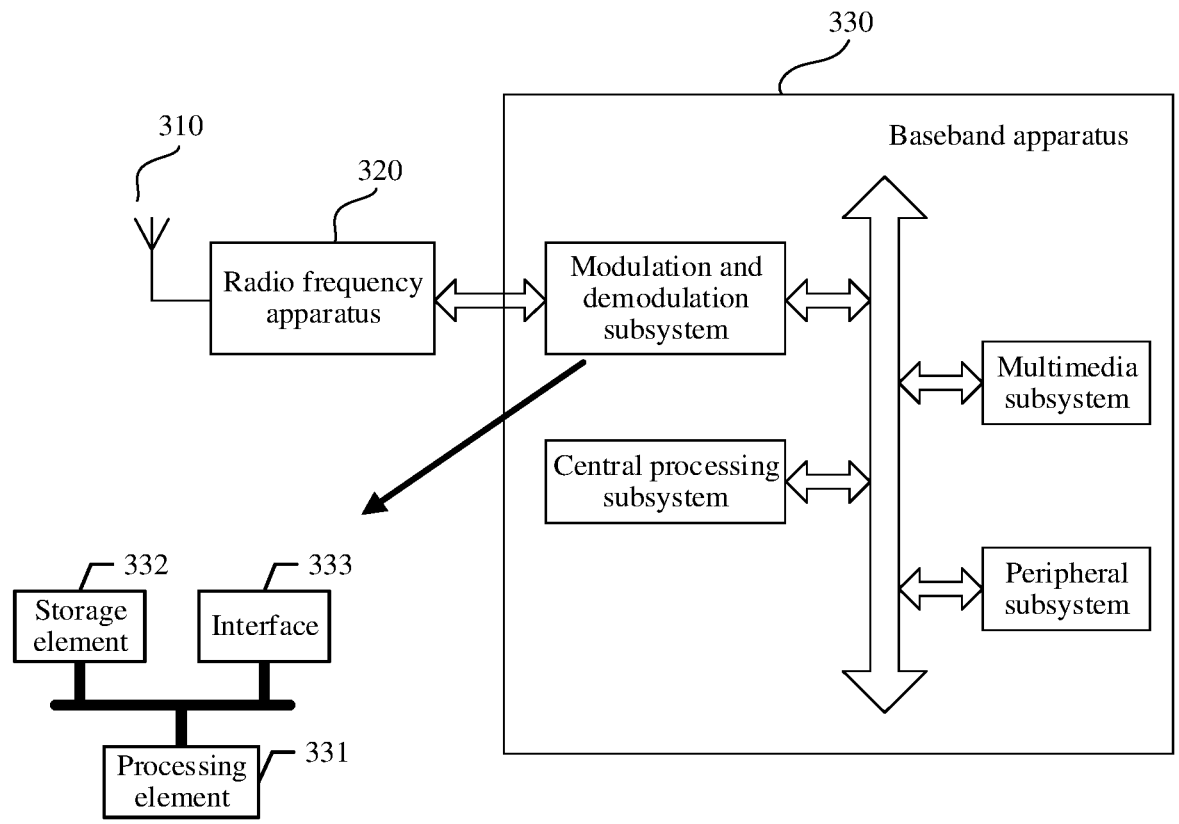
FIG. 8 is a second schematic structural diagram of a terminal device according to this application.

FIG. 8 is a schematic structural diagram of a terminal device according to an embodiment of this application. The terminal device may be the terminal device in the foregoing embodiments and is configured to implement operations of the terminal device in the foregoing embodiments. As shown in FIG. 8, the terminal device includes an antenna 310, a radio frequency apparatus 320, and a baseband apparatus 330. The antenna 310 is connected to the radio frequency apparatus 320. In a downlink direction, the radio frequency apparatus 320 receives, by using the antenna 310, information sent by a network device, and sends the information sent by the network device, to the baseband apparatus 330 for processing. In an uplink direction, the baseband apparatus 330 processes information of the terminal and sends the information to the radio frequency apparatus 320, and the radio frequency apparatus 320 processes the information of the terminal and then sends the information to the network device by using the antenna 310.

The baseband apparatus may include a modulation and demodulation subsystem, configured to implement processing on each communications protocol layer for data. The baseband apparatus may further include a central processing subsystem, configured to implement processing on a terminal operating system and an application layer. In addition, the baseband apparatus may further include another subsystem such as a multimedia subsystem or a peripheral subsystem. The multimedia subsystem is configured to control a camera or a screen display of the terminal, and the peripheral subsystem is configured to implement a connection to another device. The modulation and demodulation subsystem may be a chip separately disposed. Optionally, the foregoing information transmission apparatus may be implemented on the modulation and demodulation subsystem.

In an implementation, each unit shown in FIG. 6 is implemented in a form of a processing element scheduling a program. For example, a subsystem, such as the modulation and demodulation subsystem, of the baseband apparatus 330 includes a processing element 331 and a storage element 332. The processing element 331 invokes a program stored in the storage element 332 to perform the method performed by the terminal in the foregoing method embodiments. In addition, the baseband apparatus 330 may further include an interface 333, configured to exchange information with the radio frequency apparatus 320. Specifically, the processing element 331 is configured to perform S103, S111, S1111, S1112, S1113, S1114, S1115, S1116, S112, S114, S1141, S1142, S1151, S115, and S1152 in the foregoing embodiments. The interface 333 is configured to perform S102, S1012, S1014, and S110 in the foregoing embodiments.

In another implementation, each unit shown in FIG. 6 may be one or more processing elements configured to implement the foregoing methods executed by the terminal device. These processing elements are disposed on a subsystem of the baseband apparatus 330, such as the modulation and demodulation subsystem. The processing element herein may be an integrated circuit, for example, one or more ASICs, one or more DSPs, or one or more FPGAs. These integrated circuits may be integrated together to form a chip.

For example, all the units shown in FIG. 6 may be integrated together, and implemented in a form of an SOC. For example, the baseband apparatus 330 includes an SOC chip, configured to implement the foregoing method. The chip may be integrated with the processing element 331 and the storage element 332, and the processing element 331 invokes the program stored in the storage element 332 to implement the foregoing method performed by the terminal or functions of the units shown in FIG. 6. Alternatively, the chip may be integrated with at least one integrated circuit, to implement the foregoing method performed by the terminal or functions of the units shown in FIG. 6. Alternatively, the foregoing implementations may be combined, where functions of some units are implemented by the processing element invoking a program, and functions of some units are implemented by an integrated circuit.

In conclusion, the information transmission apparatus used for the terminal device includes at least one processing element and a storage element, and the at least one processing element is configured to perform the method performed by the terminal device provided in the foregoing method embodiments. The processing element may perform, in a first manner, that is, in a manner of executing the program stored in the storage element, some or all steps performed by the terminal in the foregoing method embodiments; or may perform, in a second manner, that is, in a manner of combining a hardware integrated logical circuit in the processor element with an instruction, some or all steps performed by the terminal in the foregoing method embodiments; and may certainly perform, with reference to the first manner and the second manner, some or all steps performed by the terminal device in the foregoing method embodiments.

As described above, the processing element herein may be a general purpose processor, for example, a CPU, or may be one or more integrated circuits configured to implement the foregoing method, for example, one or more ASICs, one or more DSPs, or one or more FPGAs. The storage element may be a memory, or may be a general term of a plurality of storage elements. The interface 333 may be a communications interface or a transceiver (that is, a transmitter and a receiver may be integrated together and referred to as a transceiver). Specifically, when the processing element is a processor, the interface 333 is a transceiver or a transceiver circuit; and when the storage element is a memory, the terminal device provided in this application may alternatively be the device shown in FIG. 9.

Figure 9:
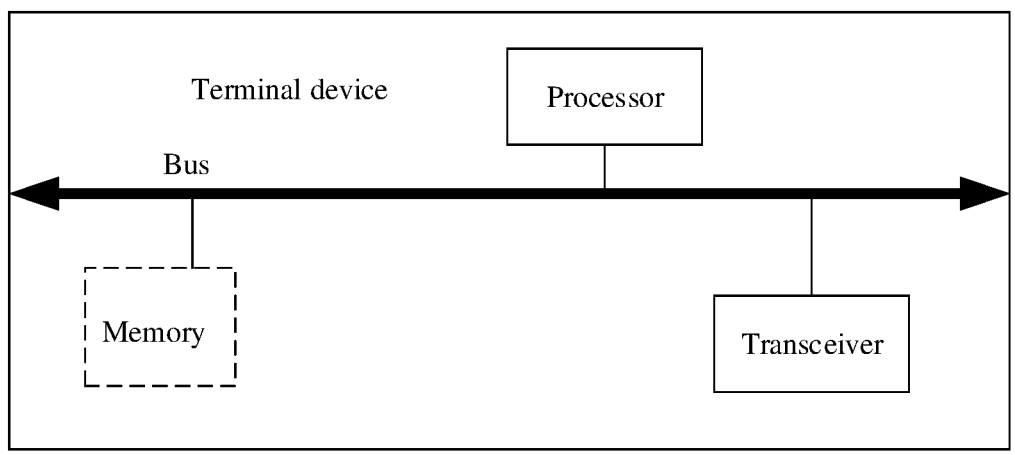
FIG. 9 is a third schematic structural diagram of a terminal device according to this application.

In FIG. 9, the transceiver, the at least one processor, and the memory are connected to each other by using a bus. The bus may be a PCI bus, an EISA bus, or the like. The bus may be classified into an address bus, a data bus, a control bus, and the like. For ease of representation, only one thick line is used to represent the bus in FIG. 9, but this does not mean that there is only one bus or only one type of bus. The memory is configured to store program code and data of the terminal device. The communications interface is configured to support the terminal device in communicating with another device (for example, a network device), and the processor is configured to support the terminal device in executing the program code and the data that are stored in the memory, to implement an information sending method provided in this application.

Figure 10:
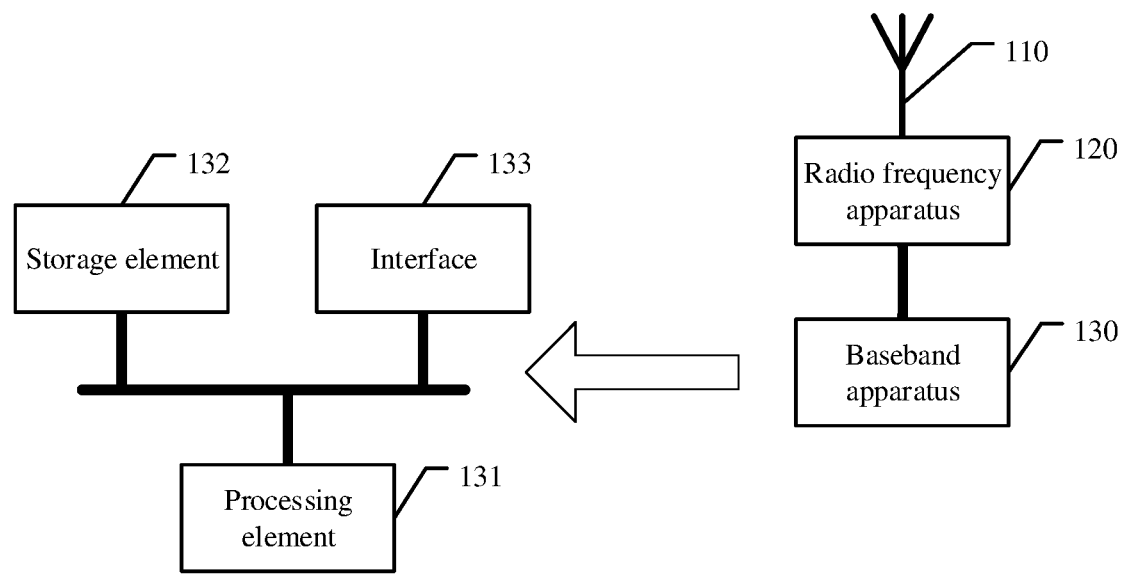
FIG. 10 is a second schematic structural diagram of a network device according to this application.

FIG. 10 is a schematic structural diagram of a network device according to an embodiment of this application. The network device may be the network device in the foregoing embodiments and is configured to implement operations of the network device in the foregoing embodiments. As shown in FIG. 10, the network device includes an antenna 110, a radio frequency apparatus 120, and a baseband apparatus 130. The antenna 110 is connected to the radio frequency apparatus 120. In an uplink direction, the radio frequency apparatus 120 receives, by using the antenna 110, information sent by a terminal device, and sends the information sent by the terminal device, to the baseband apparatus 130 for processing. In a downlink direction, the baseband apparatus 130 processes information of the terminal device, and sends the information to the radio frequency apparatus 120; and the radio frequency apparatus 120 processes the information of the terminal device, and then sends the information to the terminal device by using the antenna 110.

The baseband apparatus 130 may be a physical apparatus, or may include at least two apparatuses that are physically separated. The baseband apparatus 130 and radio the frequency apparatus 120 may be integrated together, or may be physically separated. The baseband apparatus 130 may include at least one baseband board, and a plurality of processing elements may be integrated on the baseband board, to implement a baseband processing function. The network device is a RAN device, for example, an eNB in an LTE system. In this case, the baseband apparatus 130 may be a baseband apparatus in the eNB. For another example, the network device may be the RAN device shown in FIG. 2 or FIG. 3, and the baseband apparatus may be a DU node.

The foregoing information transmission apparatus may be located in the baseband apparatus 130. In an implementation, each unit shown in FIG. 7 is implemented in a form of a processing element scheduling a program. For example, the baseband apparatus 130 includes a processing element 131 and a storage element 132. The processing element 131 invokes a program stored in the storage element 132, to perform the method, for example, S110, performed by the network device in the foregoing method embodiments. In addition, the baseband apparatus 130 may further include an interface 133, configured to exchange information with the radio frequency apparatus 120. The interface is, for example, a CPRI. When the baseband apparatus 130 and the radio frequency apparatus 120 are physically disposed together, the interface may be an intra-board interface or an inter-board interface. The board herein is a circuit board. The interface 133 is configured to perform S103, S105, S107, S109, and S113. The processing element 131 is configured to perform S104, S1041, S1042, and S1043.

In another implementation, each unit shown in FIG. 7 may be one or more processing elements configured to implement the foregoing methods executed by the network device. These processing elements are disposed on the baseband apparatus 130. The processing element herein may be an integrated circuit, for example, one or more ASICs, one or more DSPs, or one or more FPGAs. These integrated circuits may be integrated together to form a chip.

For example, all the units shown in FIG. 7 may be integrated together, and implemented in a form of an SOC. For example, the baseband apparatus 130 includes an SOC chip, configured to implement the foregoing method. A processing element 111 and the storage element 132 may be integrated into the chip; and the processing element 131 invokes a program stored in the storage element 132, to implement the foregoing method performed by the network device or the function of each unit shown in FIG. 7. Alternatively, at least one integrated circuit may be integrated into the chip, to implement the foregoing method performed by the network device or the function of each unit shown in FIG. 7. Alternatively, with reference to the foregoing implementations, functions of some units may be implemented by invoking a program by a processing element, and functions of some units may be implemented in a form of an integrated circuit.

In conclusion, the information transmission apparatus used for the network device includes at least one processing element and a storage element, and the at least one processing element is configured to perform the method performed by the network device provided in the foregoing embodiments. The processing element may perform, in a first manner, that is, in a manner of executing the program stored in the storage element, some or all steps performed by the network device in the foregoing embodiments; or may perform, in a second manner, that is, in a manner of combining a hardware integrated logical circuit in the processor element with an instruction, some or all steps performed by the network device in the foregoing embodiments, for example, S103, S105, S107, S109, and S113. The processing element 131 is configured to perform S104, S1041, S1042, and S1043. Certainly, the processing element may perform, with reference to the first manner and the second manner, some or all steps performed by the network device in the foregoing embodiments.

As described above, the processing element herein may be a general purpose processor, for example, a CPU, or may be one or more integrated circuits configured to implement the foregoing method, for example, one or more ASICs, one or more DSPs, or one or more FPGAs.

The storage element may be a memory, or a general name of a plurality of storage elements.

Figure 11:
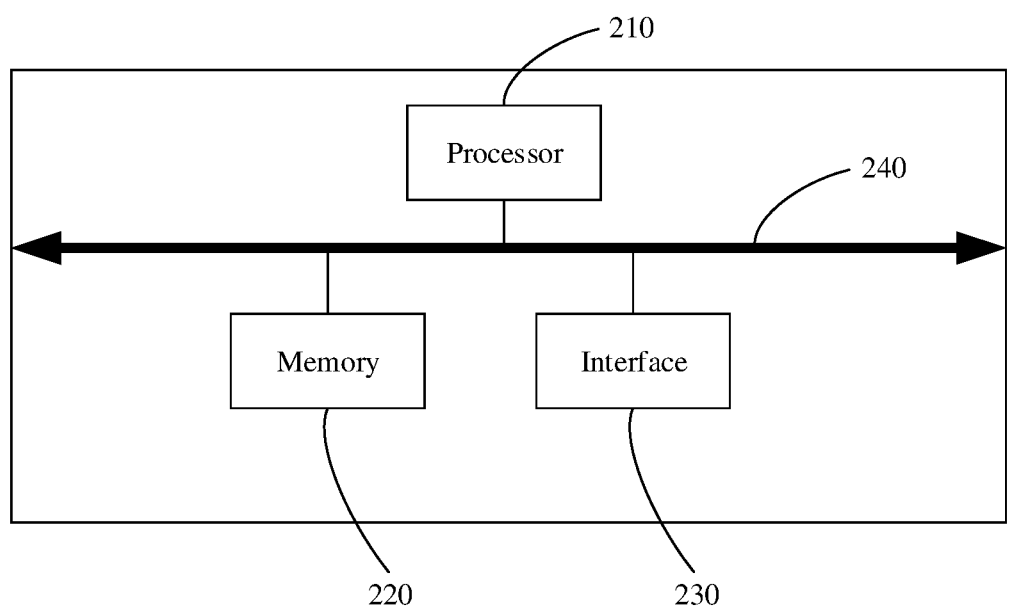
FIG. 11 is a third schematic structural diagram of a network device according to this application.

FIG. 11 is a schematic structural diagram of another network device according to an embodiment of this application. The network device may be the network device in the foregoing embodiments and is configured to implement operations of the network device in the foregoing embodiments.

As shown in FIG. 1i, the network device includes a processor 210, a memory 220, and an interface 230. The processor 210, the memory 220, and the interface 230 are connected by using a bus 240. The bus may be implemented by using a connection circuit. The memory 220 is configured to store a program. When the program is invoked by the processor 210, the method performed by the network device in the foregoing embodiment may be implemented. The interface 230 is configured to communicate with another network device.

The foregoing information transmission apparatus is located in the network device, and functions of the units may be implemented by the processor 210 by invoking the program stored in the memory 220. That is, the foregoing information transmission apparatus includes a memory and a processor. The memory is configured to store a program, and the program is invoked by the processor to perform the method in the foregoing method embodiment. The processor herein may be a general purpose processor, for example, a CPU, or may be another processor that can invoke a program; or the processor may be one or more integrated circuits configured to implement the methods performed by the network device in the foregoing embodiments, for example, one or more ASICs, one or more DSPs, or one or more field programmable gate arrays FPGAs. A quantity of memories is not limited, and there may be one or more memories.

Figure 12:
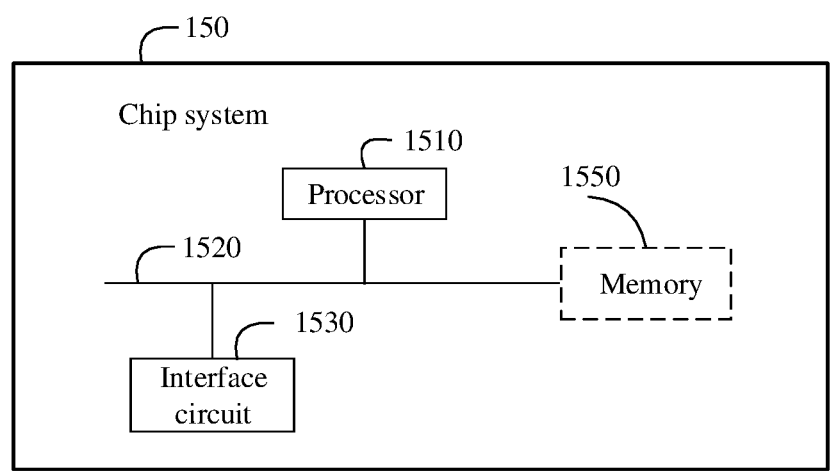
FIG. 12 is a schematic structural diagram of a chip system according to this application.

FIG. 12 is a schematic structural diagram of a chip system 150 according to an embodiment of the present invention. The chip system 150 includes at least one processor 1510 and an interface circuit 1530.

Optionally, the chip system 150 further includes a memory 1550. The memory 1550 may include a read-only memory and a random access memory, and provides an operation instruction and data for the processor 1510. A part of the memory 1550 may further include a non-volatile random access memory (NVRAM).

In some implementations, the memory 1550 stores the following elements: an executable module or a data structure, or a subset thereof, or an extended set thereof.

In this embodiment of the present invention, a corresponding operation is performed by invoking the operation instruction stored in the memory 1550 (the operation instruction may be stored in an operating system).

In a possible implementation, a structure of a chip system used by a terminal device is similar to a structure of a chip system used by a network device, and different apparatuses may use different chip systems to implement respective functions.

The processor 1510 controls operations of the terminal device and the network device, and the processor 1510 may also be referred to as a CPU. The memory 1550 may include a read-only memory and a random access memory, and provide an instruction and data for the processor 1510. A part of the memory 1550 may further include a non-volatile random access memory (NVRAM). In specific application, the memory 1550, the interface circuit 1530, and the memory 1550 are coupled together by using a bus system 1520. The bus system 1520 may further include a power supply bus, a control bus, a status signal bus, and the like in addition to a data bus. However, for clear description, various types of buses in FIG. 11 are marked as the bus system 1520.

The method disclosed in the foregoing embodiments of the present invention may be applied to the processor 1510, or implemented by the processor 1510. The processor 1510 may be an integrated circuit chip and has a signal processing capability. In an implementation process, steps of the foregoing methods can be implemented by using a hardware integrated logical circuit in the processor 1510, or by using instructions in a form of software. The processor 1510 may be a general purpose processor, a DSP, an ASIC, an FPGA or another programmable logical device, a discrete gate or transistor logic device, or a discrete hardware component. The processor 1510 may implement or perform the methods, the steps, and the logical block diagrams that are disclosed in the embodiments of the present invention. The general purpose processor may be a microprocessor, or the processor may be any conventional processor or the like. Steps of the methods disclosed with reference to the embodiments of the present invention may be directly executed and accomplished by using a hardware decoding processor, or may be executed and accomplished by using a combination of hardware and software modules in a decoding processor. A software module may be located in a mature storage medium in the art, such as a random access memory, a flash memory, a read-only memory, a programmable read-only memory, an electrically erasable programmable memory, or a register. The storage medium is located in the memory 1550, and the processor 1510 reads information in the memory 1550 and completes the steps in the foregoing methods in combination with hardware of the processor 1510.

Optionally, the interface circuit 1530 is configured to perform receiving and sending steps of the network device and the terminal device in the embodiments shown in FIG. 4 and FIG. 5.

The processor 1510 is configured to perform processing steps of the network device and the terminal device in the embodiments shown in FIG. 4 and FIG. 5.

In the foregoing embodiment, the instruction that is stored in the memory and that is to be executed by the processor may be implemented in a form of a computer program product. The computer program product may be written in the memory in advance, or may be downloaded and installed in the memory in a form of software.

The computer program product includes one or more computer instructions. When the computer program instructions are loaded and executed on a computer, the procedures or functions according to the embodiments of this application are all or partially generated. The computer may be a general-purpose computer, a dedicated computer, a computer network, or other programmable apparatuses. The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk, SSD), or the like.

According to one aspect, a computer storage medium is provided. The computer readable storage medium stores an instruction. When the instruction is run, a terminal device is enabled to perform S1013, S111, S1111, S1112, S1113, S1114, S1115, S1116, S112, S114, S1141, S1142, S1151, S115, S1152, S102, S1012, S1014, and Silo in the embodiments, and/or another process performed by the terminal device in the technology described in this specification.

According to another aspect, a computer storage medium is provided. The computer readable storage medium stores an instruction. When the instruction is run, a network device is enabled to perform S103, S105, S107, S109, S113, S104, S1041, S1042, and S1043 in the embodiments, and/or another process performed by the network device in the technology described in this specification.

According to one aspect, a computer program product including an instruction is provided. The computer program product stores the instruction. When the instruction is run, a terminal device is enabled to perform S1013, S111, S1111, S1112, S1113, S1114, S1115, S1116, S112, S114, S1141, S1142, S1151, S115, S1152, S102, S1012, S1014, and S110 in the embodiments, and/or another process performed by the terminal device in the technology described in this specification.

According to another aspect, a computer program product including an instruction is provided. The computer program product stores the instruction. When the instruction is run, a network device is enabled to perform S103, S105, S107, S109, S113, S104, S1041, S1042, and S1043 in the embodiments, and/or another process performed by the network device in the technology described in this specification.

According to one aspect, a chip system is provided. The chip system is applied to a terminal device. The chip system includes at least one processor and an interface circuit. The interface circuit and the at least one processor are interconnected by using a line. The processor is configured to run an instruction, to perform S1013, S111, S1111, S1112, S1113, S1114, S1115, S1116, S112, S114, S1141, S1142, S1151, S115, S1152, S102, S1012, S1014, and S110 in the embodiments, and/or another process performed by the terminal device in the technology described in this specification.

According to another aspect, a chip system is provided. The chip system is applied to a network device. The chip system includes at least one processor and an interface circuit. The interface circuit and the at least one processor are interconnected by using a line. The processor is configured to run an instruction, to perform S103, S105, S107, S109, S113, S104, S1041, S1042, and S1043 in the embodiments, and/or another process performed by the network device in the technology described in this specification.

A person of ordinary skill in the art may be aware that, units and algorithm steps of the examples described in combination with the embodiments disclosed in this specification may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that such an implementation goes beyond the scope of this application.

A person skilled in the art may clearly understand that, for ease of brief description, for detailed working processes of the foregoing system, apparatus, and unit, refer to corresponding processes in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and there may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separated, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
   receiving, by a terminal device, first configuration information, wherein the first configuration information configures the terminal device to perform duplicate transmission of transport blocks;
   receiving, by the terminal device, first indication information, and determining, by the terminal device, at least two transport blocks according to the first indication information, wherein the at least two transport blocks correspond to at least one first uplink channel;

sending, by the terminal device, first information using the at least two transport blocks, wherein the first information comprises data information or control information, and wherein each transport block of the at least two transport blocks carries the same first information; and determining, by the terminal device, a priority of the at least one first uplink channel, wherein the priority of the first uplink channel is used for uplink power allocation; and wherein:
second information is transmitted using at least one second uplink channel, the second information is different from the first information, and a time domain position of the at least one second uplink channel overlaps a time domain position of the at least one first uplink channel; and the priority of the at least one first uplink channel is higher than a priority of the at least one second uplink channel.

2. The method according to claim 1, wherein the first indication information indicates a parameter value of at least one parameter corresponding to the at least two transport blocks, and the at least one parameter comprises:
a first time period;
a bandwidth part (BWP);
a precoding matrix parameter;
a network identifier;
a reference signal;
a cell index; or
a first joint identifier, wherein the first joint identifier indicates transport blocks usable for joint decoding.

3. The method according to claim 2, wherein the at least two transport blocks comprise a first transport block and a second transport block, and wherein:
the first indication information indicates that a first parameter in the at least one parameter corresponds to a plurality of parameter values, and parameter values of the first parameter corresponding to the first transport block and the second transport block are different.

4. The method according to claim 2, wherein the first indication information indicates the first joint identifier, and determining, by the terminal device, the at least two transport blocks based on the first indication information comprises:
determining, by the terminal device, transport blocks that are in a plurality of transport blocks and whose identifiers are associated with the first joint identifier indicated by the first indication information to be the at least two transport blocks.

5. The method according to claim 4, wherein receiving, by the terminal device, the first indication information comprises:
receiving, by the terminal device, downlink control information (DCI), wherein the DCI comprises the first joint identifier, and the DCI indicates the at least two transport blocks.

6. The method according to claim 2, wherein the at least two transport blocks comprise a first transport block and a second transport block, and wherein the first indication information indicates that a second parameter in the at least one parameter corresponds to one parameter value, and parameter values of the second parameter corresponding to the first transport block and the second transport block are the same.

7. The method according to claim 1, wherein determining, by the terminal device, the priority of the at least one first uplink channel comprises:
determining, by the terminal device, a parameter value of at least one parameter corresponding to the at least one first uplink channel, wherein the at least one parameter corresponding to the at least one first uplink channel comprises:
a modulation and coding scheme;
a physical downlink control channel (PDCCH) control channel element (CCE) level;
initially configured transmit power $P_{O\_PUSCH}$;
a path-loss-value scale factor;
a path loss value;
a cell corresponding to the at least one first uplink channel;
a carrier corresponding to the at least one first uplink channel; or
a bandwidth part (BWP) corresponding to the at least one first uplink channel; and
determining, by the terminal device, the priority of the at least one first uplink channel based on the parameter value of the at least one parameter of the at least one first uplink channel.

8. A method, comprising:
sending, by a network device, first indication information to a terminal device, wherein the first indication information indicates a parameter value of at least one parameter corresponding to at least two transport blocks, and the at least one parameter comprises:
a first time period, a bandwidth part (BWP), a precoding matrix parameter, a network identifier, a reference signal, a cell index, or a first joint identifier, wherein the first joint identifier indicates transport blocks usable for joint decoding;

sending, by the network device, second indication information to the terminal device, wherein the second indication information indicates another parameter value of at least one another parameter corresponding to the at least two transport blocks, and the at least one another parameter comprises:
a transport block size, a hybrid automatic repeat request (HARQ) process number, a new data indicator (NDI), a HARQ-acknowledgment (HARQ-ACK) resource, a redundancy version (RV), a time domain resource, a frequency domain resource, or a first timer start time;

receiving, by the network device, the at least two transport blocks sent by the terminal device, each of the at least two transport blocks being received before the terminal device sends any feedback to the network device corresponding to whether the at least two transport blocks are correctly received; and decoding, by the network device, first information transmitted using the at least two transport blocks, wherein the first information comprises data information or control information, and decoding, by the network device, the first information transmitted using the at least two transport blocks comprises:
jointly decoding, by the network device, a plurality of transport blocks in the at least two transport blocks to obtain the first information, wherein each of the plurality of transport blocks contains the same first information; and wherein the at least two transport blocks comprise a first transport block and a second transport block, and wherein:

the second indication information indicates that a third parameter in the at least one another parameter corresponds to a plurality of parameter values, and parameter values of the third parameter corresponding to the first transport block and the second transport block are different.

9. The method according to claim 8, wherein the first indication information indicates that a first parameter in the at least one parameter corresponds to a plurality of parameter values, and parameter values of the first parameter corresponding to the first transport block and the second transport block are different.

10. The method according to claim 8, further comprising:
sending, by the network device, first configuration information to the terminal device, wherein the first configuration information is usable to configure information that is usable by the terminal device to perform duplicate transmission using two or more transport blocks, and the information comprises data information or control information.

11. The method according to claim 8, wherein time domain resources on which transport blocks of the at least two transport blocks are located partially or completely overlap.

12. The method according to claim 8, wherein the first indication information indicates the first joint identifier.

13. The method according to claim 12, wherein sending, by the network device, first indication information to the terminal device comprises:
sending, by the network device, downlink control information (DCI) to the terminal device, wherein the DCI comprises the first joint identifier, and the DCI indicates the at least two transport blocks.

* * * * *